US010800619B2

(12) United States Patent
Ramos

(10) Patent No.: US 10,800,619 B2
(45) Date of Patent: Oct. 13, 2020

(54) PORTABLE, HEIGHT ADJUSTABLE GANGWAY AND SYSTEMS AND METHODS FOR ACCESSING VEHICLES OR VESSELS

(71) Applicant: BEA Architects, Inc., Miami, FL (US)

(72) Inventor: Bruno Elias Ramos, Key Biscayne, FL (US)

(73) Assignee: BEA ARCHITECTS, INC., Miami, FL (US)

( * ) Notice: Subject to any disclaimer, the term of this patent is extended or adjusted under 35 U.S.C. 154(b) by 0 days.

(21) Appl. No.: 16/023,476

(22) Filed: Jun. 29, 2018

(65) Prior Publication Data

US 2019/0002217 A1    Jan. 3, 2019

Related U.S. Application Data

(60) Provisional application No. 62/527,410, filed on Jun. 30, 2017.

(51) Int. Cl.
*B65G 69/30* (2006.01)
*E01D 15/10* (2006.01)
*E01D 15/12* (2006.01)

(52) U.S. Cl.
CPC ............. *B65G 69/30* (2013.01); *E01D 15/10* (2013.01); *E01D 15/124* (2013.01)

(58) Field of Classification Search
CPC ......... E01D 15/10; E01D 15/24; B65G 69/30; B64F 1/315

(Continued)

(56) References Cited

U.S. PATENT DOCUMENTS 2,114,805 A    4/1938  Margeles
3,033,340 A    5/1962  Coryell
(Continued)

FOREIGN PATENT DOCUMENTS

| CN | 206914671 | * 1/2018 | ............. B64F 1/315 |
| FR | 2 914 669 | 10/2008 | |
| JP | 2002-167054 | 6/2002 | |

OTHER PUBLICATIONS

International Search Report and Written Opinion of PCT/US18/40363 dated Sep. 17, 2018.

*Primary Examiner* — Raymond W Addie
(74) *Attorney, Agent, or Firm* — Gregory L. Mayback; Dickinson Wright PLLC

(57) ABSTRACT

A portable, height-adjustable gangway includes a lower tower structure comprising a lower landing and a lower movement assembly comprising a first set of wheels permitting the lower tower structure to travel over ground, an upper tower structure comprising an upper landing, an upper movement assembly comprising a second set of wheels permitting the upper tower structure to travel over ground, and an extending tower support connecting the upper movement assembly and the upper landing and comprising expandable struts configured to move the upper landing towards and away from the upper movement assembly, and a travellator pivotally connected to the lower tower structure and pivotally connected to the upper tower structure such that, when the expandable struts of the tower support extend at least one of towards and away from the upper movement assembly, the escalator tilts. The escalator can be a continuous set of stairs, a gondola-like trolley, or both.

25 Claims, 32 Drawing Sheets

(58) Field of Classification Search
USPC .................. 14/69.5–72.5; 198/330–339.1
See application file for complete search history.

(56) References Cited

U.S. PATENT DOCUMENTS

| | | | |
|---|---|---|---|
| 3,928,114 A | 12/1975 | Aylon | |
| 4,026,388 A | 5/1977 | Creissels | |
| 4,946,027 A * | 8/1990 | Jenkins | B65G 21/12 |
| | | | 182/2.11 |
| 6,808,057 B1 * | 10/2004 | Nirmal | B64F 1/315 |
| | | | 198/300 |
| 6,905,095 B1 * | 6/2005 | Gruzdeva | B60P 1/02 |
| | | | 244/137.1 |
| 7,168,119 B1 * | 1/2007 | Telford | B64F 1/3055 |
| | | | 14/71.5 |
| 8,376,132 B2 * | 2/2013 | Scapaccino | B29D 30/0016 |
| | | | 198/370.04 |
| 8,464,859 B2 * | 6/2013 | Campbell | B65G 13/12 |
| | | | 198/588 |
| 2008/0118337 A1 | 5/2008 | Vestergaard | |
| 2009/0188771 A1 * | 7/2009 | Van Den Top | A01G 18/70 |
| | | | 198/312 |
| 2011/0253476 A1 * | 10/2011 | Earl | B66F 7/02 |
| | | | 182/69.6 |
| 2015/0021142 A1 * | 1/2015 | Morgan | B66B 21/02 |
| | | | 198/324 |
| 2015/0274490 A1 * | 10/2015 | Vlad | B66B 23/14 |
| | | | 198/323 |

\* cited by examiner

FIG. 38
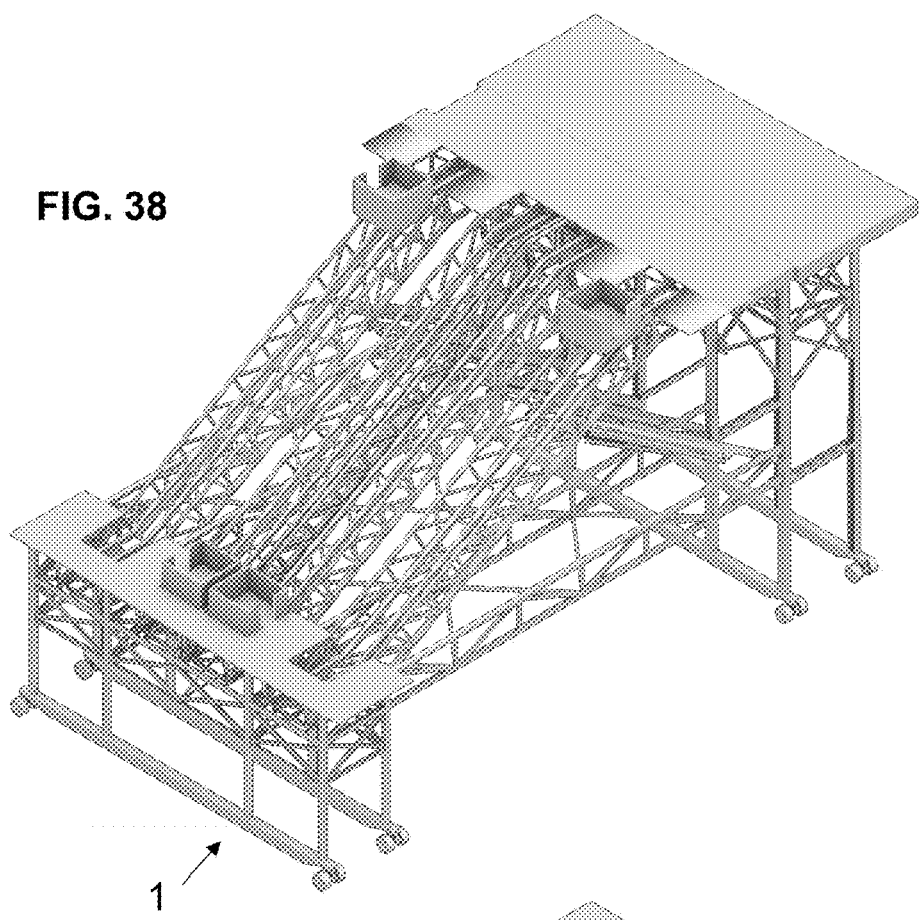
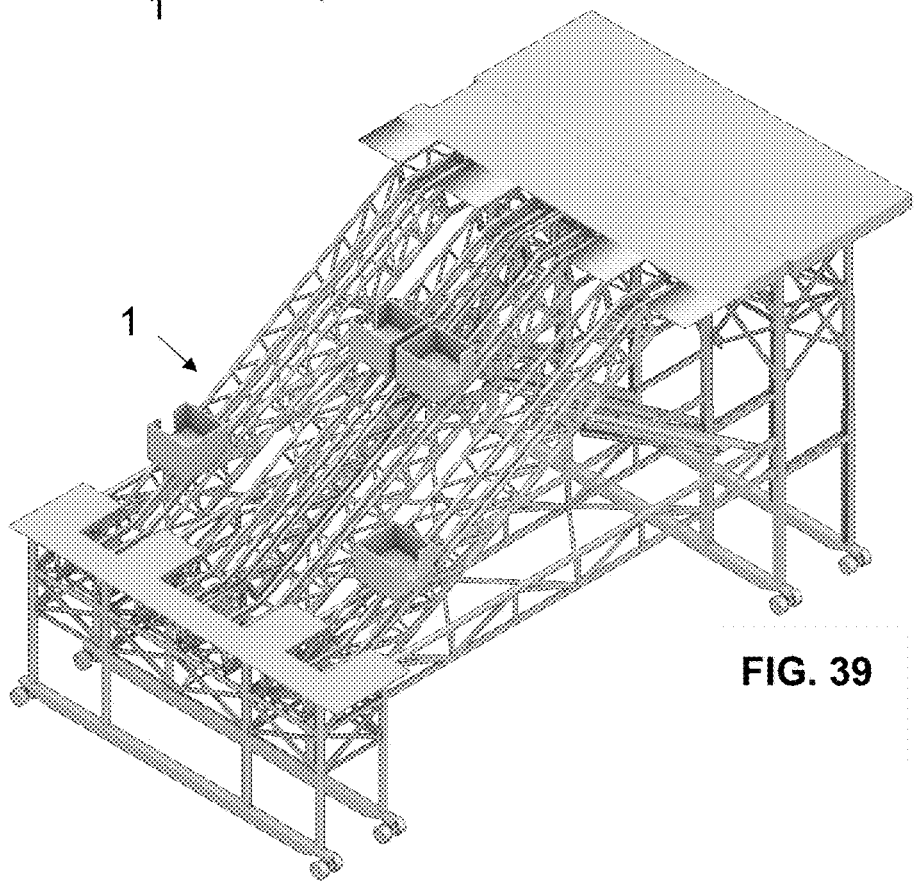
FIG. 39

PORTABLE, HEIGHT ADJUSTABLE GANGWAY AND SYSTEMS AND METHODS FOR ACCESSING VEHICLES OR VESSELS

CROSS-REFERENCE TO RELATED APPLICATIONS

This application claims the priority, under 35 U.S.C. § 119, of U.S. Provisional Patent Application No. 62/527,410, filed Jun. 30, 2017, the prior application is herewith incorporated by reference herein in its entirety.

STATEMENT REGARDING FEDERALLY SPONSORED RESEARCH OR DEVELOPMENT

Not Applicable

FIELD OF THE INVENTION

The present systems, apparatuses, and methods lie in the field of access to vehicles and/or vessels. The present disclosure relates to a portable, height-adjustable gangway and systems and methods for accessing vehicles and/or vessels.

BACKGROUND OF THE INVENTION

Gangways to access vehicles, for example, ocean vessels, are large, expensive, and fixed and movable structures having long ramps or switch back style ramps and limited to 8% to 10% slopes. Accordingly, they are limited in their usefulness and space requirements.

Thus, a need exists to overcome the problems with the prior art systems, designs, and processes as discussed above.

SUMMARY OF THE INVENTION

The systems, apparatuses, and methods described provide a portable, height-adjustable gangway and systems and methods for accessing vehicles and/or vessels that overcome the hereinafore-mentioned disadvantages of the heretofore-known devices and methods of this general type and that provide such features with a compact form, a −30 degree to +30 degree or adjustable and modular form, and in a portable or movable configuration, referred to as a travellator gangway.

With the foregoing and other objects in view, there is provided, a a portable, height-adjustable gangway comprising a lower tower structure comprising a lower landing and a lower movement assembly comprising a first set of wheels permitting the lower tower structure to travel over ground, an upper tower structure comprising an upper landing, an upper movement assembly comprising a second set of wheels permitting the upper tower structure to travel over ground, and an extending tower support connecting the upper movement assembly and the upper landing and comprising expandable struts configured to move the upper landing towards and away from the upper movement assembly, and a travellator pivotally connected to the lower tower structure and pivotally connected to the upper tower structure such that, responsive to the expandable struts of the tower support extending at least one of towards and away from the upper movement assembly, the travellator tilts.

With the objects in view, there is also provided a portable, height-adjustable gangway comprising a lower tower structure comprising a lower landing and a lower movement assembly comprising a first set of wheels permitting the lower tower structure to travel over ground, an upper tower structure comprising an upper landing, an upper movement assembly comprising a second set of wheels permitting the upper tower structure to travel over ground, and an extending tower support connecting the upper movement assembly and the upper landing and comprising expandable struts configured to move the upper landing towards and away from the upper movement assembly, and a travellator pivotally connected to the lower tower structure and pivotally connected to the upper tower structure such that, responsive to the expandable struts of the tower support extending at least one of towards and away from the upper movement assembly, the travellator tilts, the travellator comprising a lower horizontal first portion at the lower landing, an upper horizontal first portion at the upper landing, a second portion pivotally connected to the lower horizontal first portion and pivotally connected to the upper horizontal first portion such that, responsive to movement of the upper landing by the expandable struts towards and away from the upper movement assembly, the second portion tilts between horizontal and a given maximum angle, a translatable step, an inner track connected to the lower horizontal first portion, to the upper horizontal first portion, and to the second portion, and an outer track connected to the lower horizontal first portion, to the upper horizontal first portion, and to the second portion to define, together with the inner track, a step path at which the step moves along at least the second portion.

In accordance with another feature, the travellator comprises a continuous set of stairs.

In accordance with a further feature, the travellator comprises a gondola.

In accordance with an added feature, the travellator comprises at least one first portion and a second portion; and the expandable struts are configured to pivot the travellator between a fully horizontal position in which the at least one first portion and the second portion of the travellator are horizontal, at least one intermediate raised position in which the at least one first portion of the travellator is horizontal and the second portion of the travellator is at a given angle to ground, and a raised position in which the at least one first portion of the travellator is horizontal and the second portion of the travellator is at an angle to ground greater than the given angle.

In accordance with an additional feature, the given angle is greater than zero degrees and less than approximately thirty degrees.

In accordance with yet another feature, the travellator comprises a lower first portion, an upper first portion, and a second portion and the expandable struts are configured to pivot the travellator between a fully horizontal position in which the lower and upper first portions and the second portion of the travellator are horizontal, at least one intermediate raised position in which the lower and upper first portions of the travellator are horizontal and the second portion of the travellator is at a given angle to ground, and a raised position in which the lower and upper first portions of the travellator are horizontal and the second portion of the travellator is at an angle to ground greater than the given angle.

In accordance with yet a further feature, the given angle is greater than zero degrees and less than approximately thirty degrees.

In accordance with yet an added feature, the travellator comprises a translatable step, a travellator supporting structure having an upper end and a lower end, an inner track connected to the supporting structure, an outer track connected to the supporting structure to define, together with the inner track, a step path at which the step moves along the supporting structure at least between the upper and lower ends, and a step movement assembly configured to translate the step along the supporting structure at least between the upper and lower ends.

In accordance with yet an additional feature, the step is a passenger gondola and the step movement assembly is configured to translate the gondola to the upper end to receive and disembark passengers at the upper landing and to translate the gondola to the lower end to receive and disembark passengers at the lower landing.

In accordance with again another feature, the inner track is a continuous raceway inner track, the outer track is a continuous raceway outer track surrounding the inner track, and the step is a plurality of steps forming a continuous succession of steps translated within the raceway of the inner and outer tracks.

In accordance with again a further feature, the travellator comprises a lower horizontal first portion at the lower landing, an upper horizontal first portion at the upper landing, and a second portion pivotally connected to the lower horizontal first portion and pivotally connected to the upper horizontal first portion such that, responsive to movement of the upper landing by the expandable struts towards and away from the upper movement assembly, the second portion tilts between horizontal and a given maximum angle.

In accordance with again an added feature, the given maximum angle is approximately thirty degrees.

In accordance with again an additional feature, the inner track comprises a fixed lower angled portion, a movable upper angled portion, an upper expandable/contractible telescoping section, a lower expandable/contractible telescoping section, an inner track first lower pivot, an inner track second lower pivot, an upper turn-around portion comprising a lower end pivotally connected to an upper end of the fixed lower angled portion by the inner track first lower pivot and an upper end slidably connected to the upper expandable/contractible telescoping section, a lower turn-around portion comprising a lower end pivotally connected to a lower end of the fixed lower angled portion by the inner track second lower pivot and an upper end slidably connected to the lower expandable/contractible telescoping section, an inner track first upper pivot pivotally connecting the movable upper angled portion to the upper expandable/contractible telescoping section, and an inner track second upper pivot pivotally connecting the movable upper angled portion to the lower expandable/contractible telescoping section, and the outer track comprises a lower angled portion, an upper angled portion, an outer track first upper pivot, an outer track second upper pivot, an outer track first lower pivot, an outer track second lower pivot, a lower turn-around portion comprising a lower end pivotally connected to a lower end of the lower angled portion by the outer track second lower pivot and an upper end pivotally connected to a lower end of the upper angled portion by the outer track second upper pivot, and an upper turn-around portion having a lower end pivotally connected to an upper end of the lower angled portion by the outer track first lower pivot, and an upper end pivotally connected to an upper end of the upper angled portion.

In accordance with still another feature, responsive to movement of the upper landing by the expandable struts towards and away from the upper movement assembly, the lower and upper expandable/contractible telescoping sections slide along the lower and upper turn-around portions, respectively, to translate the movable upper angled portion towards and away from the upper angled portion of the outer track.

In accordance with still a further feature, the step has wheels and the inner track and the outer track are C-channels in which the wheels of the step travel.

In accordance with still an added feature, the step comprises at least one of a continuous set of stairs and a gondola.

In accordance with still an additional feature, the given maximum angle is approximately thirty degrees.

In accordance with another feature, the inner track comprises a fixed lower angled portion, a movable upper angled portion, an upper expandable/contractible telescoping section, a lower expandable/contractible telescoping section, an inner track first lower pivot, an inner track second lower pivot, an upper turn-around portion comprising a lower end pivotally connected to an upper end of the fixed lower angled portion by the inner track first lower pivot and an upper end slidably connected to the upper expandable/contractible telescoping section, a lower turn-around portion comprising a lower end pivotally connected to a lower end of the fixed lower angled portion by the inner track second lower pivot and an upper end slidably connected to the lower expandable/contractible telescoping section, an inner track first upper pivot pivotally connecting the movable upper angled portion to the upper expandable/contractible telescoping section, and an inner track second upper pivot pivotally connecting the movable upper angled portion to the lower expandable/contractible telescoping section, and the outer track comprises a lower angled portion, an upper angled portion, an outer track first upper pivot, an outer track second upper pivot, an outer track first lower pivot, an outer track second lower pivot, a lower turn-around portion comprising a lower end pivotally connected to a lower end of the lower angled portion by the outer track second lower pivot and an upper end pivotally connected to a lower end of the upper angled portion by the outer track second upper pivot, and an upper turn-around portion having a lower end pivotally connected to an upper end of the lower angled portion by the outer track first lower pivot and an upper end pivotally connected to an upper end of the upper angled portion.

In accordance with a concomitant feature, responsive to movement of the upper landing by the expandable struts towards and away from the upper movement assembly, the lower and upper expandable/contractible telescoping sections slide along the lower and upper turn-around portions, respectively, to translate the movable upper angled portion towards and away from the upper angled portion of the outer track.

The travellator gangway changes the way ship and vessel boarding occurs. The travellator gangway is configured to move parallel or perpendicular to a vessel/ship being serviced or boarded. The travellator gangway can be installed parallel or perpendicular to the ship or at any angle in between. The travellator gangway can be provided in various configurations using an open air form with railings (covered or uncovered) or an enclosed form with glass, cladding, and a climate controlled environment (heating and cooling the interior).

The travellator gangway sits atop a structural framework that can adjust vertically (e.g., by use of screw drives or electric hydraulic cylinders) to compensate for ship door configurations from −30 degrees to +30 degree angles. Service for pedestrians can be accommodated through escalator-type adjustable units or stairs and physically challenged pedestrians can be accommodated through a diagonally traveling "travellator" unit, such as a box or gondola. Accordingly, as used herein, travellator or escalator are used interchangeably and refer to both the stair and gondola configuration.

The travellator gangway configurations can vary from one moveable adjustable step surface, travellator and stair to multiple units of each in any combination necessary for the volume of movement required. Path of travel on all units are reversible up or down and speed of travel can be varied.

The travellator gangway units are equipped with a Programmable Logic Controller (PLC)-type controller unit allowing the travellator gangway to be pre-programmed for a variety of ship doors, heights, and landside door configurations. The PLC controller has the ability to speed up or slow down the travel speed of the unit or moveable steps and travellator(s).

Safety features included include fail-safe alarms, high-pressure alarms and visual detection passenger alarms, vessel/ship movement alarms and any alarm system necessary to protect the pedestrians.

Although the systems, apparatuses, and methods are illustrated and described herein as embodied in a portable, height-adjustable gangway and systems and methods for accessing vehicles and/or vessels, it is, nevertheless, not intended to be limited to the details shown because various modifications and structural changes may be made therein without departing from the spirit of the invention and within the scope and range of equivalents of the claims. Additionally, well-known elements of exemplary embodiments will not be described in detail or will be omitted so as not to obscure the relevant details of the systems, apparatuses, and methods.

Additional advantages and other features characteristic of the systems, apparatuses, and methods will be set forth in the detailed description that follows and may be apparent from the detailed description or may be learned by practice of exemplary embodiments. Still other advantages of the systems, apparatuses, and methods may be realized by any of the instrumentalities, methods, or combinations particularly pointed out in the claims.

Other features that are considered as characteristic for the systems, apparatuses, and methods are set forth in the appended claims. As required, detailed embodiments of the systems, apparatuses, and methods are disclosed herein; however, it is to be understood that the disclosed embodiments are merely exemplary of the systems, apparatuses, and methods, which can be embodied in various forms. Therefore, specific structural and functional details disclosed herein are not to be interpreted as limiting, but merely as a basis for the claims and as a representative basis for teaching one of ordinary skill in the art to variously employ the systems, apparatuses, and methods in virtually any appropriately detailed structure. Further, the terms and phrases used herein are not intended to be limiting; but rather, to provide an understandable description of the systems, apparatuses, and methods. While the specification concludes with claims defining the systems, apparatuses, and methods of the invention that are regarded as novel, it is believed that the systems, apparatuses, and methods will be better understood from a consideration of the following description in conjunction with the drawing figures, in which like reference numerals are carried forward.

BRIEF DESCRIPTION OF THE DRAWINGS

The accompanying figures, where like reference numerals refer to identical or functionally similar elements throughout the separate views, which are not true to scale, and which, together with the detailed description below, are incorporated in and form part of the specification, serve to illustrate further various embodiments and to explain various principles and advantages all in accordance with the systems, apparatuses, and methods. Advantages of embodiments of the systems, apparatuses, and methods will be apparent from the following detailed description of the exemplary embodiments thereof, which description should be considered in conjunction with the accompanying drawings in which the figures show fragmentary, perspective, partially cut away, partially transparent cross-sectional, and/or elevational views of exemplary embodiments of a portable, height-adjustable gangway.

FIG. 38 is a perspective view of the gangway of FIG. 34 in a third intermediate raised position with two gondolas at lower end points and two gondolas at intermediate positions;

FIG. 39 is a perspective view of the gangway of FIG. 34 in a fourth intermediate raised position with the gondolas at intermediate positions;

DETAILED DESCRIPTION OF THE EMBODIMENTS

Figure 1:
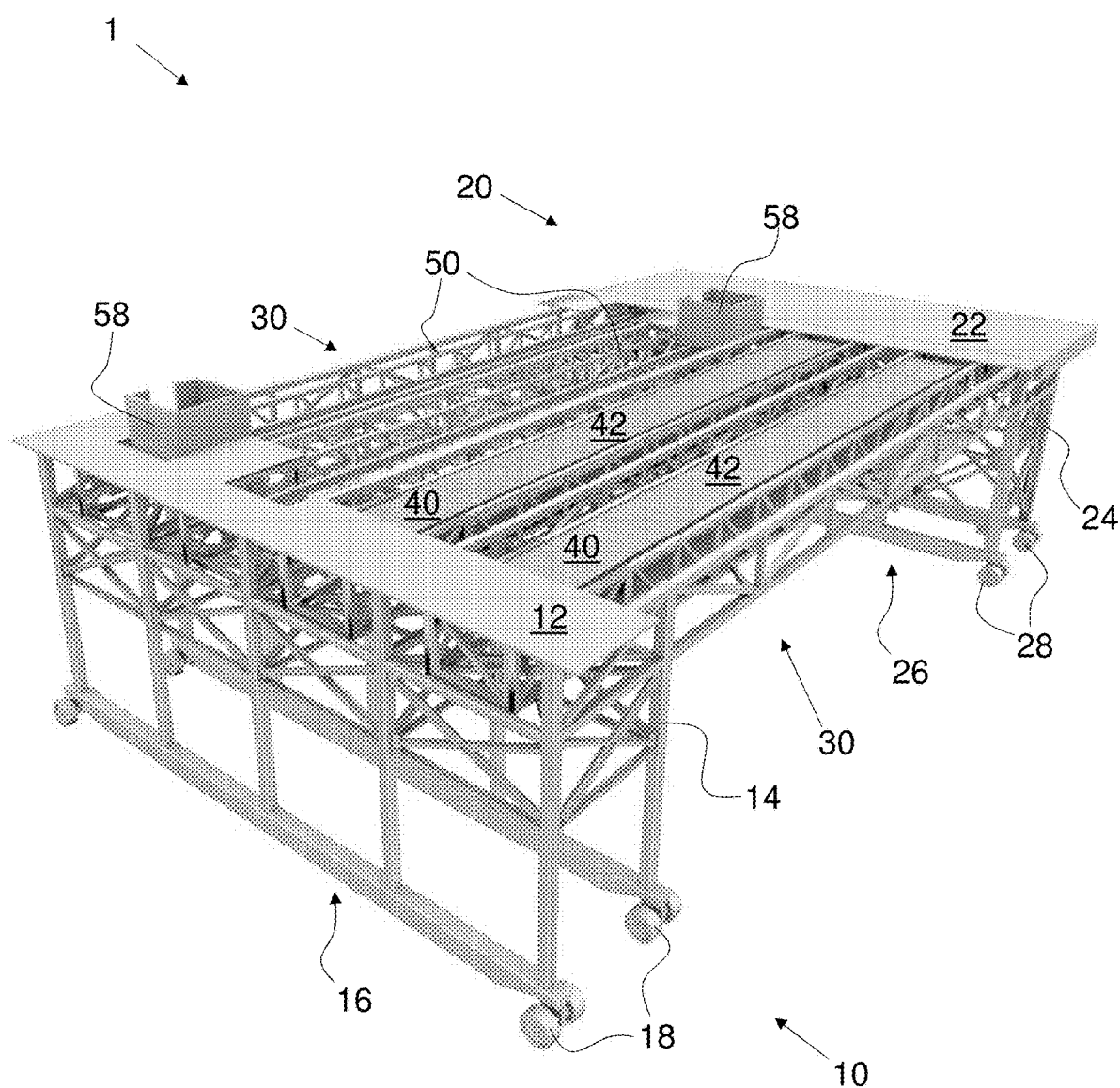
FIG. 1 is a perspective view of an exemplary embodiment of a portable, height-adjustable gangway in a fully horizontal position with two gondola travellators and two stair travellators, the gondolas on opposite ends.
Figure 2:
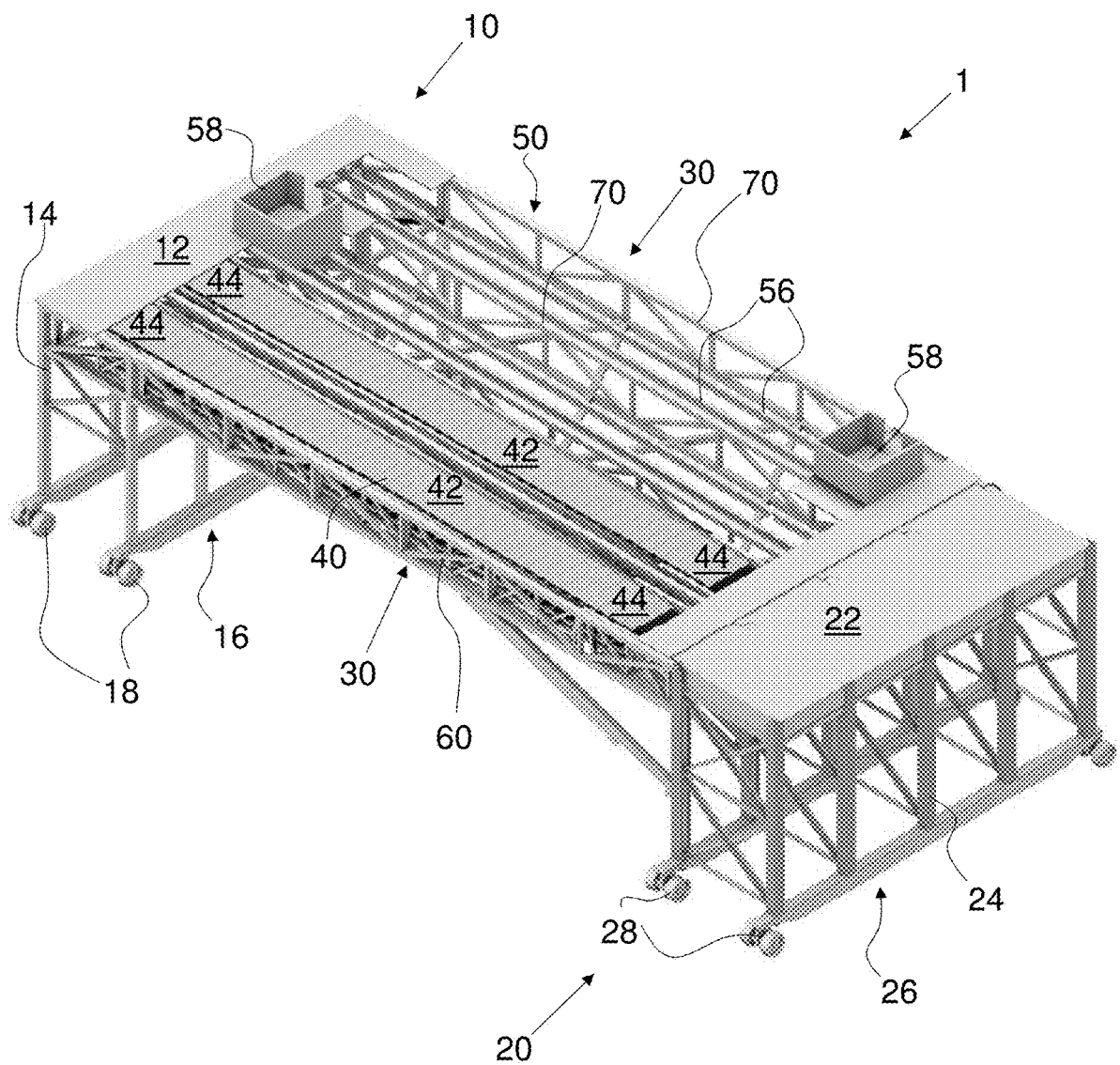
FIG. 2 is a perspective view of the gangway of FIG. 1 with the gondolas in opposite positions.
Figure 3:
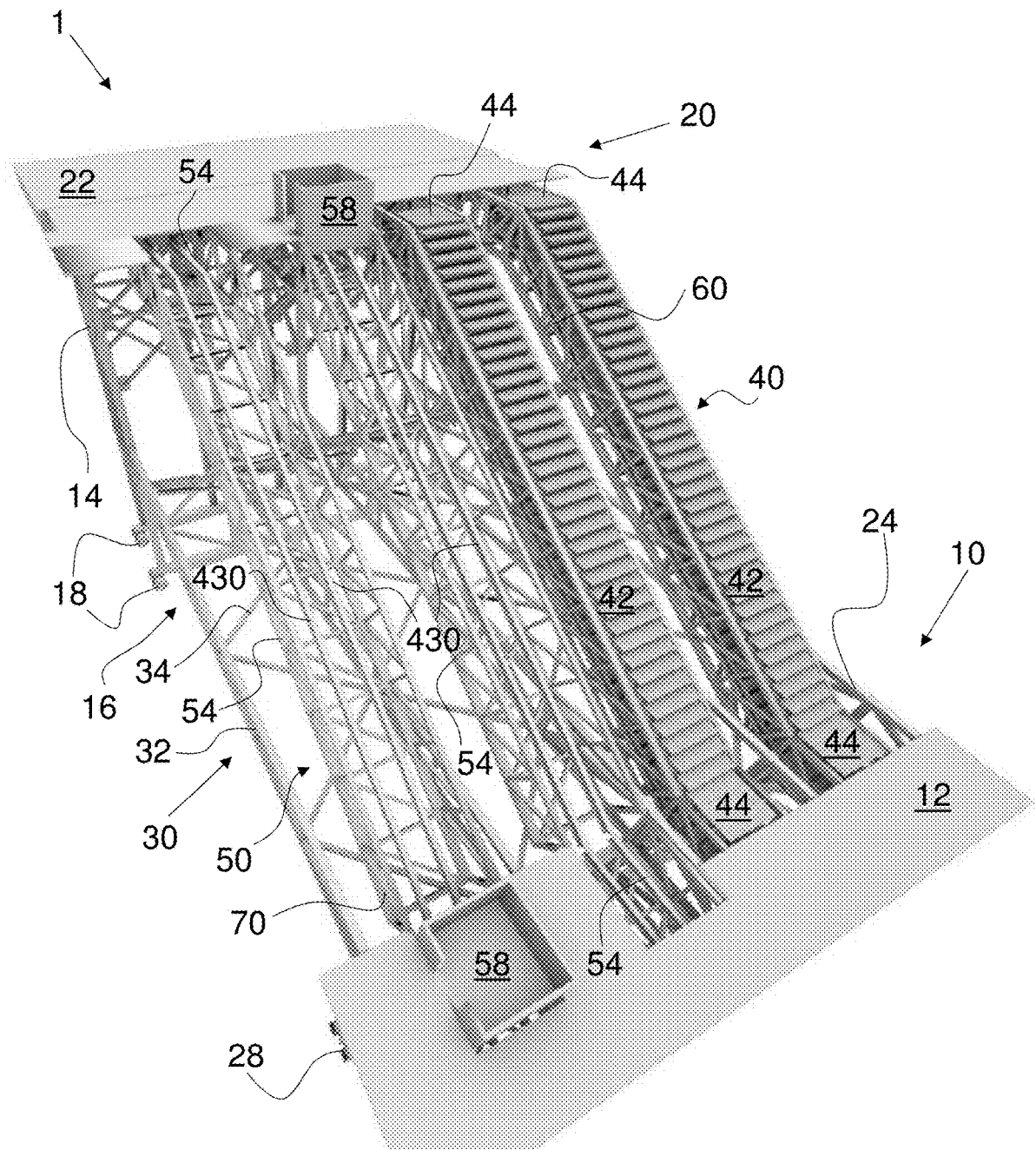
FIG. 3 is a perspective view of the gangway of FIG. 1 in an intermediate raised position.
Figure 4:
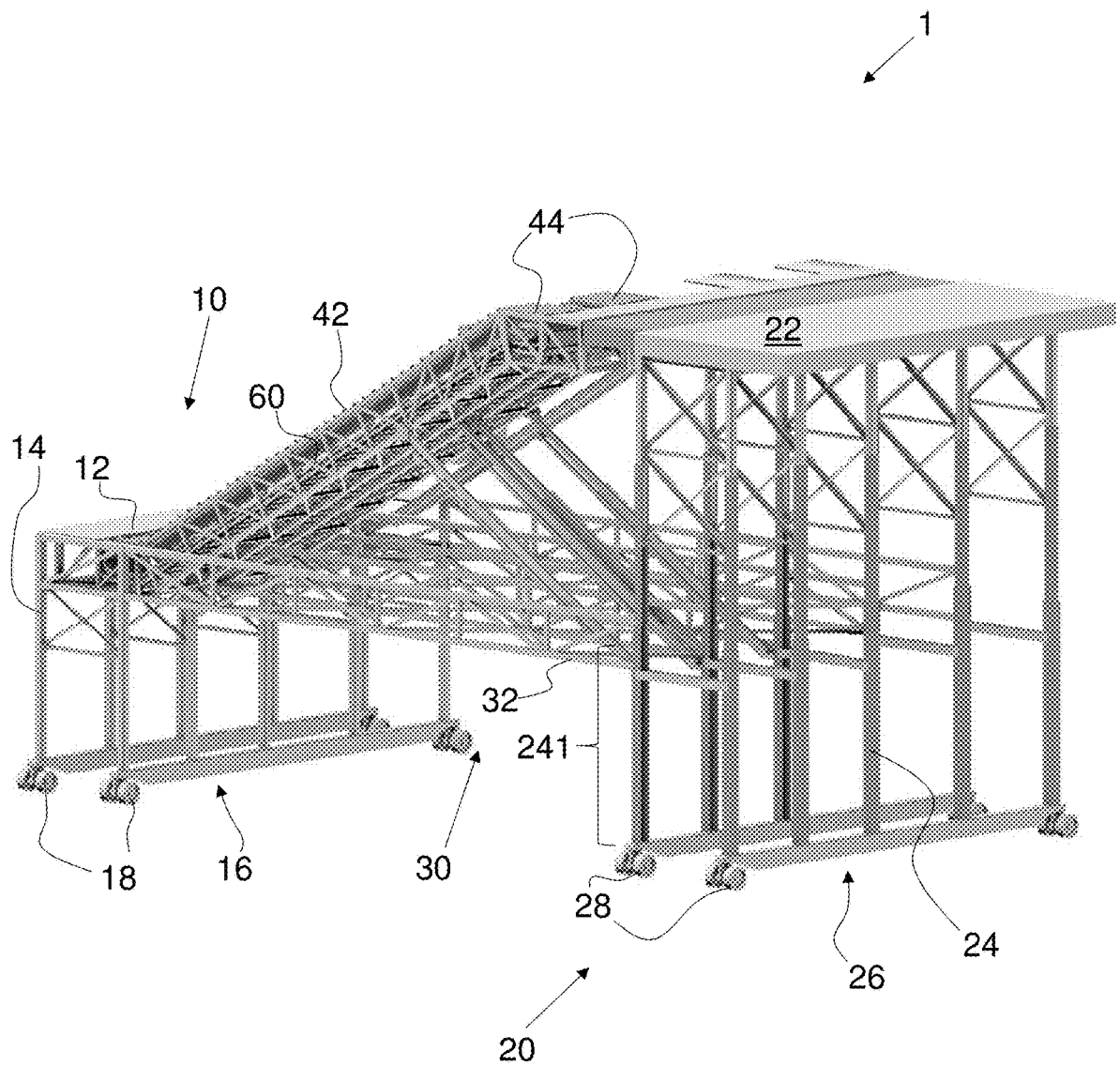
FIG. 4 is a perspective view of the gangway of FIG. 1 in a raised position.

As required, detailed embodiments of the systems, apparatuses, and methods are disclosed herein; however, it is to be understood that the disclosed embodiments are merely exemplary of the systems, apparatuses, and methods, which can be embodied in various forms. Therefore, specific structural and functional details disclosed herein are not to be interpreted as limiting, but merely as a basis for the claims and as a representative basis for teaching one skilled in the art to variously employ the systems, apparatuses, and methods in virtually any appropriately detailed structure. Further, the terms and phrases used herein are not intended to be limiting; but rather, to provide an understandable description of the systems, apparatuses, and methods. While the specification concludes with claims defining the features of the systems, apparatuses, and methods that are regarded as novel, it is believed that the systems, apparatuses, and methods will be better understood from a consideration of the following description in conjunction with the drawing figures, in which like reference numerals are carried forward.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Alternate embodiments may be devised without departing from the spirit or the scope of the invention. Additionally, well-known elements of exemplary embodiments of the systems, apparatuses, and methods will not be described in detail or will be omitted so as not to obscure the relevant details of the systems, apparatuses, and methods.

Before the systems, apparatuses, and methods are disclosed and described, it is to be understood that the terminology used herein is for the purpose of describing particular embodiments only and is not intended to be limiting. The terms "comprises," "comprising," or any other variation thereof are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element. The terms "including" and/or "having," as used herein, are defined as comprising (i.e., open language). The terms "a" or "an", as used herein, are defined as one or more than one. The term "plurality," as used herein, is defined as two or more than two. The term "another," as used herein, is defined as at least a second or more. The description may use the terms "embodiment" or "embodiments," which may each refer to one or more of the same or different embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact (e.g., directly coupled). However, "coupled" may also mean that two or more elements are not in direct contact with each other, but yet still cooperate or interact with each other (e.g., indirectly coupled).

For the purposes of the description, a phrase in the form "A/B" or in the form "A and/or B" or in the form "at least one of A and B" means (A), (B), or (A and B), where A and B are variables indicating a particular object or attribute. When used, this phrase is intended to and is hereby defined as a choice of A or B or both A and B, which is similar to the phrase "and/or". Where more than two variables are present in such a phrase, this phrase is hereby defined as including only one of the variables, any one of the variables, any combination of any of the variables, and all of the variables, for example, a phrase in the form "at least one of A, B, and C" means (A), (B), (C), (A and B), (A and C), (B and C), or (A, B and C).

Relational terms such as first and second, top and bottom, and the like may be used solely to distinguish one entity or action from another entity or action without necessarily requiring or implying any actual such relationship or order between such entities or actions. The description may use perspective-based descriptions such as up/down, back/front, top/bottom, and proximal/distal. Such descriptions are merely used to facilitate the discussion and are not intended to restrict the application of disclosed embodiments. Various operations may be described as multiple discrete operations in turn, in a manner that may be helpful in understanding embodiments; however, the order of description should not be construed to imply that these operations are order dependent.

As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. As used herein, the terms "substantial" and "substantially" means, when comparing various parts to one another, that the parts being compared are equal to or are so close enough in dimension that one skill in the art would consider the same. Substantial and substantially, as used herein, are not limited to a single dimension and specifically include a range of values for those parts being compared. The range of values, both above and below (e.g., "+/−" or greater/lesser or larger/smaller), includes a variance that one skilled in the art would know to be a reasonable tolerance for the parts mentioned. Additionally, various exemplary embodiments are described herein with dimensions. These dimensions are not limited to the values provided. Dimensions can vary to fit multiple port/ship/terminal configurations.

It will be appreciated that embodiments of the systems, apparatuses, and methods described herein may be comprised of one or more conventional processors and unique stored program instructions that control the one or more processors to implement, in conjunction with certain non-processor circuits and other elements, some, most, or all of the functions of the devices and methods described herein. The non-processor circuits may include, but are not limited to, signal drivers, clock circuits, power source circuits, and user input and output elements. Alternatively, some or all functions could be implemented by a state machine that has no stored program instructions, or in one or more application specific integrated circuits (ASICs) or field-programmable gate arrays (FPGA), in which each function or some combinations of certain of the functions are implemented as custom logic. Of course, a combination of these approaches could also be used. Thus, methods and means for these functions have been described herein.

The terms "program," "software," "software application," and the like as used herein, are defined as a sequence of instructions designed for execution on a computer system or programmable device. A "program," "software," "application," "computer program," or "software application" may include a subroutine, a function, a procedure, an object method, an object implementation, an executable application, an applet, a servlet, a source code, an object code, any computer language logic, a shared library/dynamic load library and/or other sequence of instructions designed for execution on a computer system.

Herein various embodiments of the systems, apparatuses, and methods are described. In many of the different embodiments, features are similar. Therefore, to avoid redundancy, repetitive description of these similar features may not be made in some circumstances. It shall be understood, however, that description of a first-appearing feature applies to the later described similar feature and each respective description, therefore, is to be incorporated therein without such repetition.

Described now are exemplary embodiments. Referring now to the figures of the drawings in detail and first, particularly to FIGS. 1 to 4, there is shown an exemplary embodiment of a portable, height-adjustable gangway 1. At one of the gangway 1 is a lower tower structure 10 comprising a lower landing 12, a lower tower support 14, and a lower movement assembly 16 comprising, for example, a set of wheels 18 permitting the lower tower structure 10 to travel over ground. In the exemplary embodiment shown, the lower movement assembly 16 rolls the gangway 1 in a direction at an angle to movement of gangway users, in particular, in a direction orthogonal to such movement. Alternatively, the lower movement assembly 16 can rolls the gangway 100 in the same direction as movement of gangway users. Opposite the lower tower structure 10 is an upper tower structure 20 comprising an upper landing 22, an upper tower support 24, and an upper movement assembly 26 comprising, for example, a set of wheels 28 permitting the upper tower structure 20 to travel over ground. The upper tower structure 20 is configured to raise and lower as described in further detail below. Even though the lower tower structure 10 in this exemplary embodiment is shown as fixed (i.e., not raising or lowering), the lower tower structure 10 can be incorporated with the same raising/lowering understructure to raise and lower as well.

Extending between the lower tower structure 10 and the upper tower structure 20 is a cross-support 30. The cross-support 30 is fixed to the lower tower structure 10 and to a portion or strut section 241 of the upper tower support 24 that is not configured to raise/lower. Accordingly, this exemplary embodiment of the cross-support 30 remains substantially horizontal when the lower and upper movement assemblies 16, 26 are located on substantially level ground. In the exemplary embodiment illustrated, the cross-support 30 is a set of parallel trusses best viewed in FIG. 4. Further, the cross-support 30 keeps the lower tower structure 10 and the upper tower structure 20 at a fixed distance from one another.

Also extending between the lower tower structure 10 and the upper tower structure 20 is at least one travellator 40. In the exemplary embodiment of FIGS. 1 to 4, there are four travellators: two stair travellators 40 and two gondola travellators 50. The cross-support 30 is shown as providing a three-sided truss structure to surround each one of the four travellators 40, 50. In this configuration, therefore, there are five vertical truss beams 32 and four horizontal truss beams 34, each horizontal truss beam 34 connecting adjacent ones of the vertical truss beams 32. The three-sided truss structure is exemplary and can comprise any combination of supporting structures including, but not limited to only vertical beams, only horizontal beams, or any combination of vertical and horizontal beams. Each stair travellator 40 is similar to a standard stair-type escalator but the stair travellator 40 has a first stair portion 42 that is configured to move at an angle and at least one second stair portion 44 that is configured to move horizontally, these differences are described in further detail below. The gondola travellators 50 have similarity to the stair travellator 40 in that each gondola travellator 50 has a first gondola portion 52 that is configured to move at an angle and at least one second gondola portion 54 that is configured to move horizontally. However, instead of stairs, the gondola travellator 50 has at least one gondola rail 56 on which a gondola 58 rides back and forth from a first location at the lower landing 12 to a second location at the upper landing 22. In the exemplary embodiment, each of the travellators 40, 50 has a respective travellator supporting structure 60, 70, which structure 60, 70 respectively connects the moving parts of the travellators 40, 50 to the lower and upper tower structures 10, 20. These supporting structures 60, 70 are described in further detail below.

The stair travellator 40, the upper landing 22, and the raise/lower structure of the upper tower support 24 are explained with regard to FIGS. 5 to 11.

Figure 5:
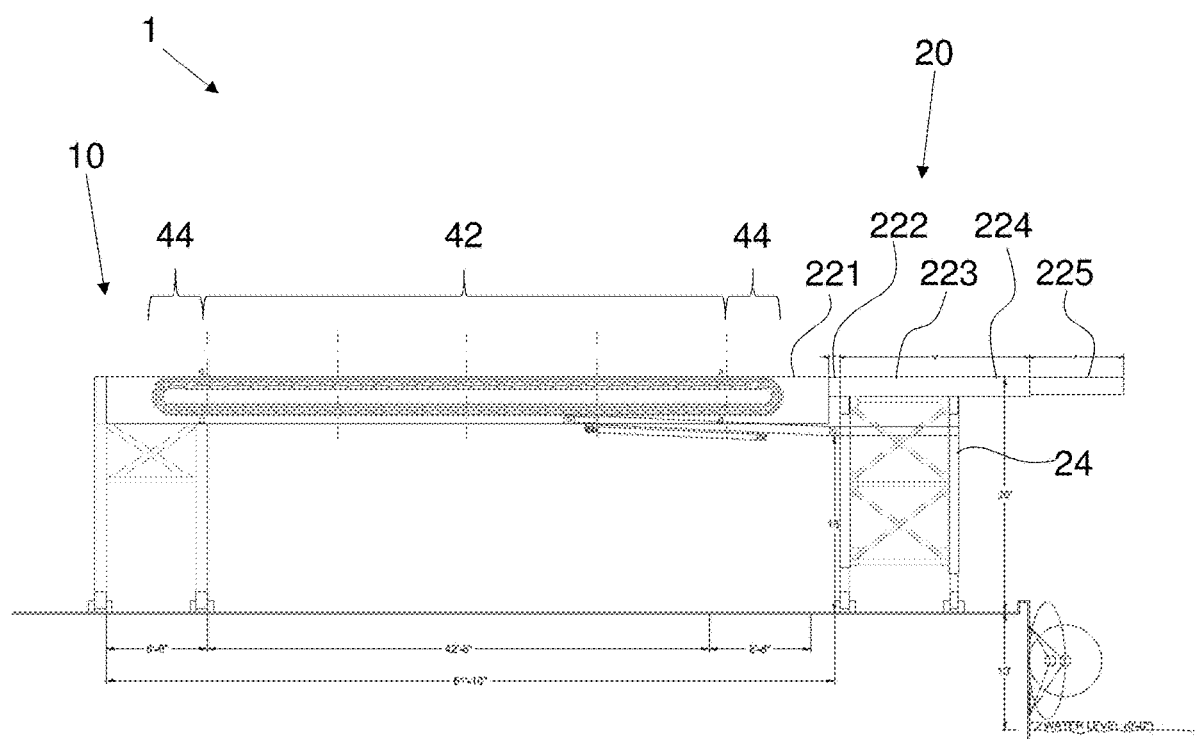
FIG. 5 is a diagrammatic side elevational and partially cross-sectional view of the gangway of FIG. 1 with the cross-section through a stair travellator and with a structure of the stair travellator removed.
Figure 6:
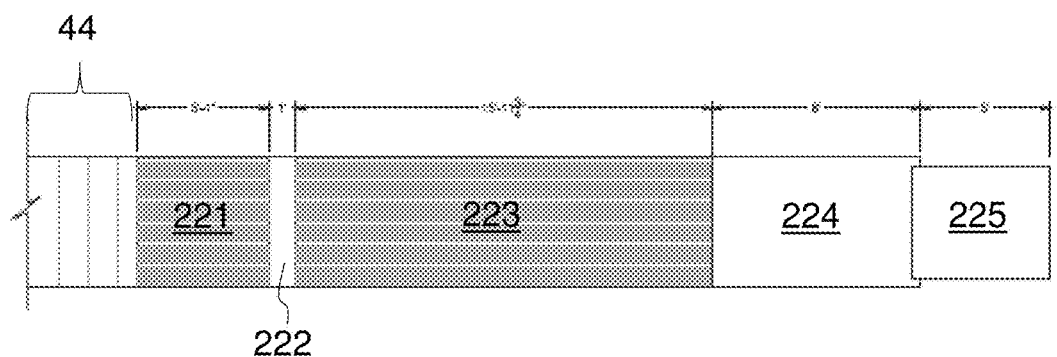
FIG. 6 is a fragmentary, diagrammatic top plan view of an exemplary embodiment of an upper landing of the gangway of FIG. 5.

In FIG. 5, the stair travellator 40 is in a fully horizontal position, a tilt angle α being defined as 0°. Thus, the lower first stair portion 42, the second stair portion 44, and the upper first stair portion 42 have upper surfaces that are substantially coplanar in the horizontal position. In an exemplary embodiment for sea vessel use, the lower landing is approximately 8'8" long and the first stair portion 42 is approximately 42'6" long. In the horizontal position, the upper tower support 24 is in a lowered position, in which lower and upper movement strut sections 242, 243 are in their lowermost position with respect to the fixed portion 241 of the upper tower support 24 (these three sections overlap in the view of FIG. 5). In the exemplary embodiment for sea vessel use, the height from ground to the upper landing 22 is approximately 20 feet. The upper landing 22 comprises various sections, an escape landing 221, a first adjustable landing 222, a fixed landing 223, a second adjustable landing 224, and a transfer plate 225. In the horizontal position, sections of the upper landing 22 are in the orientation shown in FIG. 6. In this orientation, the escape landing 221 is approximately 5'1" long, the first adjustable landing 222 is approximately 1' long, the fixed landing 223 is approximately 16' long, the second adjustable landing 224 is approximately 8' long, and the transfer plate 225 is approximately 5' long.

Figure 7:
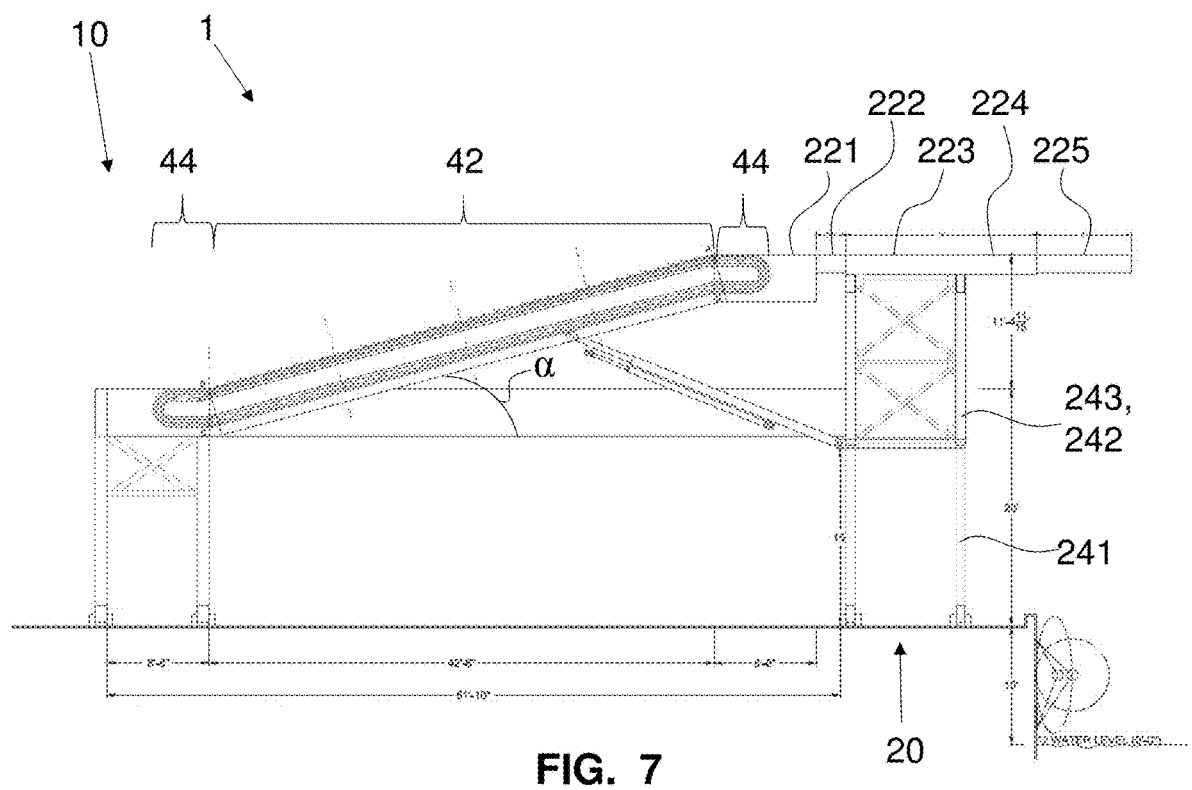
FIG. 7 is a diagrammatic side elevational and partially cross-sectional view of the gangway of FIG. 1 in an intermediate raised position with the cross-section through the stair travellator and with the structure of the stair travellator removed.
Figure 8:
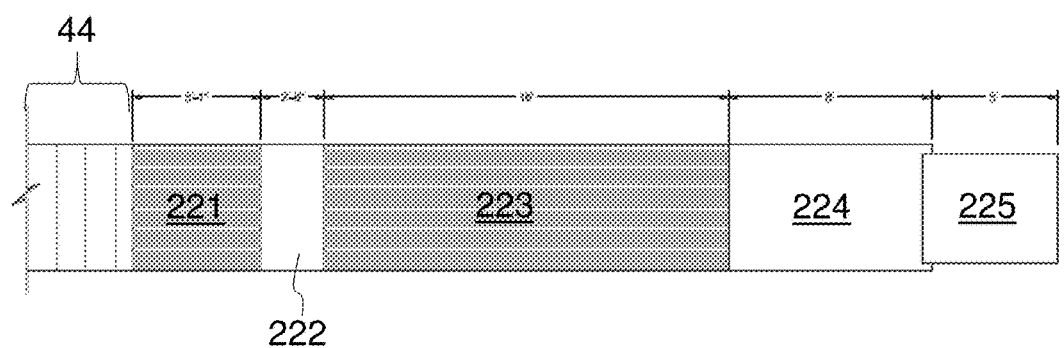
FIG. 8 is a fragmentary, diagrammatic top plan view of an exemplary embodiment of an upper landing of the gangway of FIG. 7.

In FIG. 7, the stair travellator 40 is in an intermediate raised position, a tilt angle α being defined as 15°. Thus, the lower first stair portion 42 and the upper first stair portion 42 have upper surfaces that are substantially parallel in this position and the upper surface of the second stair portion 44 is at approximately a 15° angle α. In the intermediate raised position, the upper tower support 24 is in a first raised position, in which lower and upper movement strut sections 242, 243 are raised to the top of the fixed portion 241 of the upper tower support 24 (alternatively, the lower movement strut section 242 can be raised partially and the upper movement strut section 243 can be raised partially). In the exemplary embodiment for sea vessel use, the height from ground to the upper landing is now approximately 31'4.6875". To accommodate the shortened horizontal extent of the first stair portion 42, at least one of the adjustable portions 222, 224 of the upper landing 22 extends. In particular, in the intermediate raised position shown, the sections of the upper landing 22 are in the orientation shown in FIG. 8, in which the first adjustable landing 222 is now approximately 2'6" long.

Figure 9:
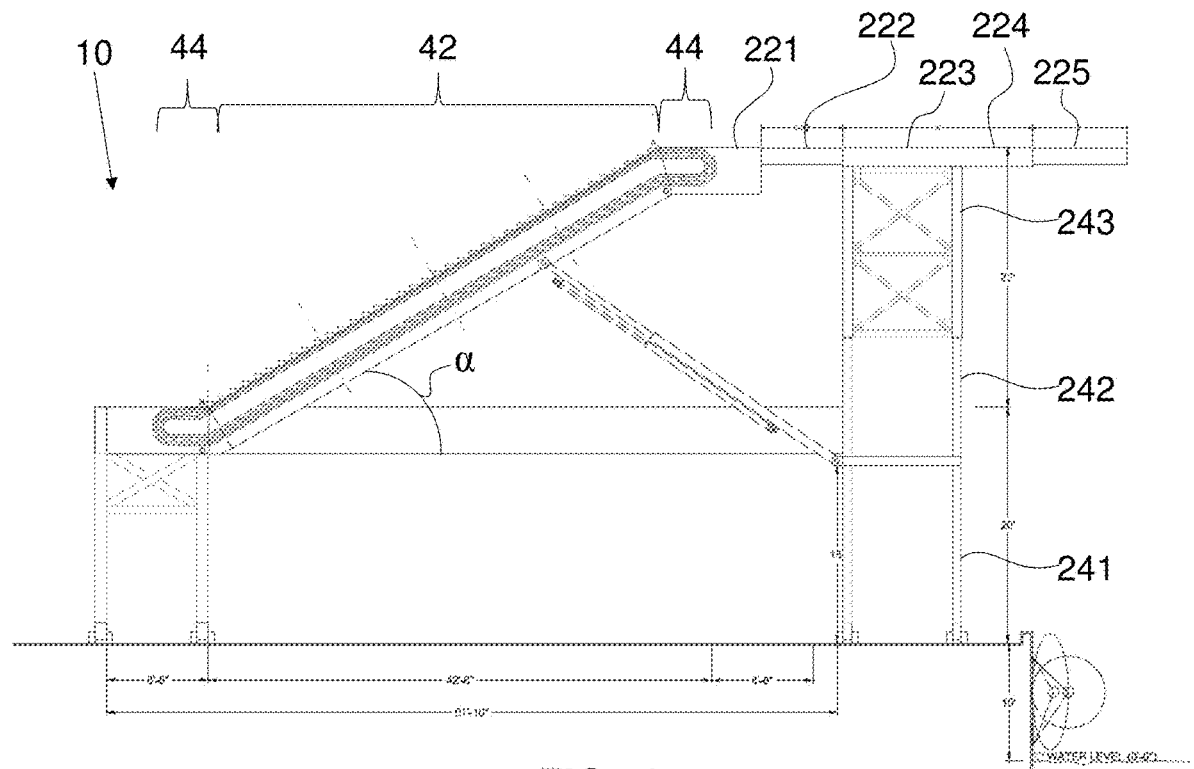
FIG. 9 is a diagrammatic side elevational and partially cross-sectional view of the gangway of FIG. 1 in a raised position with the cross-section through the stair travellator and with the structure of the stair travellator removed.
Figure 10:
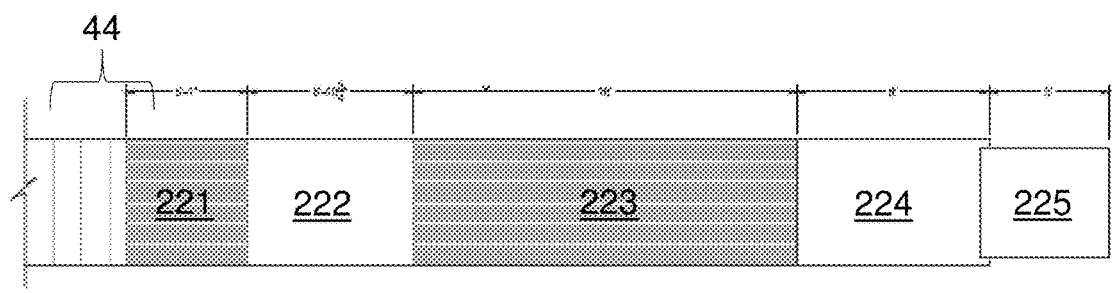
FIG. 10 is a fragmentary, diagrammatic top plan view of an exemplary embodiment of an upper landing of the gangway of FIG. 9.

In FIG. 9, the stair travellator 40 is in a raised position, a tilt angle α being defined as approximately 30°. As in all intermediate positions, the lower first stair portion 42 and the upper first stair portion 42 have upper surfaces that are substantially parallel. The upper surface of the second stair portion 44 is now at approximately a 30° angle α. In the raised position, the upper tower support 24 is in a second raised position, in which the lower movement strut section 242 is raised to the top of the fixed portion 241 of the upper tower support 24 and the upper movement strut section 243 is raised to the top of the lower movement strut section 242. In the exemplary embodiment for sea vessel use, the height from ground to the upper landing is now approximately 42'. To accommodate the further shortened horizontal extent of the first stair portion 42, at least one of the adjustable portions 222, 224 of the upper landing 22 extends. In particular, in the raised position shown, the sections of the upper landing 22 are in the orientation shown in FIG. 10, in which the first adjustable landing 222 is now approximately 6'10.75" long.

Figure 11:
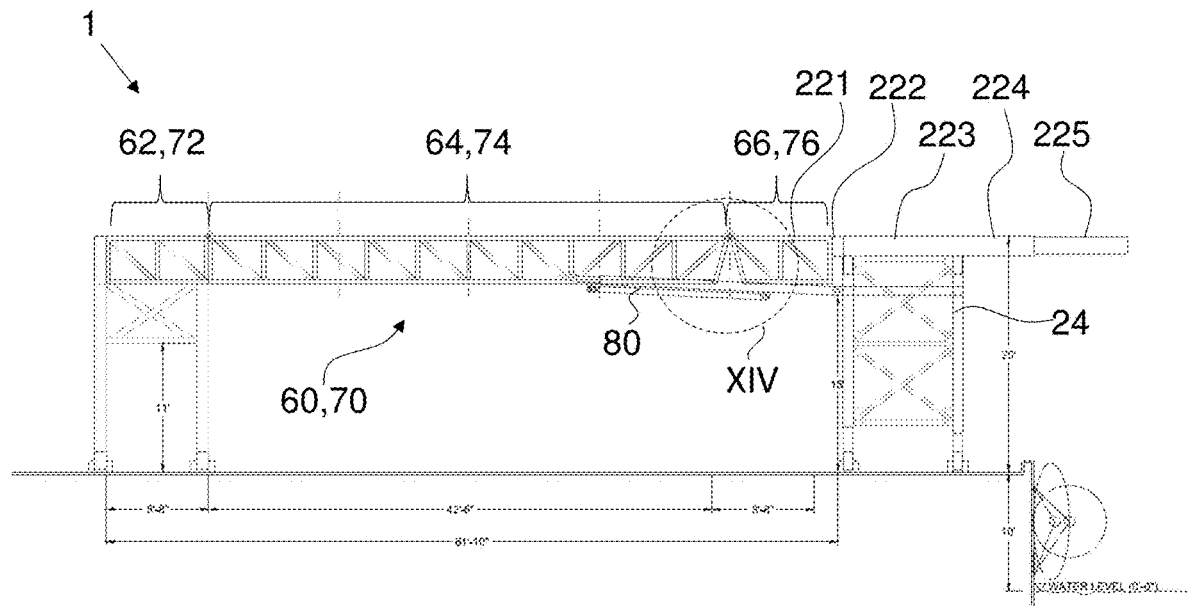
FIG. 11 is a diagrammatic side elevational and partially cross-sectional view of the gangway of FIG. 1 with the cross-section through the structure of the stair travellator and with the stair travellator removed.
Figure 12:
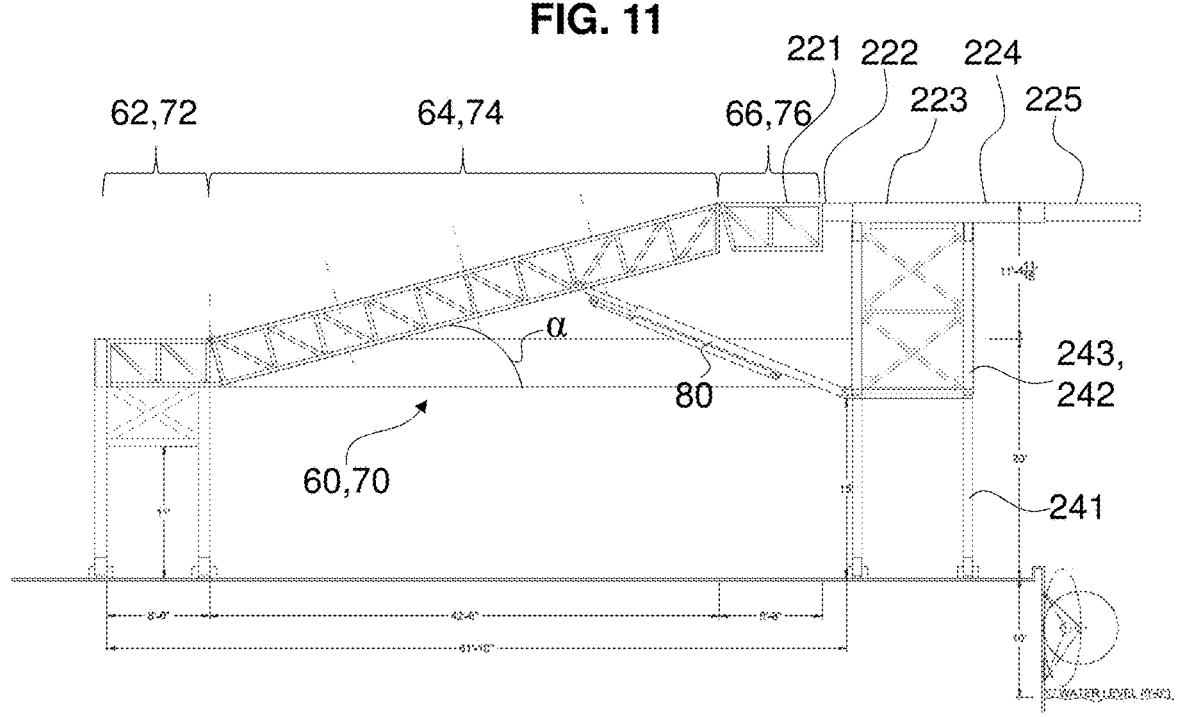
FIG. 12 is a diagrammatic side elevational and partially cross-sectional view of the gangway of FIG. 1 in an intermediate raised position with the cross-section through the structure of the stair travellator and with the stair travellator removed.
Figure 13:
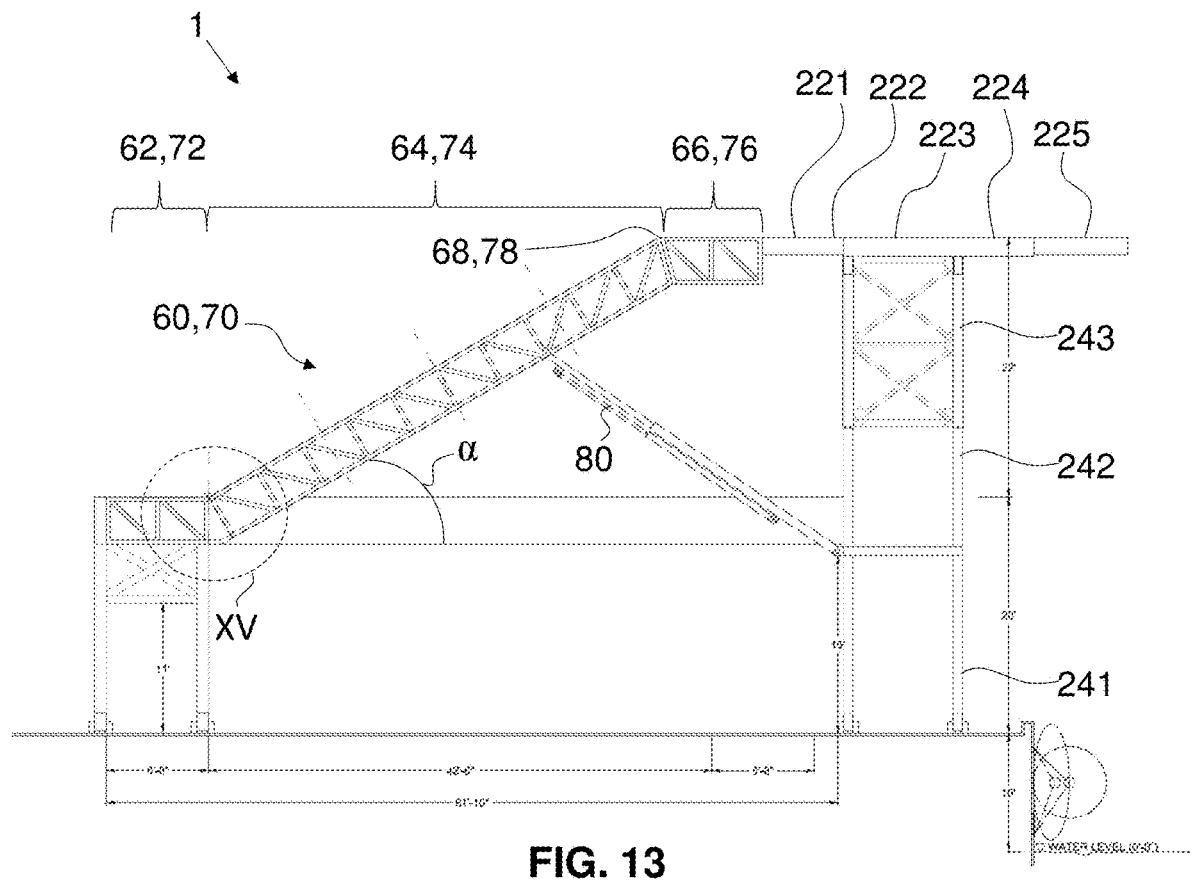
FIG. 13 is a diagrammatic side elevational and partially cross-sectional view of the gangway of FIG. 1 in a raised position with the cross-section through the structure of the stair travellator and with the stair travellator removed.

As indicated above, each of the travellators 40, 50 has a respective travellator supporting structure 60, 70, which structure 60, 70 respectively connects the moving parts of the travellators 40, 50 to the lower and upper tower structures 10, 20. One exemplary embodiment for the supporting structure 60, 70 is shown in FIGS. 11 to 13. The stair portions 42, 44 and the gondola portions 52, 54 are not illustrated in these figures for clarity.

In FIG. 11, each travellator supporting structure 60, 70 has a lower supporting structure 62, 72, an intermediate supporting structure 64, 74, and an upper supporting structure 66, 76. In FIG. 11 the travellator supporting structure 60, 70 is in the fully horizontal position with the tilt angle α of 0°. Thus, the lower supporting structure 64, 74, the intermediate supporting structure 62, 72, and the upper supporting structure 64, 74 have upper surfaces that are substantially coplanar in the horizontal position. In the horizontal position, the upper tower support 24 is in a lowered position, in which lower and upper movement strut sections 242, 243 are in their lowermost position with respect to the fixed portion 241 of the upper tower support 24 (these three sections overlap in the view of FIG. 11). In the exemplary embodiment for sea vessel use, the height from ground to the upper landing 22 is approximately 20 feet. The sections 221, 222, 223, 224, 225 of the upper landing 22 are in the same orientation and have the same length shown in FIGS. 5 and 6. This, however, is merely an example of the dimensions. Dimensions can vary to fit multiple port/ship/terminal configurations.

In FIG. 12, the travellator supporting structure 60, 70 is in the intermediate raised position in which the tilt angle α is 15°. Thus, the lower supporting structure 62, 72 and the upper supporting structure 66, 76 have upper surfaces that are substantially parallel in this position and the upper surface of the intermediate supporting structure 64, 74 is at approximately a 15° angle α. In the intermediate raised position, the upper tower support 24 is in the first raised position, in which lower and upper movement strut sections 242, 243 are raised to the top of the fixed portion 241 of the upper tower support 24 (alternatively, the lower movement strut section 242 can be raised partially and the upper movement strut section 243 can be raised partially). In the exemplary embodiment for sea vessel use, the height from ground to the upper landing is now approximately 31'4.6875". The sections 221, 222, 223, 224, 225 of the upper landing 22 are in the same orientation and have the same length shown in FIGS. 7 and 8. This, however, is merely an example of the dimensions. Dimensions can vary to fit multiple port/ship/terminal configurations.

In FIG. 13, the supporting structure 60, 70 is in the raised position with the tilt angle α of approximately 30°. The lower supporting structure 62, 72 and the upper supporting structure 66, 76 have upper surfaces that are substantially parallel. The upper surface of the intermediate supporting structure 64, 74 is now at approximately a 30° angle α. In the raised position, the upper tower support 24 is in the second raised position, in which the lower movement strut section 242 is raised to the top of the fixed portion 241 of the upper tower support 24 and the upper movement strut section 243 is raised to the top of the lower movement strut section 242. In the exemplary embodiment for sea vessel use, the height from ground to the upper landing is now approximately 42'. To accommodate the further shortened horizontal extent of the intermediate supporting structure 64, 74, at least one of the adjustable portions 222, 224 of the upper landing 22 extends. In particular, sections 221, 222, 223, 224, 225 of the upper landing 22 are in the same orientation and have the same length shown in FIGS. 9 and 10. This, however, is merely an example of the dimensions that can occur. Dimensions can vary to fit multiple port/ship/terminal configurations.

The lower and upper movement strut sections 242, 243 are raised with a non-illustrated movement system. One exemplary embodiment of the movement system is a hydraulic lift. So that the entire load for lifting the lower and upper movement strut sections 242, 243 is not borne solely by the movement system, a second lift 80 is connected to the supporting structures 60, 70. This lift is illustrated in the form of a hydraulic piston. Actuation of the piston at the same time that the movement system raises the lower and upper movement strut sections 242, 243 allows the travellators 40, 50 to rise and lower as described herein.

Figure 14:
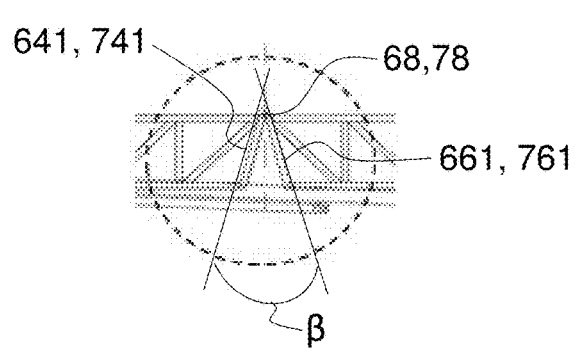
FIG. 14 is a fragmentary, enlarged, cross-sectional view of an upper pivoting portion of the gangway of FIG. 11.
Figure 15:
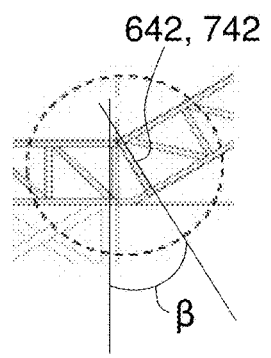
FIG. 15 is a fragmentary, enlarged, cross-sectional view of a lower pivoting portion of the gangway of FIG. 13.

If the lower supporting structure 62, 72, the intermediate supporting structure 64, 74, and the upper supporting structure 66, 76 were each rectangular, then pivoting of the intermediate supporting structure 64, 74 with respect to the other two would not be able to occur. At least two of these structures, therefore, are shaped with a cutout. In the embodiment of FIGS. 11 to 13, the intermediate supporting structure 64, 74 and the upper supporting structure 66, 76 define the cutout, as shown in the enlarged view of FIG. 14. In particular, the upper end 641, 741 of the intermediate supporting structure 64, 74 is not orthogonal to the side edges; the lower edge is shorter, thereby defining an angled upper end 641, 741. Similarly, the inner end 661, 761 of the upper supporting structure 66, 76 is not orthogonal to the side edges; the inner end 661, 761 is shorter, thereby defining an angled inner end 661, 761. Together these angled ends define a closing angle β that describes an arc of travel of the upper end 641, 741 about an upper pivot 68, 78. When the gangway is in the fully horizontal position (e.g., FIG. 11), the angled ends are open to their maximum angle β and when the gangway is in the raised position (e.g., FIG. 13), the angled ends are closed and touch one another (i.e., angle β=0°).

The angle between the opposite end of the intermediate supporting structure 64, 74, the lower end 642, 742, and the inner end 621, 721 of the lower supporting structure 62, 72 closes an opens opposite to the angle β. More particularly, when the gangway is in the fully horizontal position, the lower end 642, 742 touches the inner end 62, 721 (i.e., angle β=0°) and when the gangway is in the raised position, these ends are open to their maximum angle, which is equal to angle β. The ends, therefore, form natural stops for angular movement of the intermediate supporting structure 64, 74. If, the maximum angle β is formed as 20°, then the intermediate supporting structure 64, 74 will only be able to raise to an angle of 20°. The exemplary embodiment has the maximum angle β as approximately 30° and that is why the intermediate supporting structure 64, 74 can raise to an angle of approximately 30° as shown. The same geometric shaping occurs with the stairs of the stair travellator 40 as described in the following paragraphs.

Figure 16:
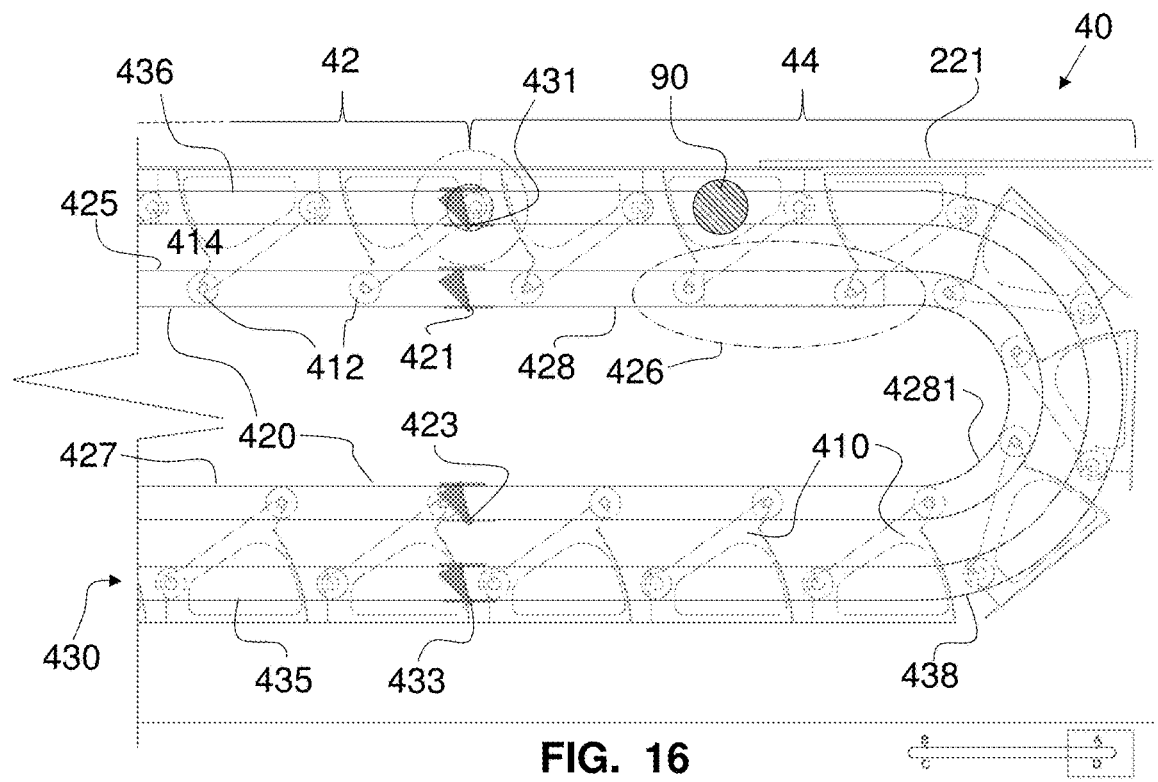
FIG. 16 is a fragmentary, partially transparent, side elevational view of an upper end of the stair travellator of the gangway of FIG. 5.
Figure 17:
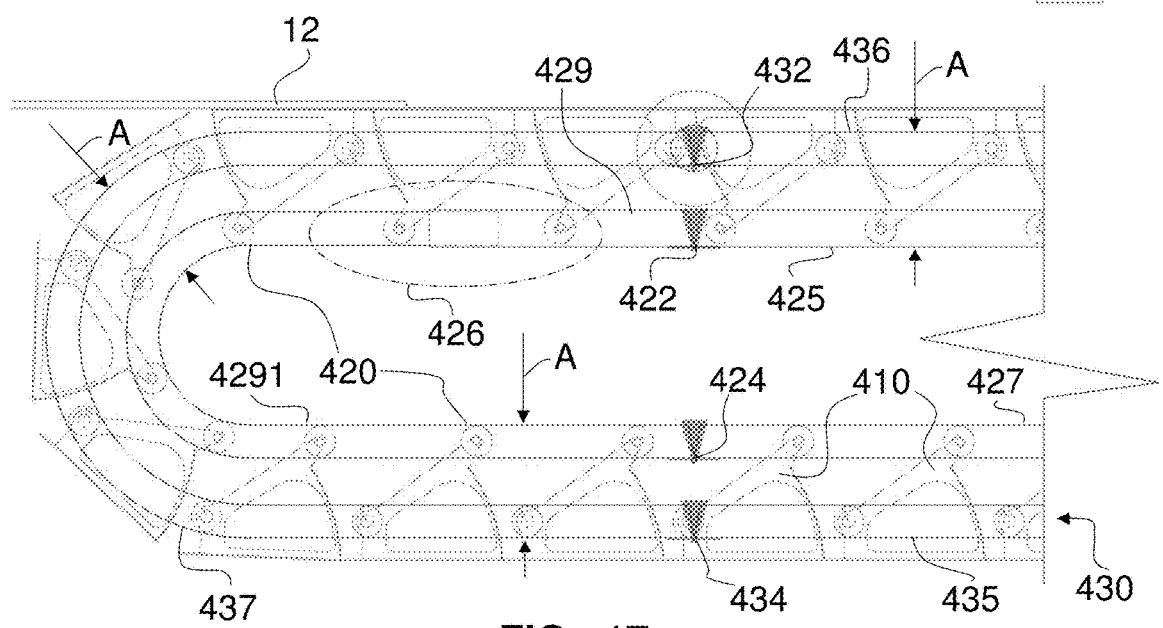
FIG. 17 is a fragmentary, partially transparent, side elevational view of a lower end of the stair travellator of the gangway of FIG. 5.
Figure 18:
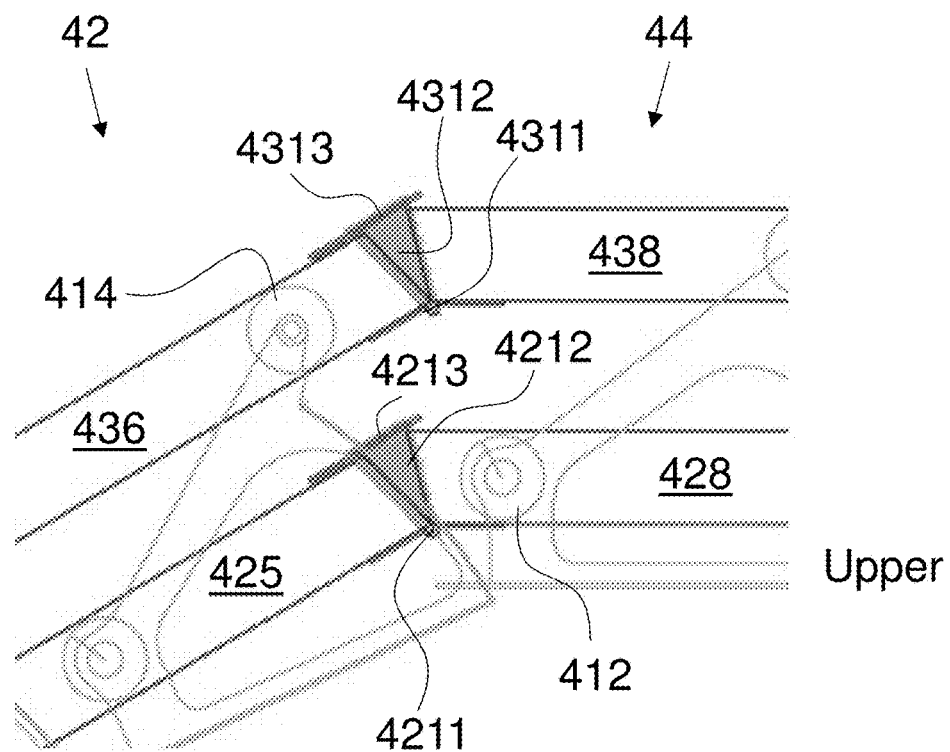
FIG. 18 is a fragmentary, enlarged, transparent, side elevational view of a portion of an upper pivot section of the stair travellator of the gangway of FIG. 23.
Figure 19:
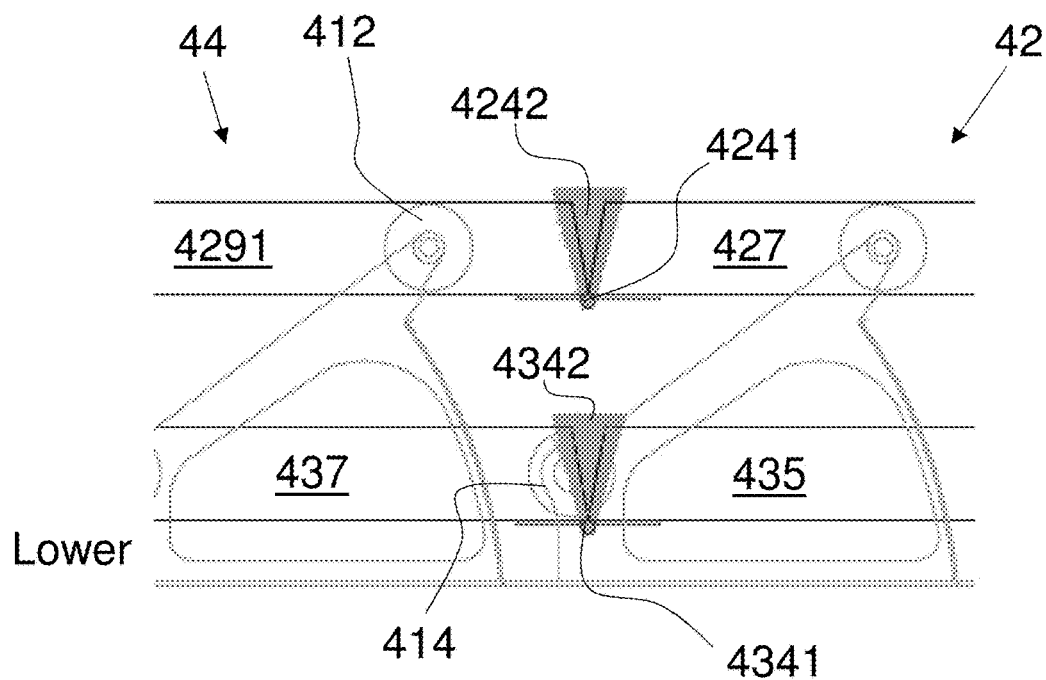
FIG. 19 is a fragmentary, enlarged, transparent, side elevational view of a portion of a lower pivot section of the stair travellator of the gangway of FIG. 17.
Figure 20:
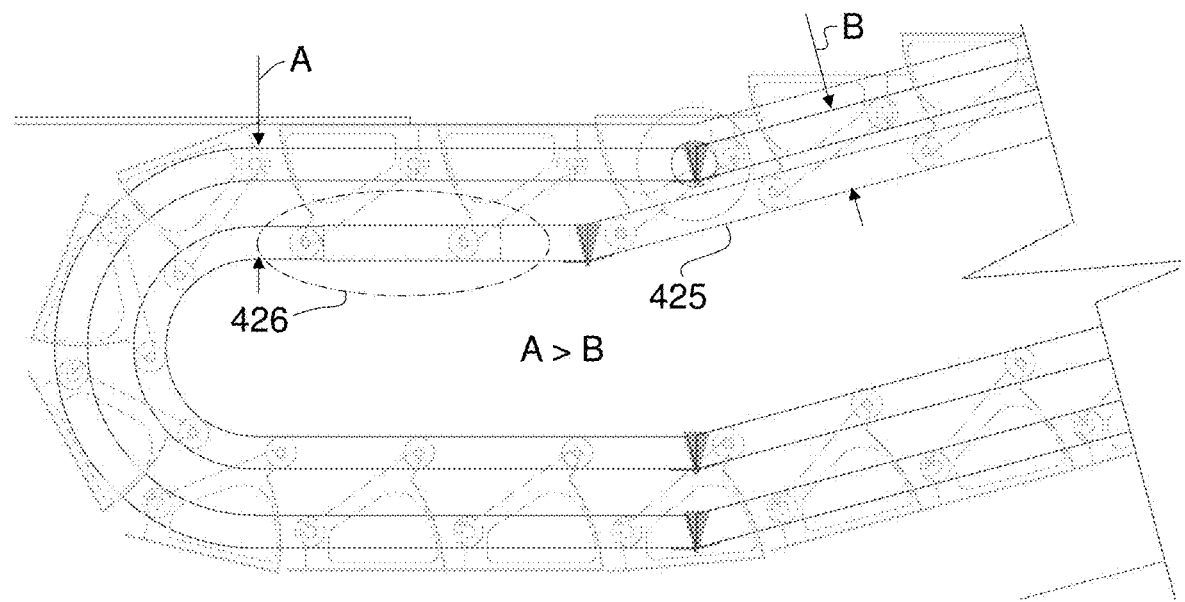
FIG. 20 is a fragmentary, partially transparent, side elevational view of a lower end of the stair travellator of the gangway of FIG. 7.
Figure 21:
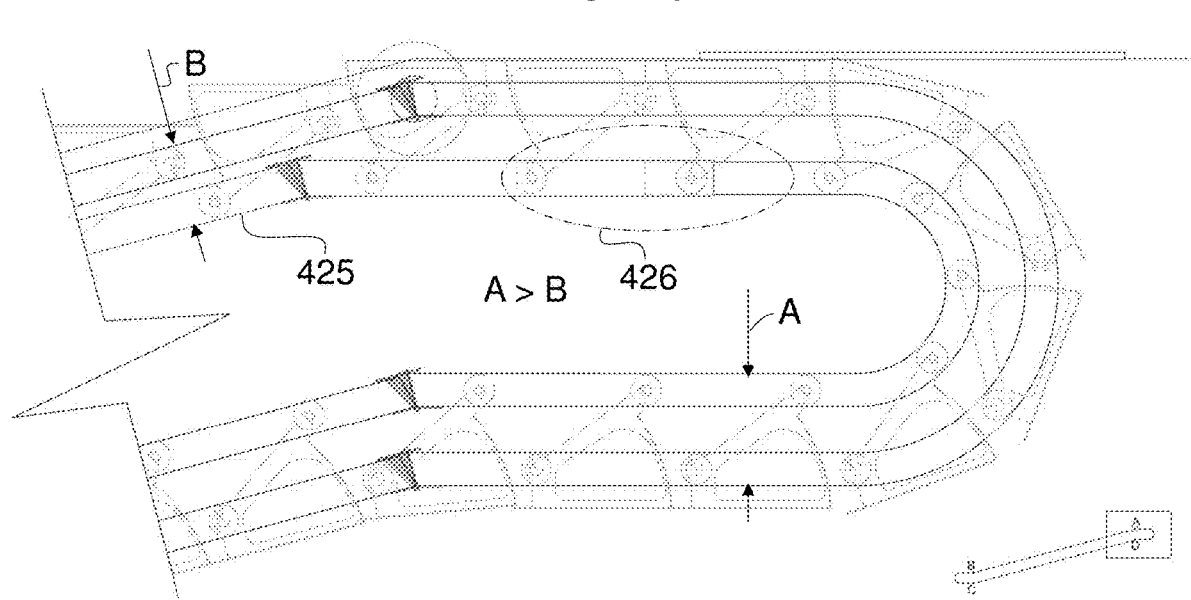
FIG. 21 is a fragmentary, partially transparent, side elevational view of an upper end of the stair travellator of the gangway of FIG. 7.
Figure 22:
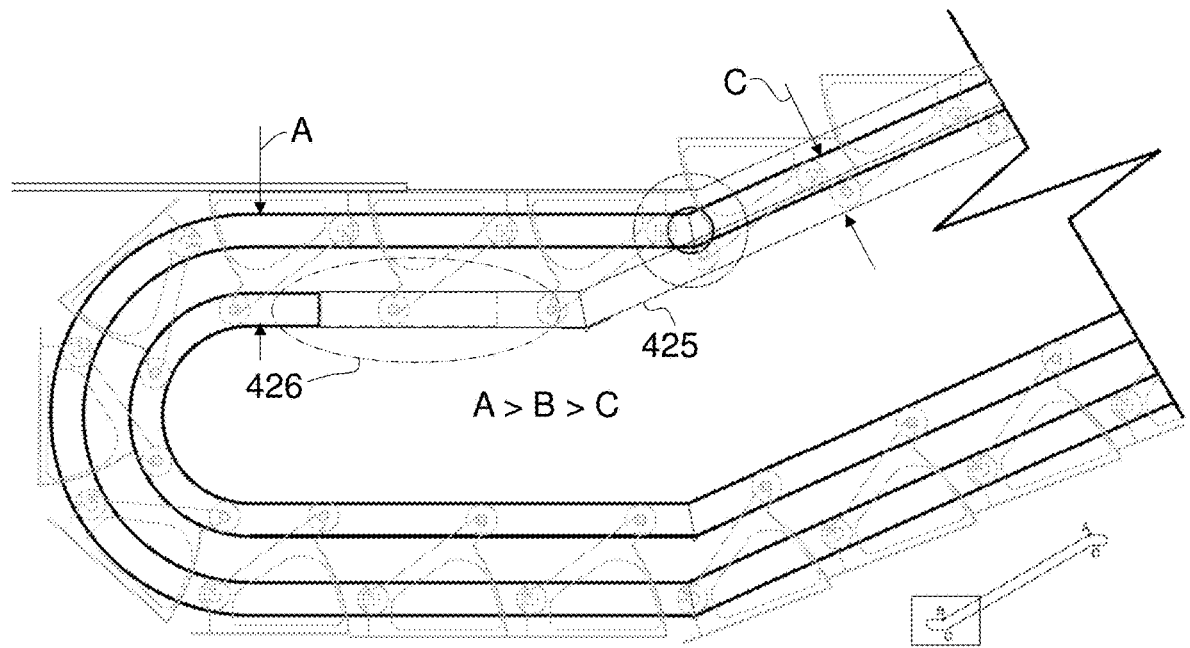
FIG. 22 is a fragmentary, partially transparent, side elevational view of a lower end of the stair travellator of the gangway of FIG. 9.
Figure 23:
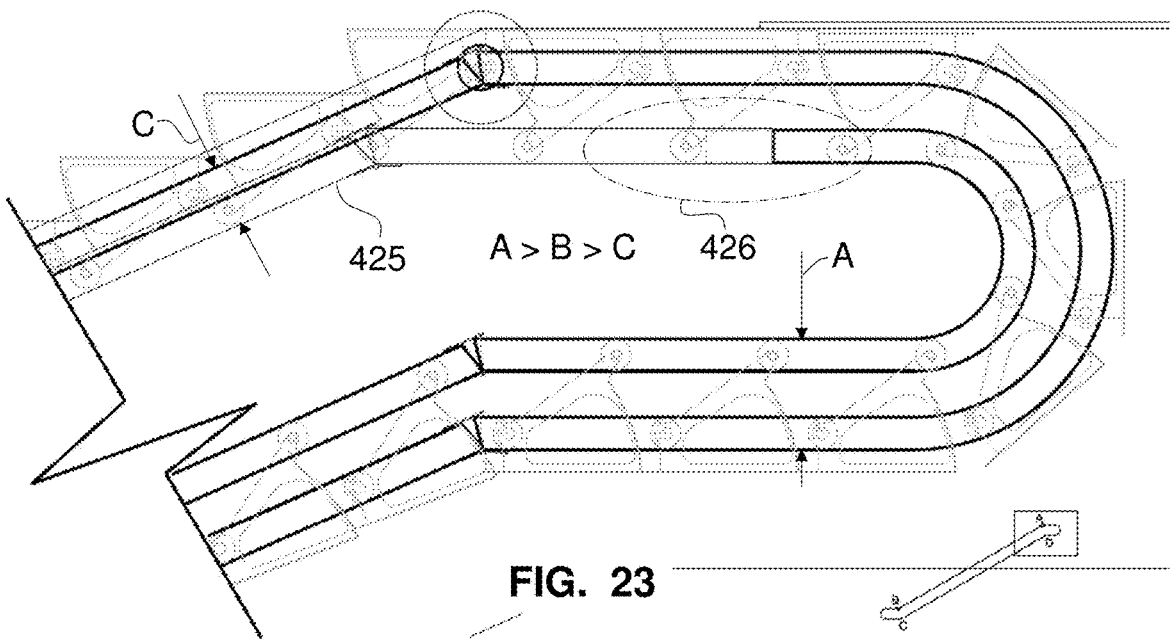
FIG. 23 is a fragmentary, partially transparent, side elevational view of an upper end of the stair travellator of the gangway of FIG. 9.
Figure 24:
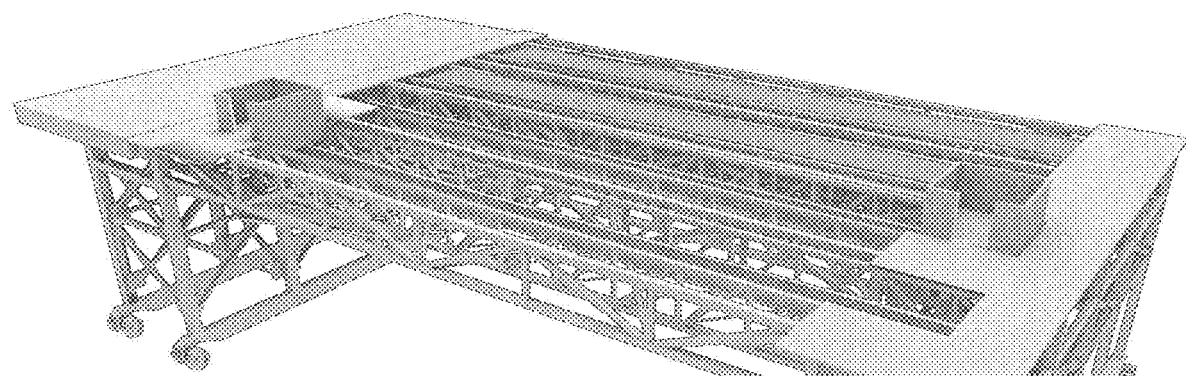
FIG. 24 is a perspective view of the gangway of FIG. 1 in the fully horizontal position with two gondola travellators and two stair travellators, the gondolas on opposite ends.
Figure 25:
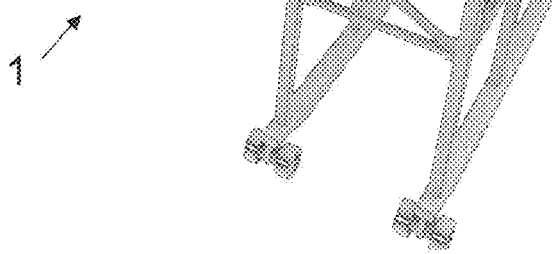
FIG. 25 is a perspective view of the gangway of FIG. 1 in the fully horizontal position with two gondola travellators and two stair travellators, the gondolas at intermediate positions.
Figure 25:
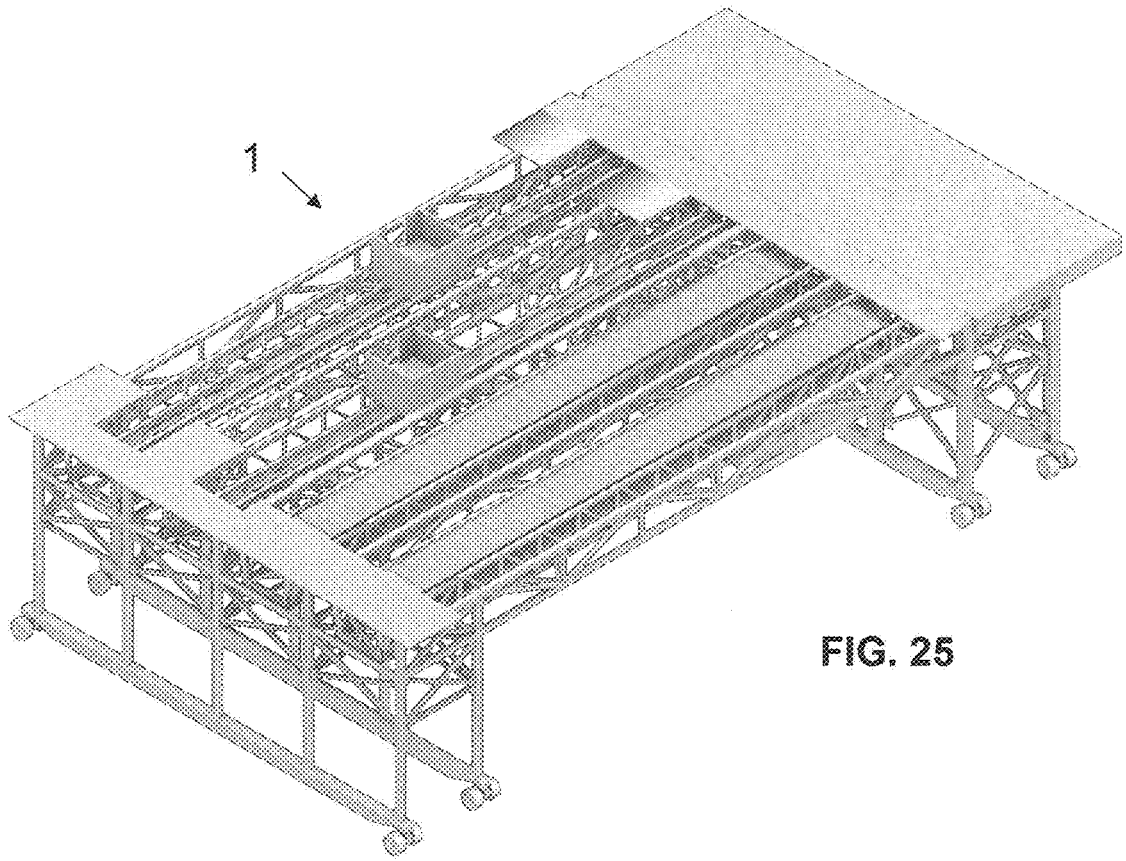
Figure 26:
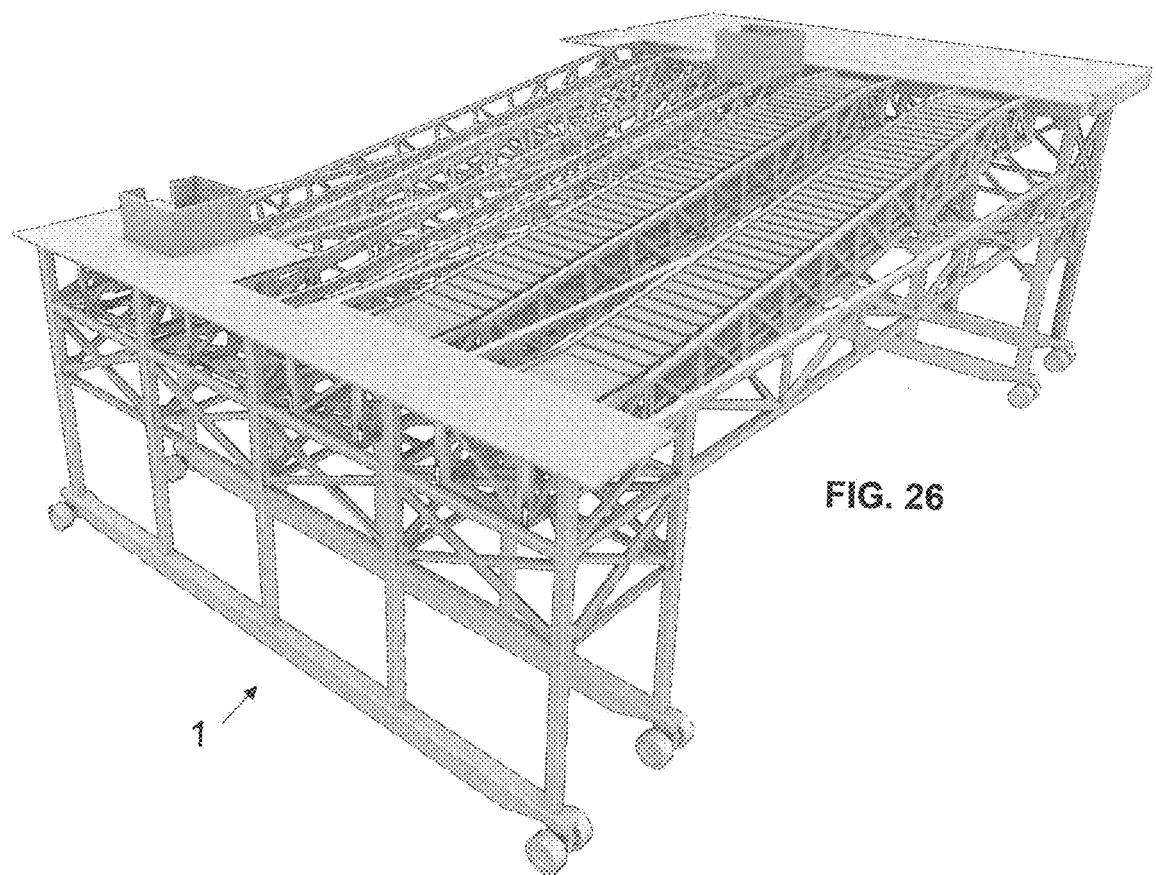
FIG. 26 is a perspective view of the gangway of FIG. 1 in a first intermediate raised position with the gondolas on opposite ends.
Figure 27:
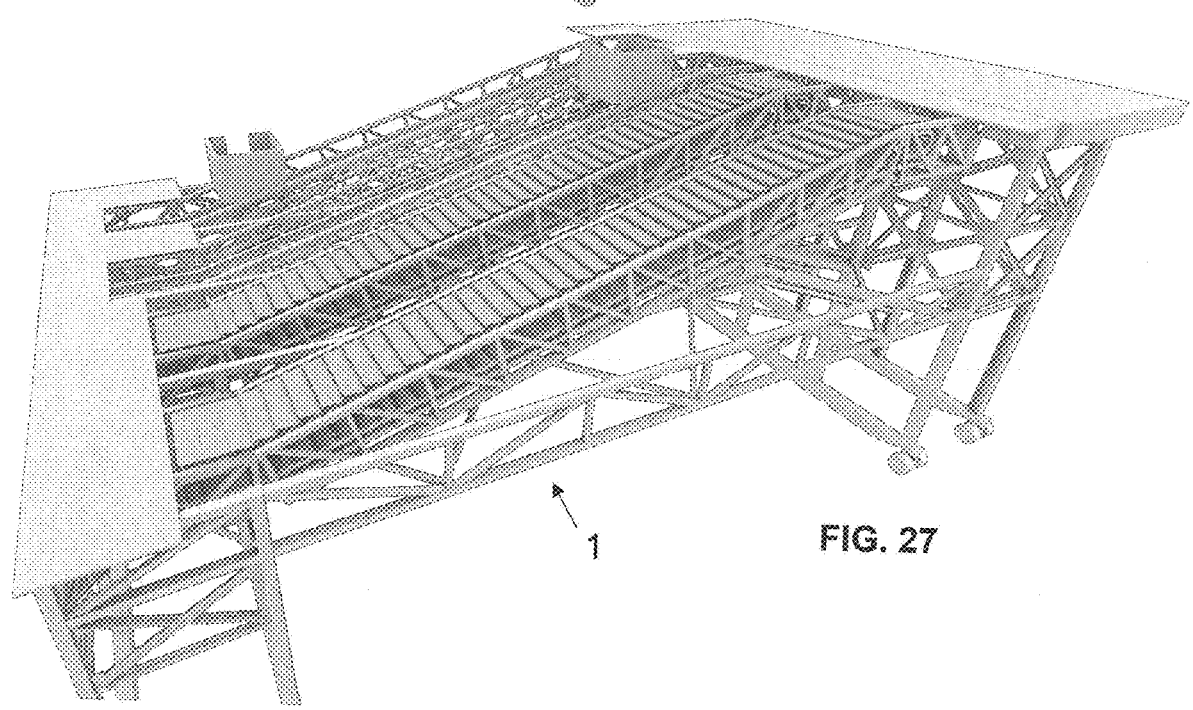
FIG. 27 is a perspective view of the gangway of FIG. 1 in the first intermediate raised position with the gondolas at intermediate positions.
Figure 28:
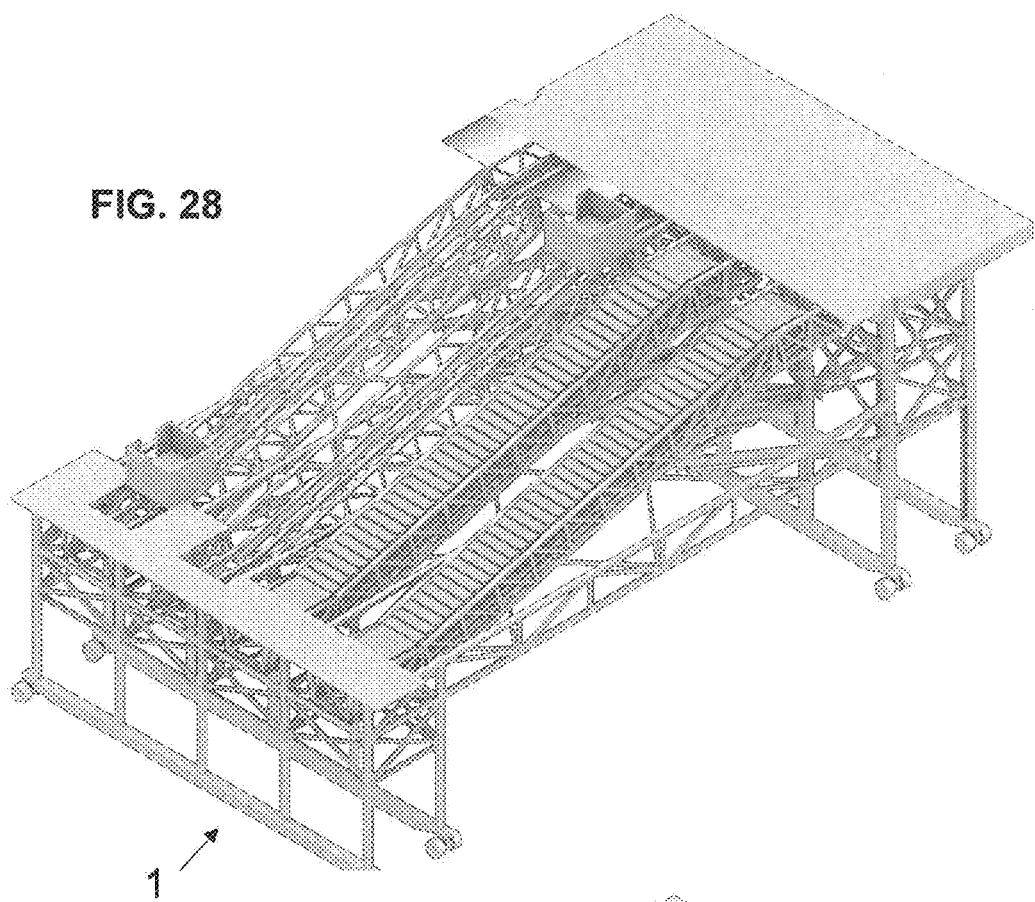
FIG. 28 is a perspective view of the gangway of FIG. 1 in a second intermediate raised position with the gondolas at end intermediate positions.
Figure 29:
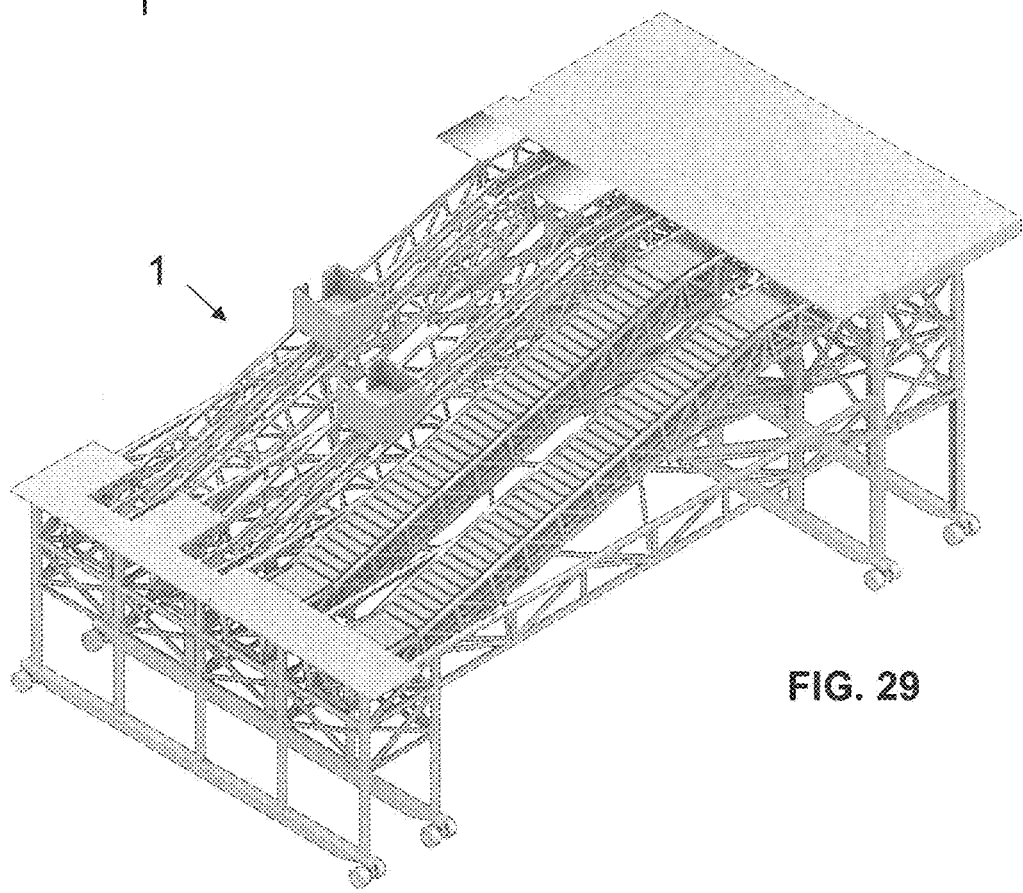
FIG. 29 is a perspective view of the gangway of FIG. 1 in the second intermediate raised position with the gondolas at intermediate positions.
Figure 30:
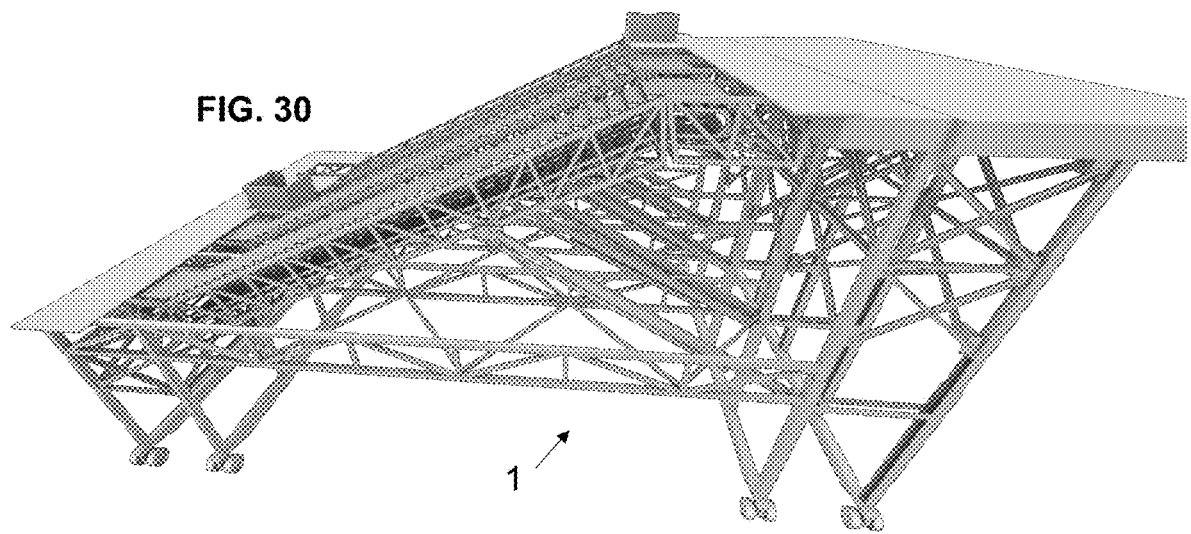
FIG. 30 is a perspective view of the gangway of FIG. 1 in a third intermediate raised position with the gondolas on opposite ends.
Figure 31:
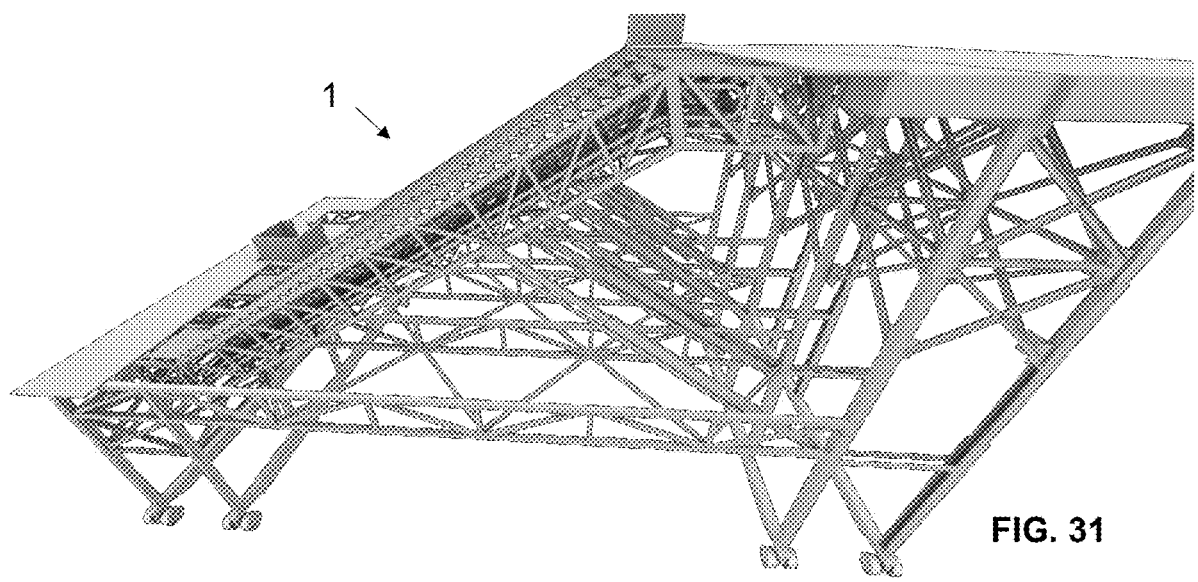
FIG. 31 is a perspective view of the gangway of FIG. 1 in a fourth intermediate raised position with the gondolas on opposite ends.
Figure 32:
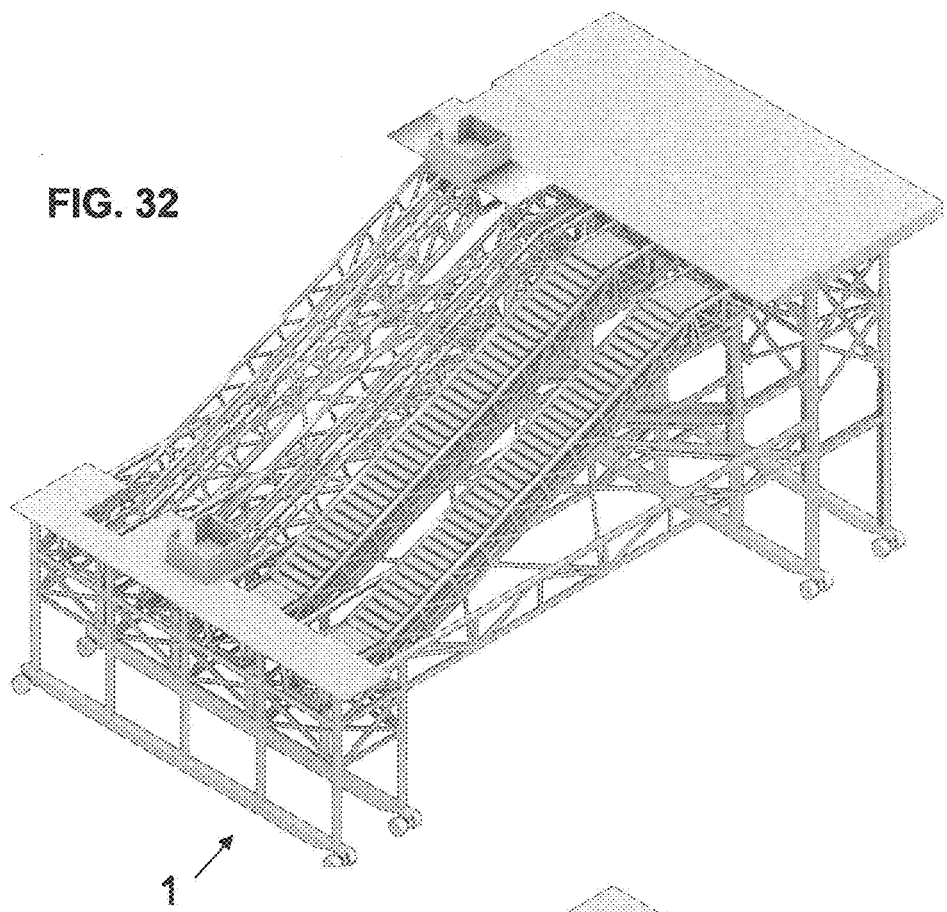
FIG. 32 is a perspective view of the gangway of FIG. 1 in a raised position with the gondolas on opposite ends.

FIGS. 16 to 27 show details of the stair travellator 40. FIGS. 16 and 17 show the stair travellator 40 in the fully horizontal position, FIGS. 18 and 19 show the stair travellator 40 in an intermediate raised position of approximately 15°, and FIGS. 20 and 21 show the stair travellator 40 in a raised position of approximately 30°. The stair travellator 40 operates in the same manner as a standard escalator, however, a standard escalator is constructed at a single fixed angle with no ability to raise and lower Like a standard escalator, the stair travellator 40 has a series of steps 410 and two tracks for the steps 410, an inner track 420 and an outer track 430. Each step 410 is associated with two sets of wheels 412, 414, each set of wheels 412, 414 respectively riding or translating in one of the two individual tracks 420, 430. In an exemplary embodiment, one set of the wheels 412, 414 is attached to the step 410 (one on each side) and another set of wheels is part of a step movement assembly 90 that, in an exemplary embodiment, includes a wheeled chain that travels within one of the tracks. Insofar as the inner 420 track is adjustable as described in further detail below, the wheeled chain in this exemplary embodiment rides within the outer track 430. The wheeled chain has a wheel 414 adjacent each side of each of the steps 410 and, in an exemplary embodiment, the adjacent wheel 414 has a hollow axle bearing to define an orifice into which an axle connector that is part of or attached to each step 410 is placed. In this manner, when the steps 410 are all attached to the wheels 414 of the wheeled chain and the wheels 412 are associated with the inner track 420, the steps 410 completely fill the raceway loop formed by the track to create an entire set of equally spaced and equal length stair steps with no spaces in between. The wheeled chain is only illustrated by the wheels 414 that are present in the outer track 430. The spaces between the wheels 414 are filled with other wheels on the wheeled chain but are not illustrated. Other portions of the step movement assembly include a transmission, a drive gear, and/or a motor. The wheeled chain is connected directly to a motor or to the transmission or drive gear that, in turn, are rotated by a motor at a speed that moves the steps 410 to transit users safely between the lower landing and the upper landing. The transmission, drive gear, and/or motor 90 and the attachment to the wheeled chain is/are illustrated only diagrammatically in FIG. 16.

The raceway of the tracks 420, 430 is comprised of various sections. The inner track comprises a fixed lower angled portion 427, a movable upper angled portion 425, an upper expandable/contractible telescoping section 428, a lower expandable/contractible telescoping section 429, an inner track first upper pivot 421, an inner track second upper pivot 422, an inner track first lower pivot 423, an inner track second lower pivot 424, an upper turn-around portion 4281, and a lower turn-around portion 4291. The upper turn-around portion 4281 comprises a lower end pivotally connected to an upper end of the fixed lower angled portion 427 by the inner track first lower pivot 423 and an upper end slidably connected to the upper expandable/contractible telescoping section 428. The lower turn-around portion 4291 comprises a lower end pivotally connected to a lower end of the fixed lower angled portion 427 by the inner track second lower pivot 424 and an upper end slidably connected to the lower expandable/contractible telescoping section 429. The inner track first upper pivot 421 pivotally connects the movable upper angled portion 425 to the upper expandable/contractible telescoping section 428 and the inner track second upper pivot 422 pivotally connects the movable upper angled portion 425 to the 429 lower expandable/contractible telescoping section.

The outer track comprises, a lower angled portion 435, an upper angled portion 436, an outer track first upper pivot 431, an outer track second upper pivot 432, an outer track first lower pivot 433, an outer track second lower pivot 434, a lower turn-around portion 437, and an upper turn-around portion 438. The lower turn-around portion 437 comprises a lower end pivotally connected to a lower end of the lower angled portion 435 by the outer track second lower pivot 434 and an upper end pivotally connected to a lower end of the upper angled portion 436 by the outer track second upper pivot 432. The upper turn-around portion 438 comprises a lower end pivotally connected to an upper end of the lower angled portion 435 by the outer track first lower pivot 433 and an upper end pivotally connected to an upper end of the upper angled portion 436. Responsive to movement of the upper landing by the expandable struts 241, 242, 243 (and 3241, 3242) towards and away from the upper movement assembly, the lower and upper expandable/contractible telescoping sections 428, 429 slide along the lower and upper turn-around portions 437,438, respectively, to translate the movable upper angled portion 425 towards and away from the upper angled portion 436 of the outer track.

At the top and bottom of the stair travellator 40, the steps 410 level off to a horizontal position to allow the user to enter and exit a step 410, which step 410 is substantially level to the top surface of either the lower landing 12 or the upper landing 22. The inner and outer tracks 420, 430 are spaced apart from one another in the second stair portion 44 (both upper and lower) so that each step on the top side of the stair travellator will remain level for a distance either between the lower landing 12 and the first stair portion 42 (e.g., FIG. 17) or between the first stair portion 42 and the escape landing 221 of the upper landing 22 (e.g., FIG. 16). Each step has a series of grooves so that it will fit together with each adjacent step in front and behind that step during the flattening. The motor also moves handrails, which are not illustrated in any of the exemplary embodiments for clarity. It is understood that handrails are present where needed for rider stability.

The difference between the stair travellator 40 and standard escalators is that the stair travellator 40 can pivot. To allow the stair travellator 40 to pivot, two structures are present. First, each of the tracks 420, 430 have track pivots at the junction where there first stair portion 42 meets each of the second stair portion 44. In particular, the inner track 420 has an inner track first upper pivot 421, an inner track second upper pivot 422, an inner track first lower pivot 423, and an inner track second lower pivot 424 Likewise, the outer track 430 has an outer track first upper pivot 431, an outer track second upper pivot 432, an outer track first lower pivot 433, and an outer track second lower pivot 434. Second, the inner track 420 is adjustable, which adjustability is depicted in the progression of FIGS. 16/17 and 18/19 and 20/21 and is explained below.

In an exemplary embodiment, the inner track 420 is a C-channel. In such a configuration, the C-channel has a bottom horizontal shelf, a vertical outer wall, and a top horizontal ceiling. The wheel 412 rides along the bottom horizontal shelf of the C-channel and is prevented from moving laterally outwards from the step 410 by the vertical outer wall. The top horizontal ceiling is located to prevent the wheel 412 from moving vertically away from the bottom horizontal shelf past a given clearance. The clearance is very small (e.g., one or a few millimeters) so that the wheel does not touch the top horizontal ceiling at the same time it is touching the bottom horizontal shelf, as such touching would prevent the wheel 412 from rolling. Alternatively, the clearance can be larger than a few millimeters (e.g., up to a centimeter).

The inner upper track pivot 421, 423 and the outer upper track pivot 431, 433 have a similar structure and the inner lower track pivot 422, 424 and the outer lower track pivot 432, 434 have a similar structure, accordingly, description of the pivots is made with reference to FIGS. 18 and 19, respectively, which figures show only the inner track first upper pivot 421/outer track first upper pivot 431 and the inner track second lower pivot 424/outer track second lower pivot 434, respectively. The following description applies to each of the pivots of the stair travellator 40 without repetition for reasons of brevity. When the first stair portion 42 pivots, if nothing was present at the pivot point, each track 420, 430 would have an open gap. To close this gap (and insure that the wheels 412, 414 remain in the respective tracks 420, 430), each track pivot (421, 422, 423, 424, 431, 432, 433, 434) includes a structure that retains capture of the wheels 412, 414 by the C-channel. With regard to the upper pivots, each pivot 421, 432 has a horizontally disposed pivot axle 4211, 4311, a vertical outer wall 4212, 4312, and an upper ceiling 4213, 4313. In an exemplary embodiment, the upper ceiling 4213, 4313 is fixed to the outer upper surface of the end of the first stair portion 42 and extends away from the upper end of the first stair portion 42 to a distance. In an exemplary embodiment, the distance is at least a length of the gap that is formed when the first stair portion 42 pivots away from the upper second stair portion 44. This pivot of the upper ceiling 4213, 4313 is visible in FIGS. 21 and 23. The vertical outer wall 4212, 4312 of the upper pivot structures needs only to cover a triangular shape at a maximum tilt of the first stair portion 42 and, therefore, the vertical outer wall 4212, 4312 can have a triangular shape in an exemplary embodiment. However, the vertical outer wall 4212, 4312 can also have a different shape. The vertical outer wall 4212, 4312 is next to or fixed to the vertical outer wall of the C-channel where the pivot occurs. The vertical outer wall 4212, 4312 can be fixed to the side of the upper ceiling 4213, 4313 (as in an L-shape), or it can be fixed to the outside surface of the vertical side wall of the C-channel at the upper end of the first stair portion 42 to extend away from that end, or it can be fixed to the outside surface of the vertical side wall at the pivot end of the C-channel of the second stair portion 44 to extend away from that end. In either configuration, when the first stair portion 42 pivots from the upper second stair portion 44, any gap that occurs at the vertical side wall of the inner or outer tracks 420, 430 is covered and the wheels 412, 414 remain in their respective tracks 420, 430.

With regard to the lower pivots, each pivot 424, 434 has a horizontally disposed pivot axle 4241, 4341 and a vertical outer wall 4242, 4342. The vertical outer wall 4242, 4342 of the lower pivot structures needs only to cover a triangular shape at the fully horizontal position of the first stair portion 42 and, therefore, the vertical outer wall 4242, 4342 can have a triangular shape in an exemplary embodiment. However, the vertical outer wall 4242, 4342 can also have a different shape. The vertical outer wall 4242, 4342 is next to or fixed to the vertical outer wall of the C-channel where the pivot occurs. The vertical outer wall 4242, 4342 can be fixed to an outer end of the pivot axle 4241, 4341, or to the outside surface of the vertical side wall of the lower end of the C-channel of the first stair portion 42 to extend away from that end, or it can be fixed to the outside surface of the vertical side wall of the C-channel at the pivot end of the second stair portion 44 to extend away from that end. In either configuration, when the first stair portion 42 pivots from the lower second stair portion 44, any gap that occurs at the vertical side wall of the inner or outer tracks 420, 430 is covered and the wheels 412, 414 remain in their respective tracks 420, 430.

As can be seen in FIG. 17, a distance A from the outer edge of the outer track 430 to the inner edge of the inner track 420 is the same throughout the stair travellator 40 when the gangway 1 is in the fully horizontal position. However, when the first stair portion 42 pivots, as shown in FIGS. 18 and 19, the distance of these edges on the inner and outer tracks 420, 430 on the first stair portion 42 becomes smaller B and smaller C as the first stair portion 42 continues to pivot away from horizontal. Closing of the gap between the inner and outer tracks 420, 430 on the first stair portion 42 occurs because of the presence of an expandable/contractible section 426 (circled with a dot-dot-dash lines in FIGS. 16 and 17), which also is referred to herein as a telescoping section 426. The term expandable/contractible section is used in a broadest meaning to any structure that allows a portion of the inner track to linearly expand and/or contract. This expansion/contraction can occur through various mechanical structures. The exemplary embodiment illustrated in the figures, particularly in FIGS. 16, 17, and 20 to 23, is a telescoping version of a C-channel and, therefore, the exemplary embodiment is referred to herein as telescoping section 426.

As shown in FIG. 16, the outer track 430 is entirely fixed within the upper second stair portion 44 from an outer track first upper pivot 431 to an outer track first lower pivot 433. Likewise, the outer track 430 is entirely fixed within the lower second stair portion 44 (shown in FIG. 17) from the outer track second upper pivot 432 to the outer track second lower pivot 434. The inner track 420 in contrast to the outer track 430 includes the telescoping section 426. The telescoping section 426 is formed by overlapping segments of the inner track 420 between the inner track first upper pivot 421 and the upper turn-around of the inner track raceway (in FIG. 16) and between the inner track second upper pivot 422 and the lower turn-around of the inner track raceway (in FIG. 17). The overlapping segment is formed by nesting two lengths of the inner track's C-channel in one another, which means that one is contained within the other. The order of nesting can be either the upstream end nested within the downstream end or the downstream end nested within the upstream end. In this regard, the outer overlapping segment is formed to be slightly larger than the inner overlapping segment through the overlapping extent and then reduces to approximately the same size outside the overlap. As is seen in FIGS. 16, 17, and 20 to 23, the telescoping section 426 remains horizontal throughout the pivot from the fully horizontal position to the raised position. In an exemplary embodiment, the nested overlapping segments are kept together with at least one pin-and-groove connection, in which one of the overlapping segments has at least one longitudinal groove and the other has at least one pin that can only move within and along the groove (or multiple pins within a single groove). If the at least one pin projects through the at least one groove of the outer overlapping segment and has a head (e.g., a nut or rivet) opposite the inner segment, then the two overlapping segments will not part from one another as they slide longitudinally along one another. In the progression of these figures, in FIG. 16, the upper telescoping section 426 overlaps to approximately a distance between two adjacent wheels in the fully horizontal position. In FIG. 21, the upper telescoping section 426 overlaps to approximately one-third of the distance between two adjacent wheels in the raised position. Finally, in FIG. 23, the upper telescoping section 426 overlaps to approximately one-half of the distance between two adjacent wheels in the intermediate raised position. With regard to the lower telescoping section 426, in FIG. 17, the lower telescoping section 426 overlaps to approximately one-third of the distance between two adjacent wheels in the fully horizontal position. In FIG. 20, the lower telescoping section 426 overlaps to approximately the distance between two adjacent wheels in the intermediate raised position. Finally, in FIG. 22, the lower telescoping section 426 overlaps to approximately the distance between two adjacent wheels in the raised position. In the raised position where the travellator is at its highest pivoting angle, the telescoping sections 426 have extended the moving portion 425 of the inner track 420 (located between the inner track first upper pivot 421 and the inner track second upper pivot 422) horizontally as far as it can go so that (in an exemplary embodiment where the inner and outer tracks 420, 430 are vertically in line) the moving portion 425 contacts the outer track 430 of the first stair portion 42, this contact being shown in FIGS. 22 and 23. If, in an alternative embodiment where the outer track 430 is laterally wider than the inner track 420, then it is possible for the first stair portion 42 to pivot slightly more before contact is made.

Figure 33:
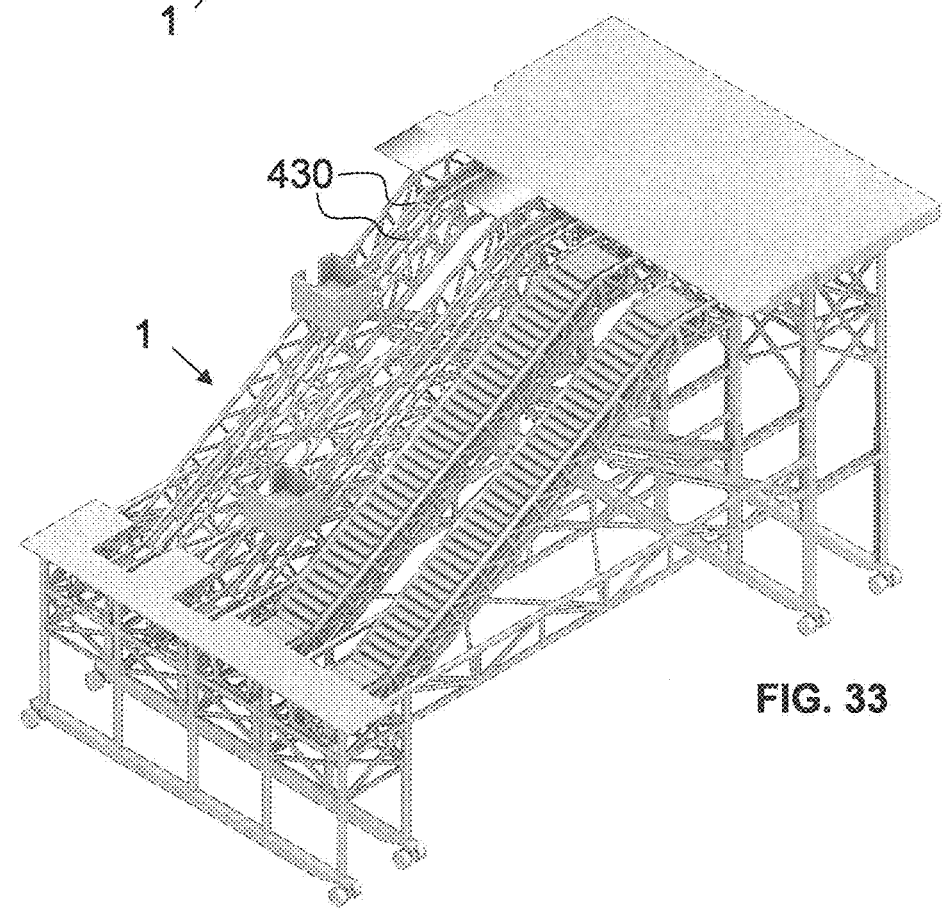
FIG. 33 is a perspective view of the gangway of FIG. 1 in the raised position with the gondolas at intermediate positions.
Figure 34:
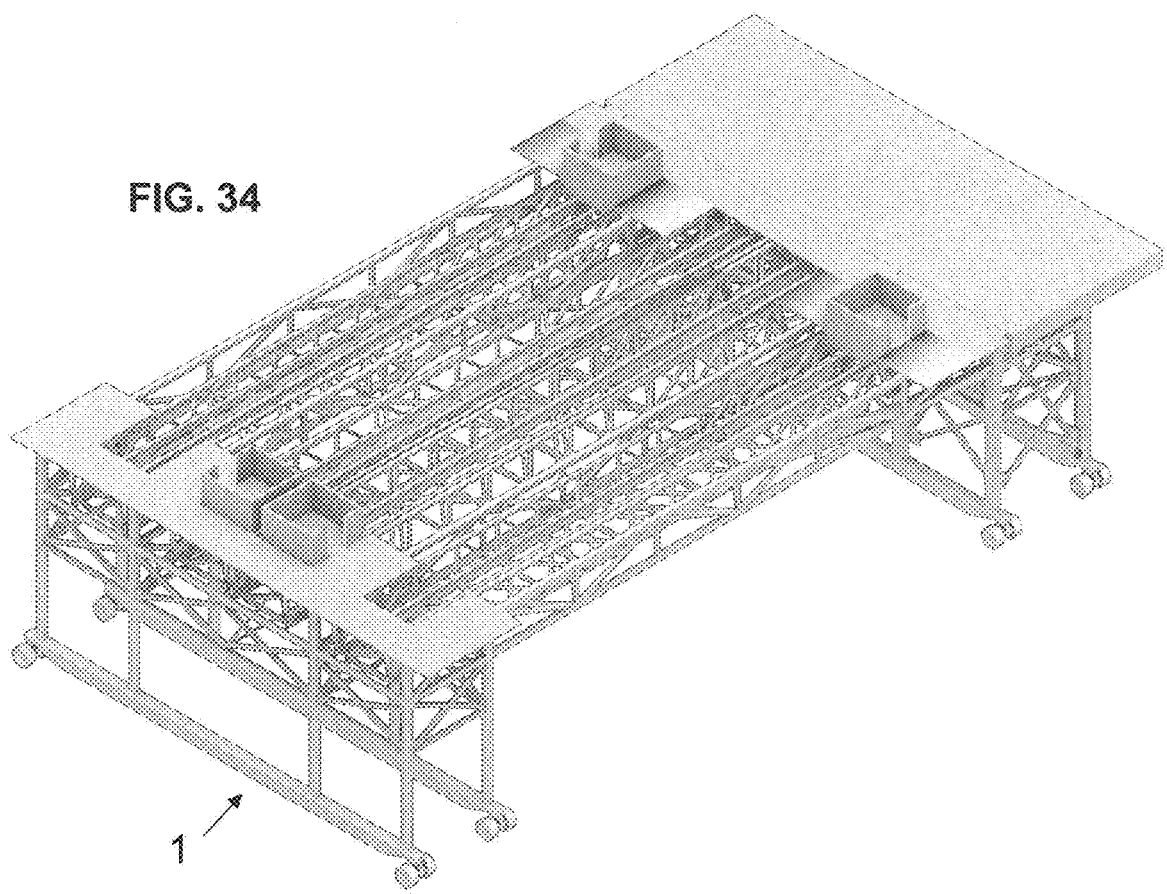
FIG. 34 is a perspective view of an exemplary embodiment of a portable, height-adjustable gangway in a fully horizontal position with four gondola travellators at lower and upper end points.
Figure 35:
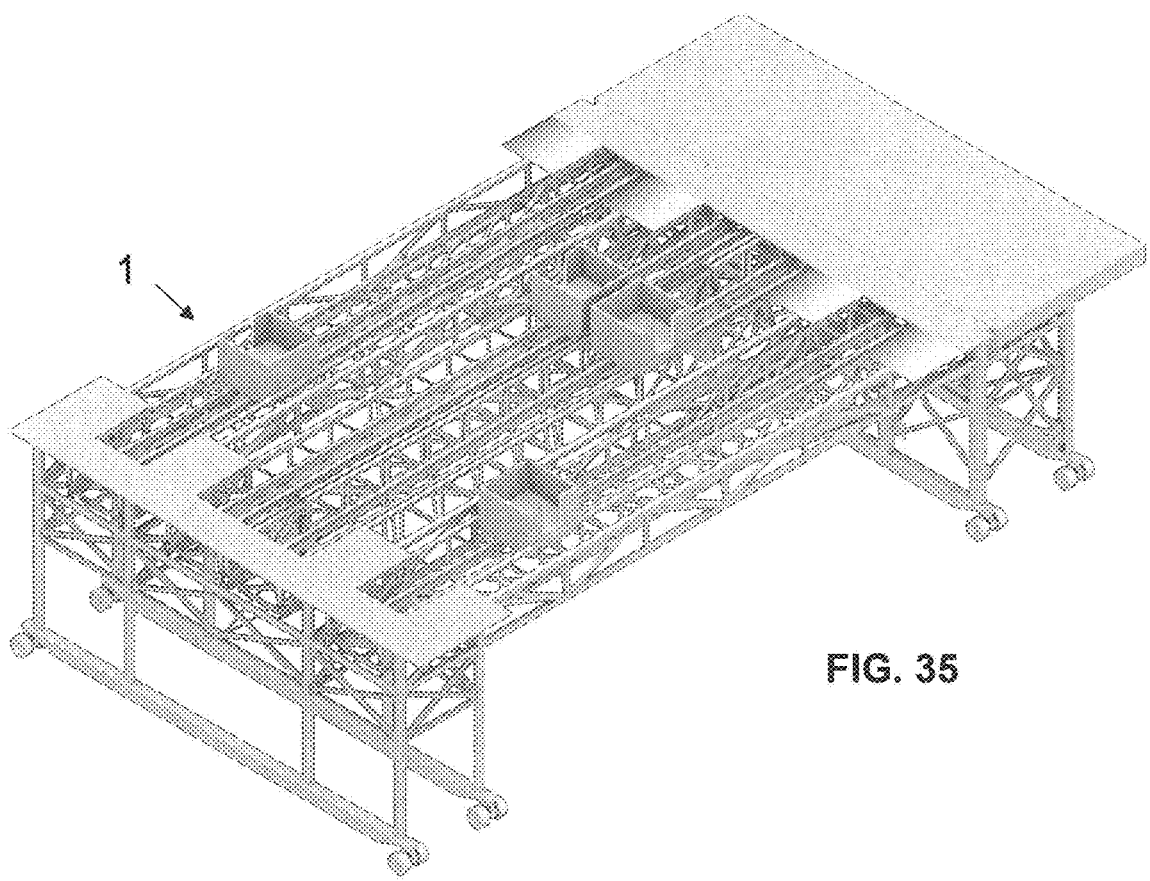
FIG. 35 is a perspective view of the gangway of FIG. 34 with the gondolas at intermediate positions.
Figure 36:
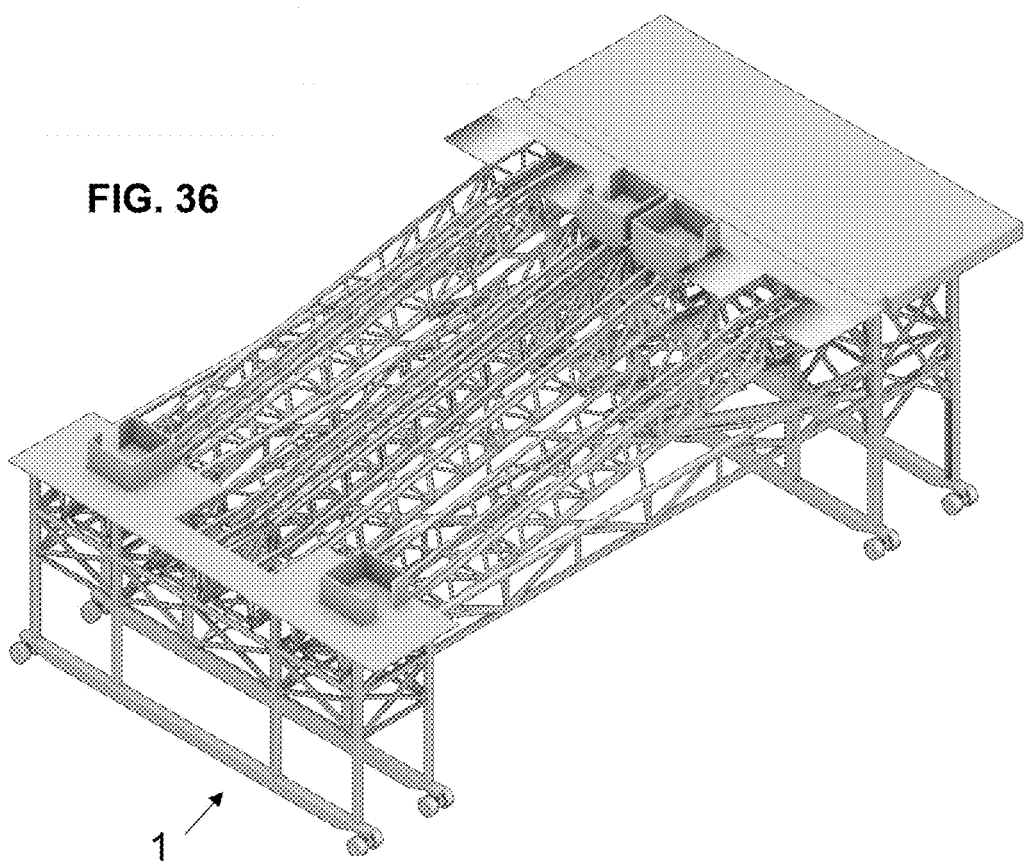
FIG. 36 is a perspective view of the gangway of FIG. 34 in a first intermediate raised position with the gondolas at lower and upper end points.
Figure 37:
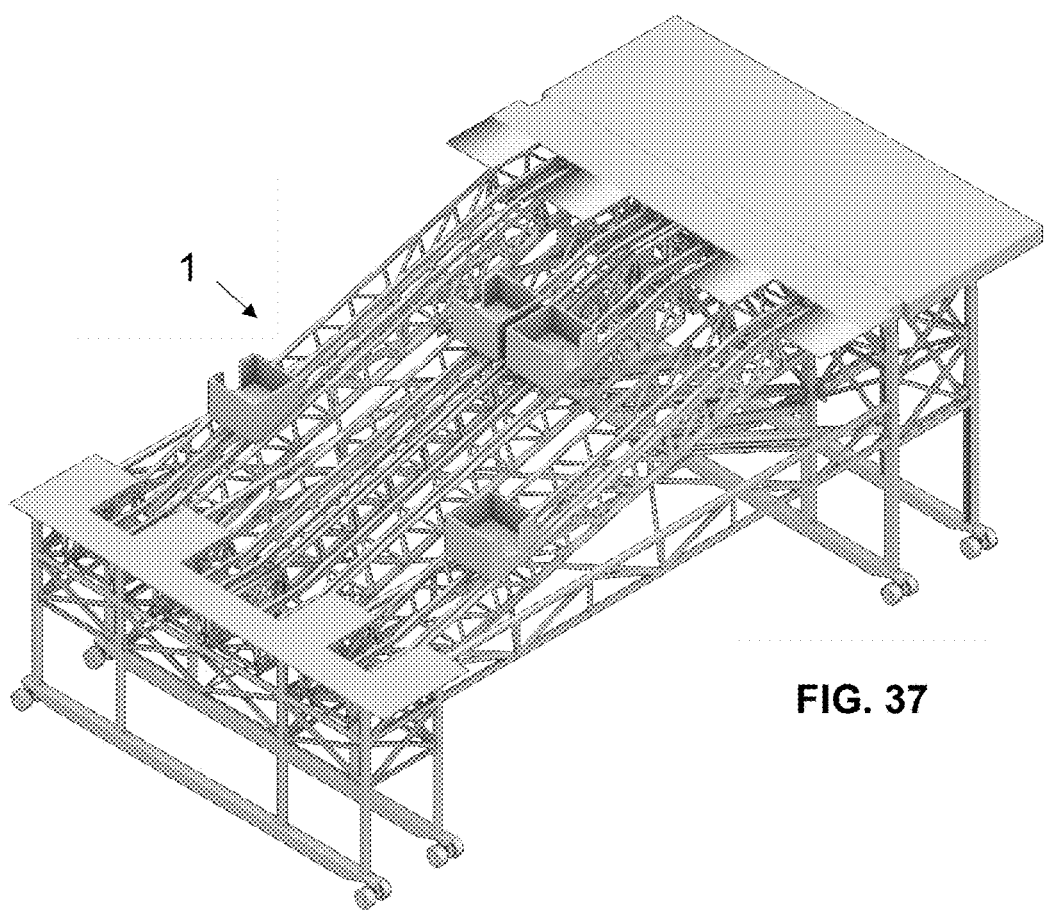
FIG. 37 is a perspective view of the gangway of FIG. 34 in a second intermediate raised position with the gondolas at intermediate positions.

Herein, the stair travellators 40 have been described in detail. The gondola travellators 50 have many similar features to the stair travellators 40 and these details are not repeated herein for reason of brevity. For example, the lower supporting structures 62, 72, the intermediate supporting structures 64, 74, and the upper supporting structures 66, 76 can be the same physical structures and, if so, costs could be saved due to the modularity of these components. The primary difference between the two travellators 40, 50 is that the gondola 58 is a single device that moves along the travellator 50 between the lower landing 12 and the upper landing 22. Accordingly, the gondola 58 is analogous to a single step of the stair travellator 40 and, therefore, the gondola 58 is referred to herein as a step. To keep the gondola 58 laterally and longitudinally parallel to ground the travel guides for the gondola 58 can be the same two sets of wheels 18, 28 that travel in the same lower and upper tracks 420, 430 except there is no need to have a turn-around at the distal ends of the tracks 420, 430. One pair of the parallel gondola upper tracks 430 extend at the bottom of the floor of the lower supporting structure 72, the intermediate supporting structure 74, and the upper supporting structure 76 as shown, for example, in FIGS. 3 and 33. In an exemplary embodiment, the gondola 58 is lowered/raised/moved between the lower and upper landings 12, 22 with a non-illustrated cable system connected to a non-illustrated motor.

FIGS. 24 to 39 illustrate various exemplary configurations of the gangway 1 in various raised orientations. FIGS. 24 to 33 illustrate the gangway 1 with two stair travellators 40 and two gondola travellators 50. FIGS. 34 to 42, in comparison, illustrate the gangway 1 with four gondola travellators 50. Gondola travellators 50 work especially well with transporting cargo and persons who travel in wheelchairs.

FIGS. 40 to 46 illustrate another exemplary embodiment of a portable, height-adjustable gangway 100. The stair travellators 40 and the gondola travellators 50 in this exemplary embodiment can be any of the configurations shown and described with respect to other embodiments described herein and, therefore, the particular details of the stair travellators 40 and the gondola travellators 50 are not repeated. Here, the lower and upper movement assemblies 116, 118 roll the gangway 100 in the same direction as movement of the travellators 40, 50. Alternatively, the lower and upper movement assemblies 116, 118 roll the gangway 100 in a direction at an angle to the movement of the travellators 40, 50, for example, in an orthogonal direction.

Figures 40, 41:
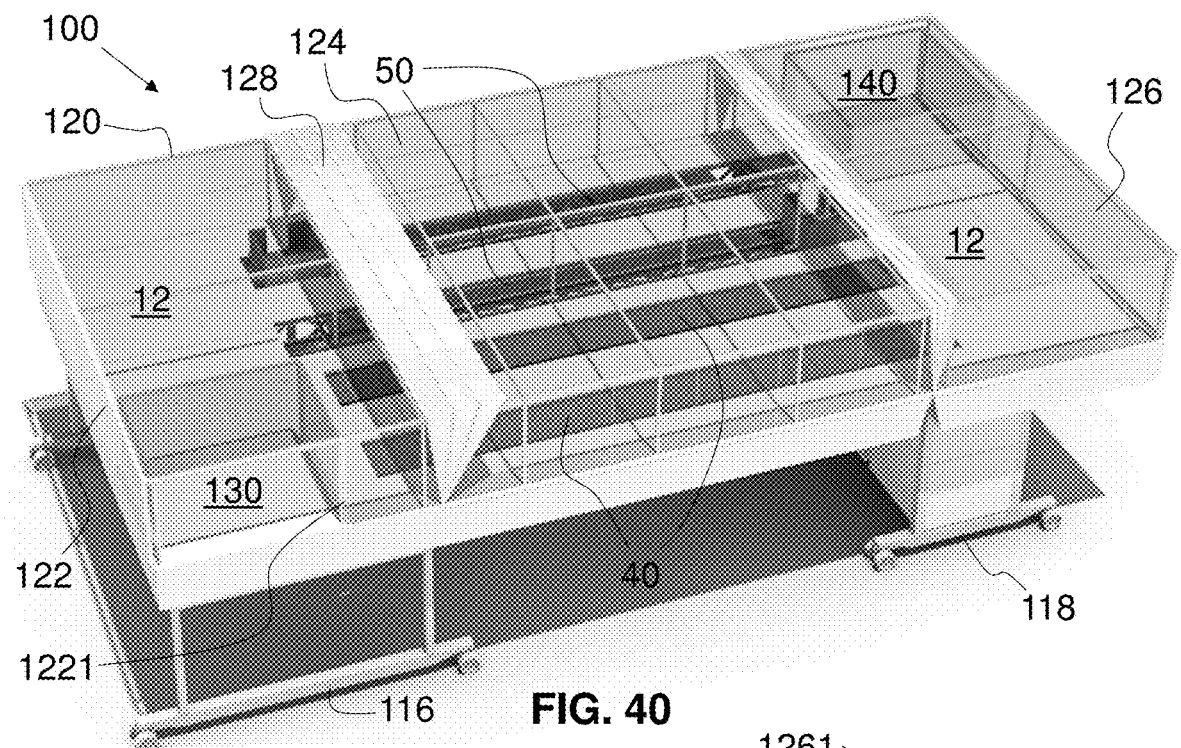
FIG. 40 is a perspective view of an exemplary embodiment of a portable, height-adjustable gangway in a fully horizontal position with two gondola travellators, two stair travellators, upper and lower extendable walkways, and a roof structure with connecting accordions.
FIG. 41 is a perspective view of the gangway of FIG. 40 raised to a first intermediate position and with the lower extendable walkway extended laterally.
Figure 42:
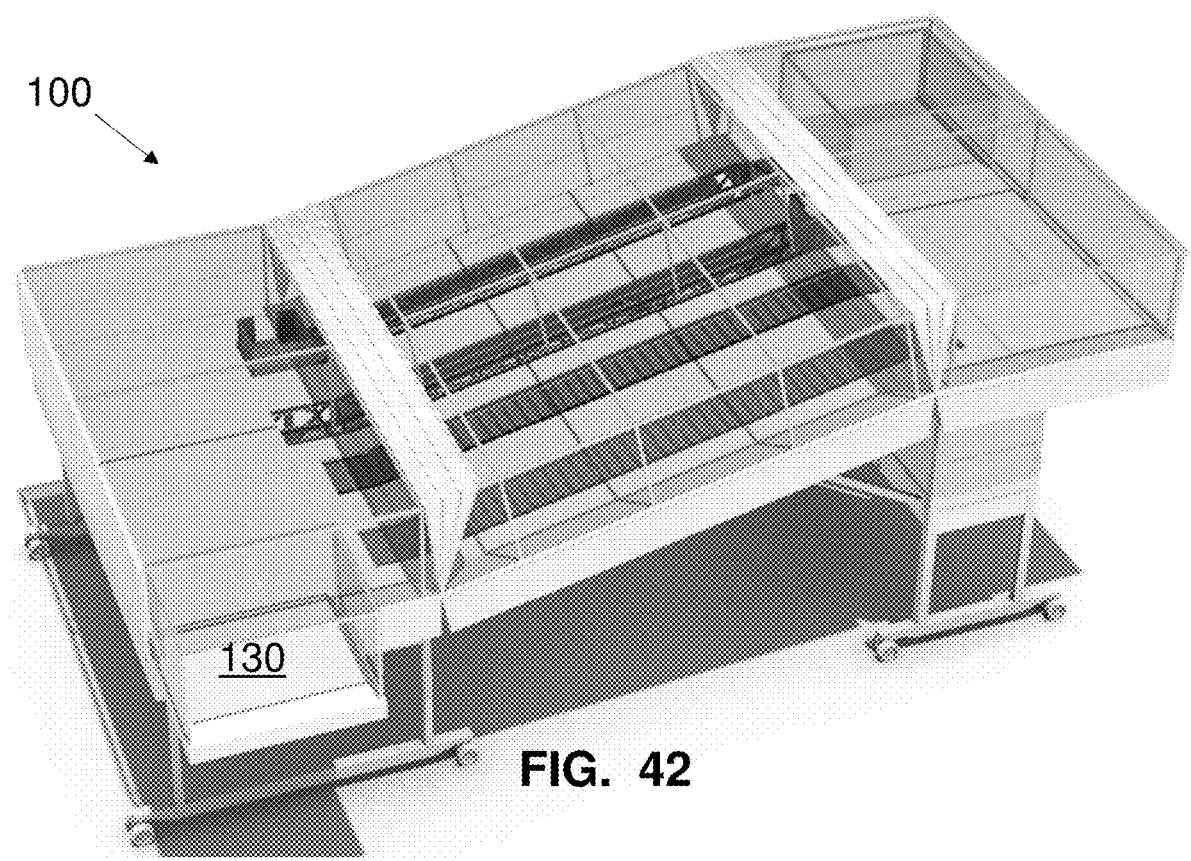
FIG. 42 is a perspective view of the gangway of FIG. 40 raised to a second intermediate position and with the lower extendable walkway extended laterally.
Figure 43:
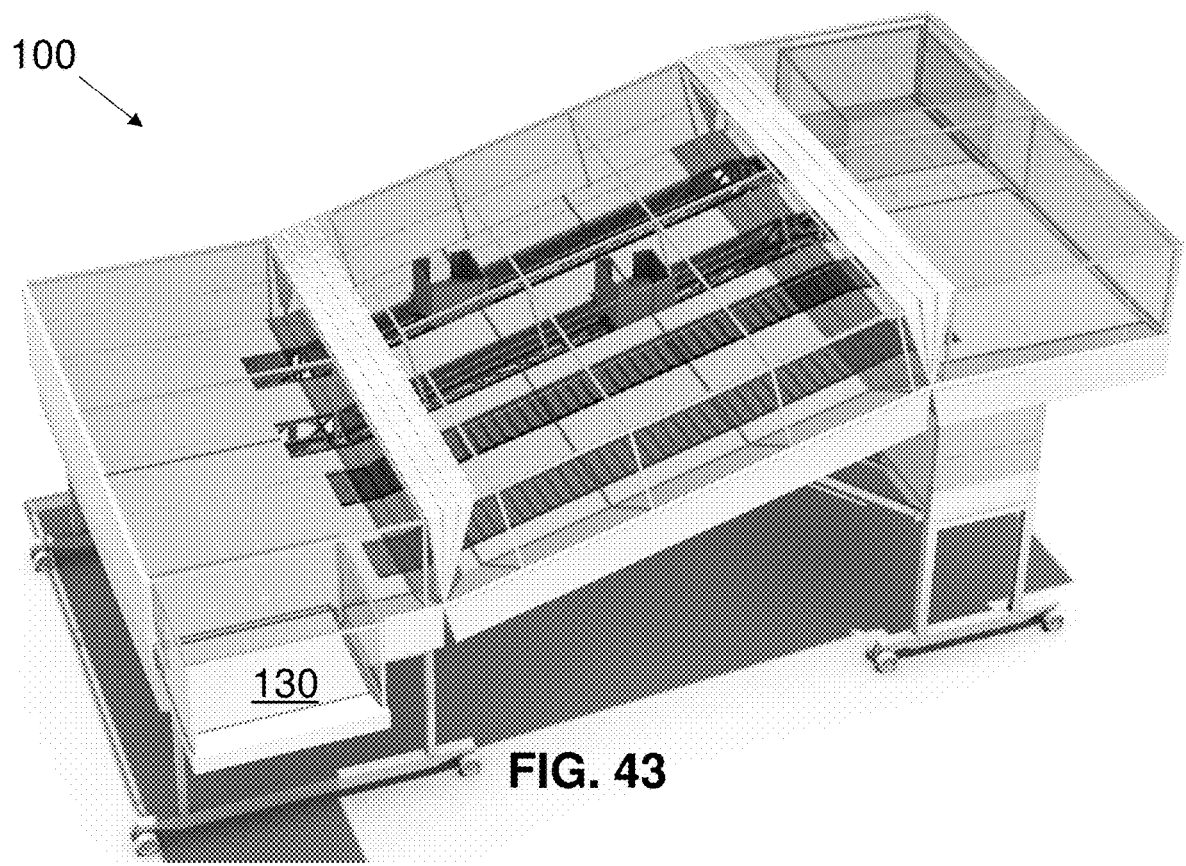
FIG. 43 is a perspective view of the gangway of FIG. 40 raised to a third intermediate position and with the lower extendable walkway extended laterally.
Figure 44:
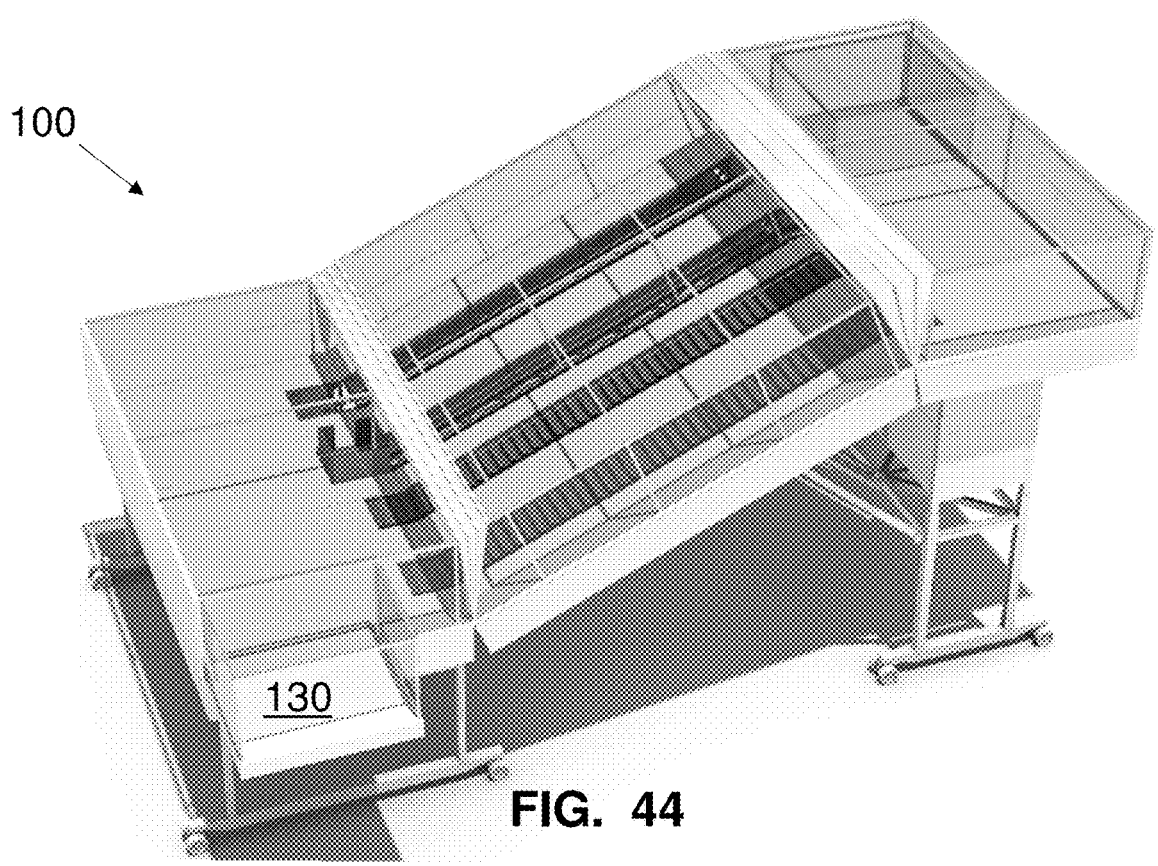
FIG. 44 is a perspective view of the gangway of FIG. 40 raised to a fourth intermediate position and with the lower extendable walkway extended laterally.
Figure 45:
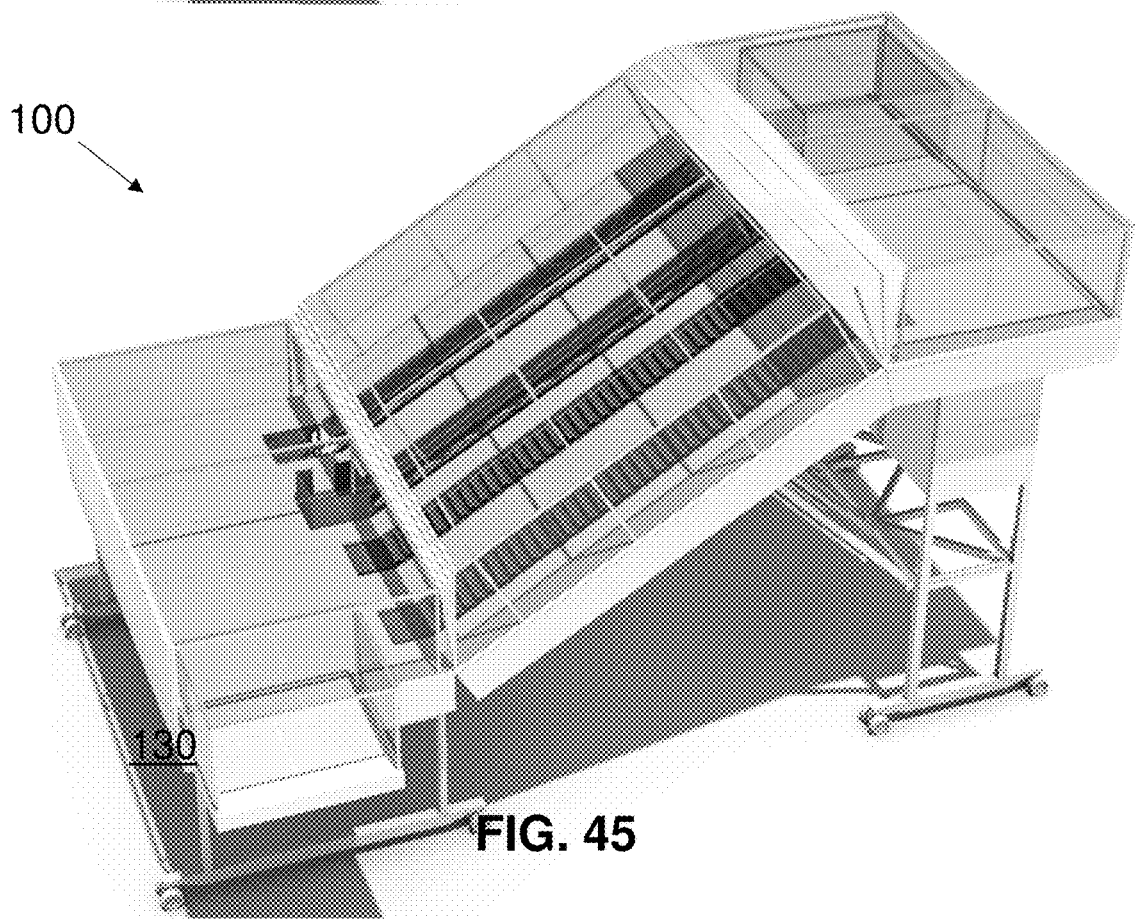
FIG. 45 is a perspective view of the gangway of FIG. 40 raised to a fifth intermediate position and with the lower extendable walkway extended laterally.
Figure 46:
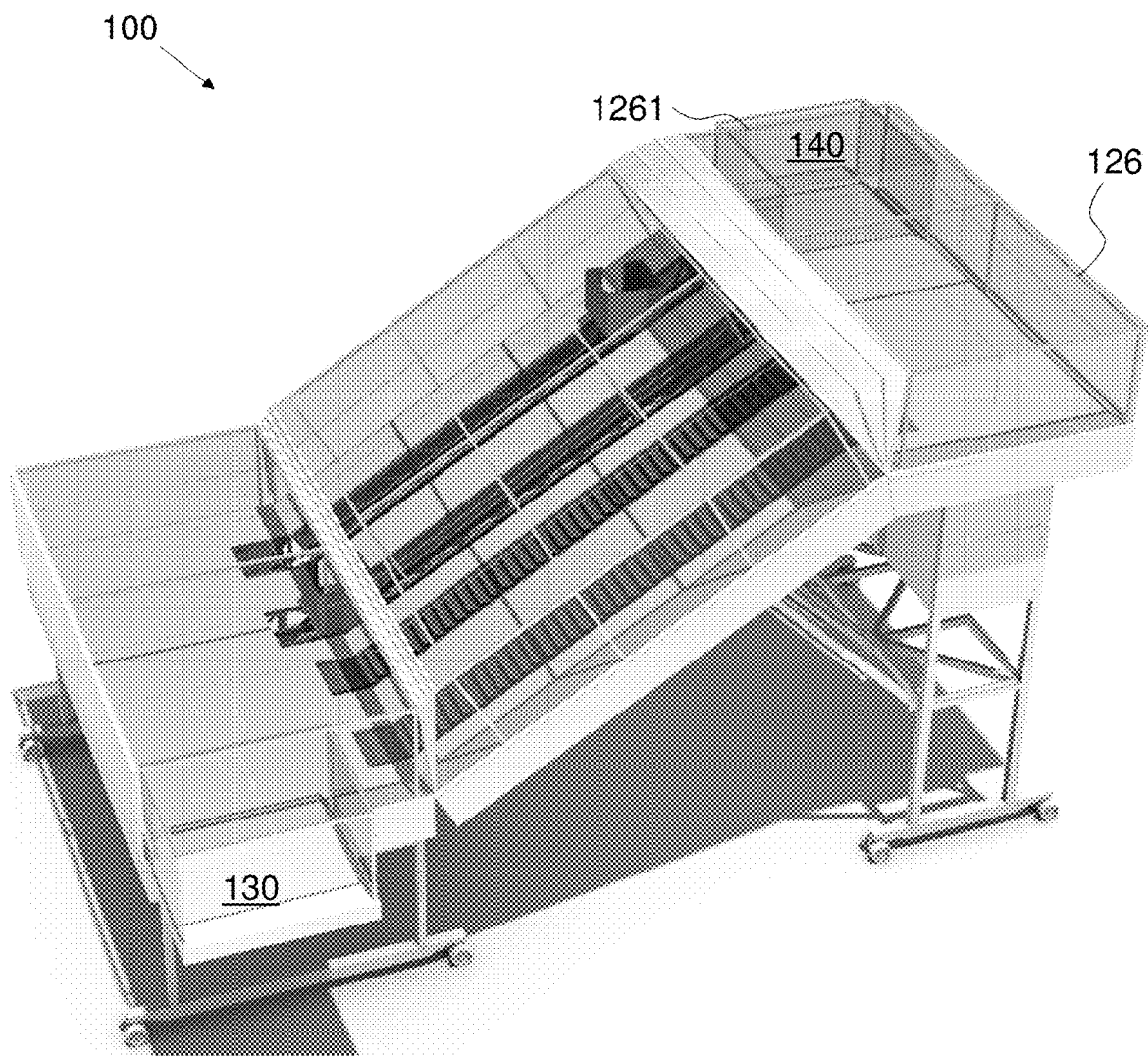
FIG. 46 is a perspective view of the gangway of FIG. 45 with both the lower and upper extendable walkways extended laterally.

Surrounding the travellators 40, 50 and the lower and upper landings 12, 22 is a roof structure 120. Above the lower landing 12 is a lower roof enclosure 122, above the travellators 40, 50 is a travellator roof enclosure 124, and above the upper landing 22 is an upper roof enclosure 126. A lower accordion 128 connects the end of the lower roof enclosure 122 to the lower end of the travellator roof enclosure 124 and an upper accordion 129 connects the upper end of the travellator roof enclosure 124 to the end of the upper roof enclosure 126. The lower roof enclosure 122 defines a lower entrance/exit 1221 of the gangway 100 and the upper roof enclosure 126 defines an upper entrance/exit 1261 of the gangway 100. Each entrance/exit 1221, 1261 permits an extendable walkway 130, 140 to move out away from the lower and upper landings 12, 22, respectively. As shown in FIG. 41, the lower extendable walkway 130 has moved through the lower entrance 1221, for example, so that passengers can enter the gangway 100 and travel from the lower landing 12 along a stair travellator 40 up to the upper landing 22 and through and out the upper exit 1261 to enter a seagoing vessel. In this exemplary configuration, the vessel is parallel to the side of the upper entrance/exit 1261 and the terminal is parallel to the side of the lower entrance/exit 1221. Accordingly, movement of the gangway 100 occurs in a direction parallel to and alongside the vessel 150, in which case the lower movement assembly 16 rolls in that direction as shown, for example, in FIGS. 41 to 46. As can be seen in the progression from FIG. 41 to FIG. 45, the gangway 100 raises from the fully horizontal position of FIG. 40 to the raised position of FIG. 45. In FIG. 46, the upper extendable walkway has extended out from the upper entrance/exit 1261.

Figure 47:
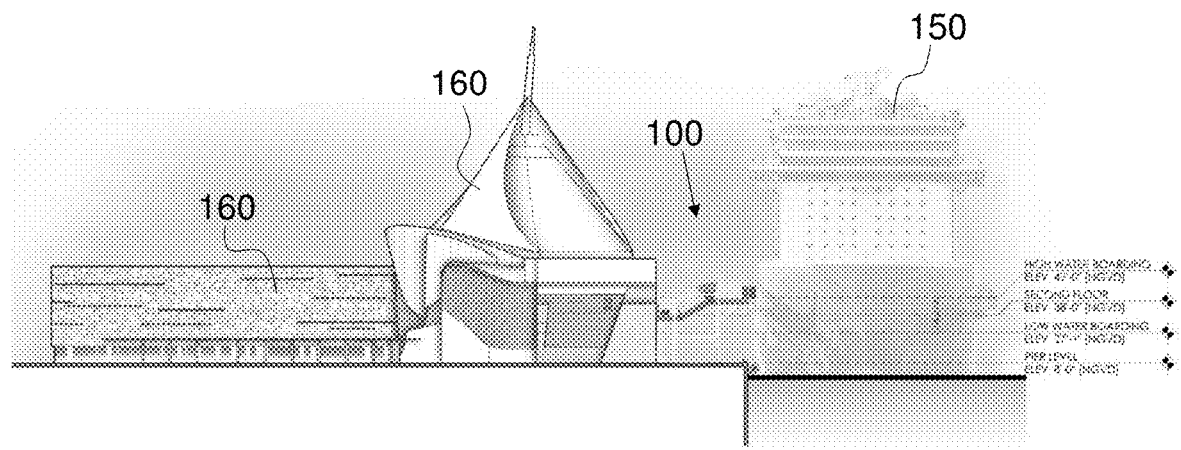
FIG. 47 is a fragmentary side elevational view of a marine terminal connected to a seagoing vessel with the gangway of FIG. 40.
Figure 48:
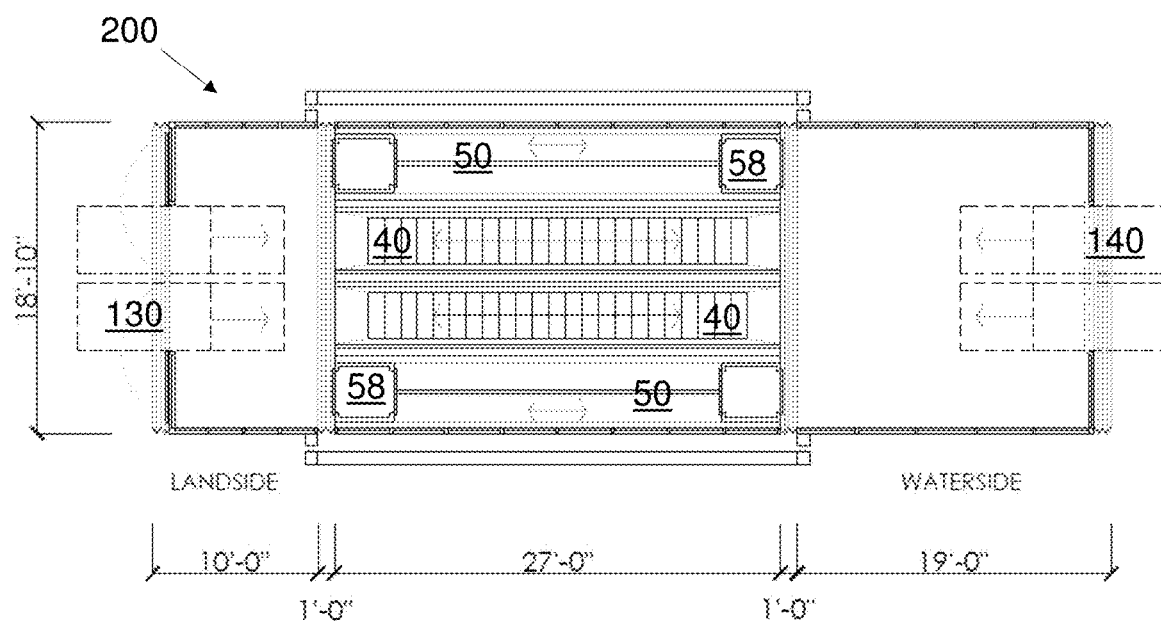
FIG. 48 is a plan view of an exemplary embodiment of a portable, height-adjustable gangway with two exterior gondola travellators and two interior stair travellators.

FIGS. 47 and 48 illustrate how an exemplary embodiment of a gangway 200 similar to gangway 100 can be placed into use for a seagoing vessel 150. Passengers arrive at a terminal 160 and enter the gangway 200 through a door connected to the lower entrance 1221 and/or to the extendable walkway 130. In the orientation of the gangway 200 shown in FIG. 47, the lower entrance 1221 faces the terminal 150 and the extendable walkway 130 extends in a direction parallel to the movement of the travellators 40, 50. This configuration is depicted in the plan of FIG. 48. In this configuration (and, for example as a possibility in the configurations shown in FIGS. 1 to 4 and 24 to 39), in a single direction passengers enter the gangway 100 and travel from the lower landing 12 along a stair travellator 40 up to the upper landing 22 and through and out the upper exit 1261 to enter a seagoing vessel. In this exemplary configuration, the vessel is parallel to the side of the upper landing 22 that is opposite the travellators 40, 50 and the terminal is parallel to the side of the lower landing 12 also opposite the travellators 40, 50. Accordingly, movement of the gangway 100 occurs in a direction orthogonal to the passenger movement direction alongside the vessel 150, in which case the lower movement assembly 16 rolls in that direction as shown, for example, in FIGS. 1 to 4 and 24 to 39. In the exemplary embodiment of FIG. 48, the gangway 200 has two centrally disposed stair travellators 40 and two outer gondola travellators 50. In this configuration, passengers or items enter and exit the gondolas 58 at opposite ends. Accordingly, the gondolas 58 have opposing doors, e.g., sliding doors, one of which opening at a respective one of the lower and upper landings 12, 22 when the gondola 58 is in the loading/unloading position. The gondolas 58 in FIG. 48 are depicted in both the uppermost and lowermost positions on each of the gondola travellators 50.

Figures 49, 50:
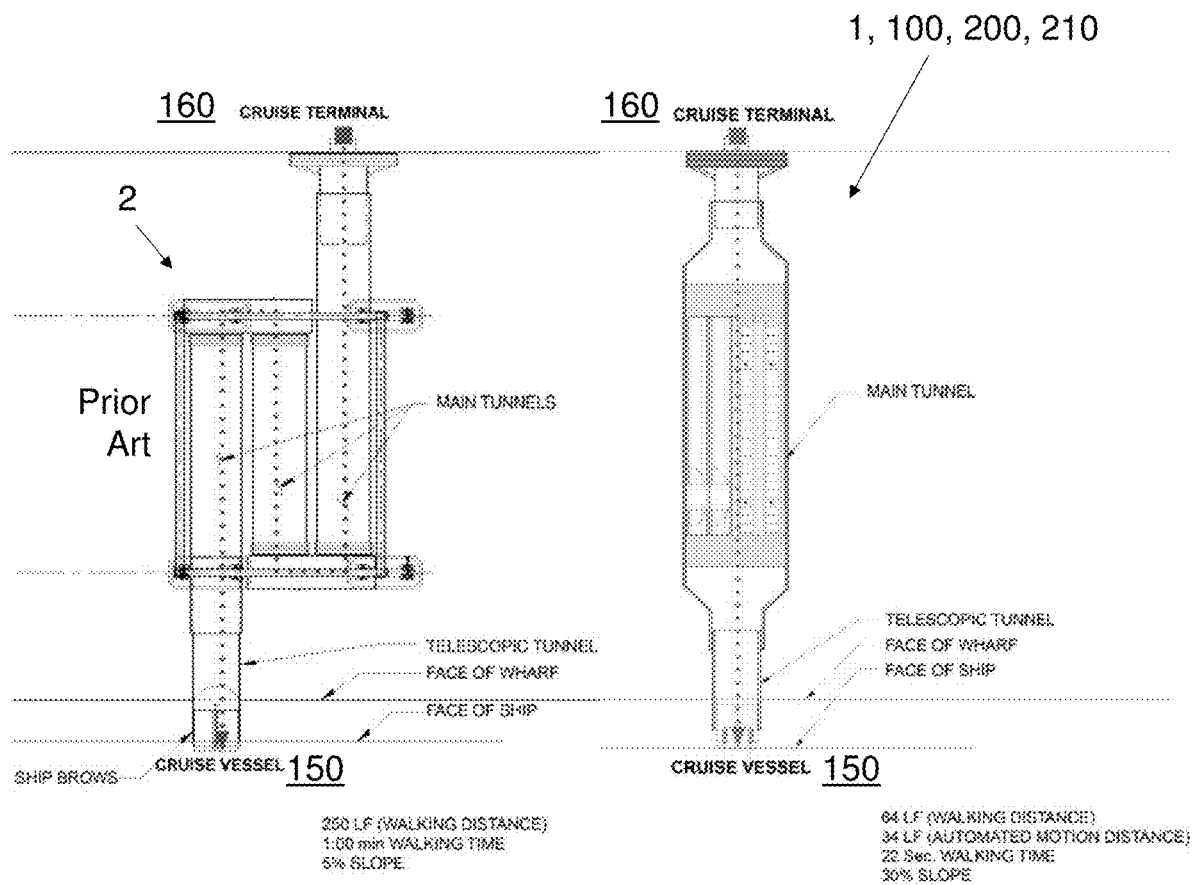
FIG. 49 is a top plan view of a prior art gangway from a cruise terminal to a cruise vessel with two switchbacks.
FIG. 50 is a top plan view of an exemplary embodiment of a portable, height-adjustable gangway extending between a cruise terminal and a cruise vessel, the gangway having two adjacent gondola travellators and two adjacent stair travellators.
Figure 51:
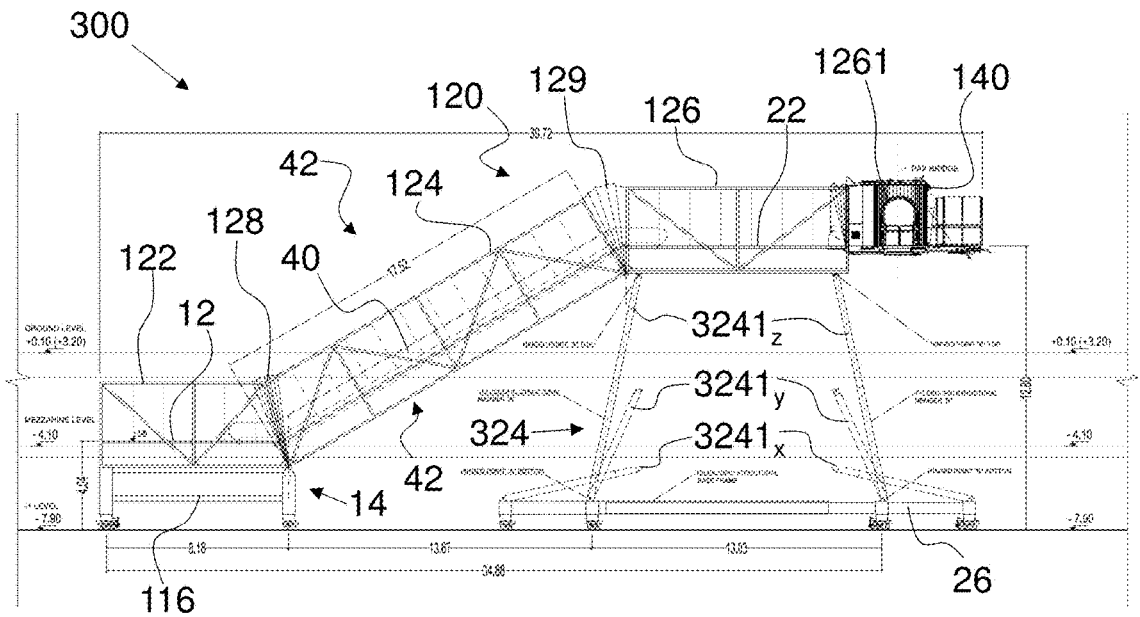
FIG. 51 is a side elevational view of an exemplary embodiment of a portable, height-adjustable gangway having a single stair travellator and in a raised position with diagrammatic illustrations of expandable/contractible supports in a fully horizontal and an intermediate position.

What is significant about the configurations of the gangway 1, 100, 200, 210 is that there is a direct connection between the terminal 160 and the vessel 150 that does not contain switchbacks. The diagram of FIG. 49 illustrates a typical prior art gangway 2 connecting a terminal 160 to a vessel 150. Such gangways 2 require a smooth slope instead of steps in order to accommodate users with disabilities or the elderly and for users in wheelchairs. The maximum slope for such gangways 2 is a 5% grade, which still is quite steep. For traversing the most common distance between a terminal 160 and a vessel 150 (such as a cruise ship), to keep the slope less than or no more than a 5% grade, two hundred and fifty (250) linear feet of walking distance is required. This distance, therefore, requires the gangway 2 to have two switchbacks. The average time for traversing this gangway is one minute. The variable pitch of the gangway 1, 100, 200, 210, however, entirely removes the need for switchbacks because the gangway 1, 100, 200, 210 permits slopes of much greater than a 5% grade. In the exemplary configuration where the gangway 1, 100, 200, 210 is raised to approximately a 30% slope, the linear walking distance is reduced to sixty four (64) feet and, of that distance, thirty four (34) feet are carried out by the automated motion of the stair travellators 40 (or the gondola travellators 50 if desired). Using the stair travellators 40, the time for embarking onto a vessel 150 from a terminal 160 reduces to twenty-two seconds, an advantageous reduction in time of almost 64% percent. In the exemplary configuration of the gangway 210 shown in FIG. 50, the gangway 210 extends between a cruise terminal 160 and a cruise vessel 150. The gangway 210 has two adjacent gondola travellators 50 and two adjacent stair travellators 40. The gondolas 58 are shown with opposing doors for ingress/egress.

Figure 55:
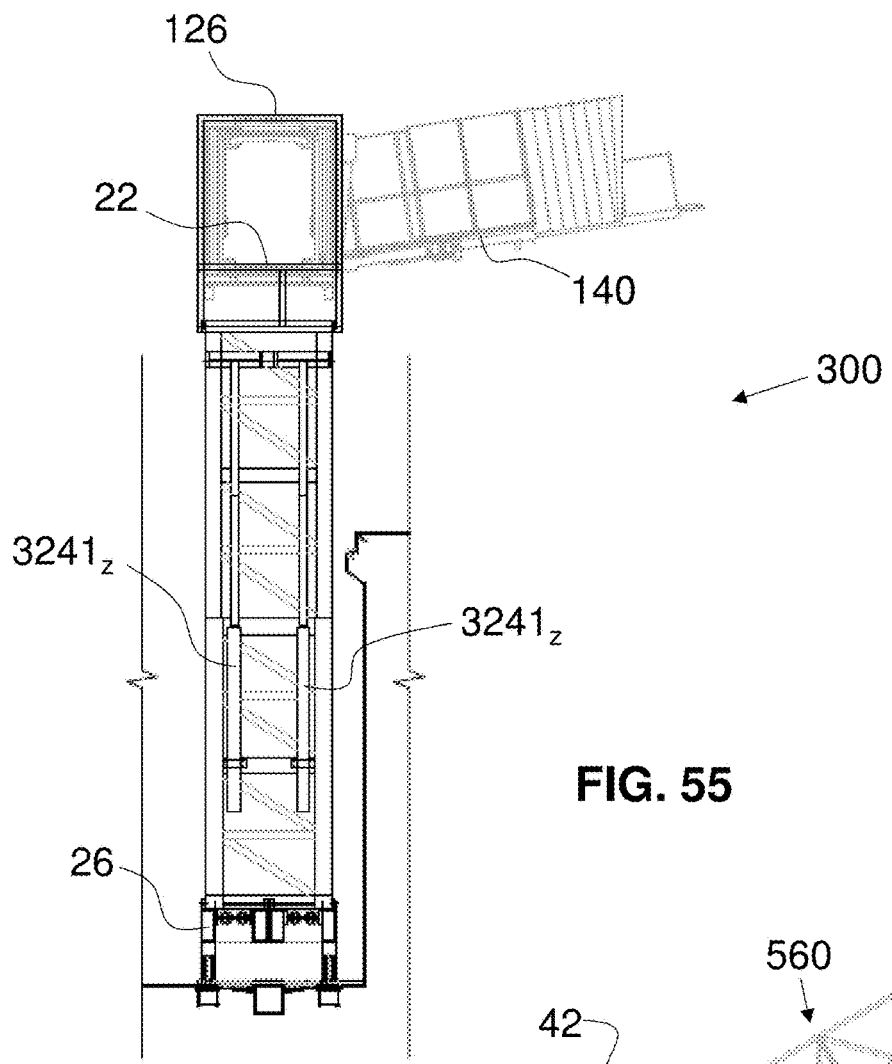
FIG. 55 is a vertical cross-sectional view of the gangway of FIG. 54 along section line LV-LV.

FIGS. 51 to 58 illustrate another exemplary embodiment of a portable, height-adjustable gangway 300. The gangway 300 has many similar features to the gangways 1, 100, 200, 210 and, therefore, details are not repeated herein for reason of brevity. The gangway 300 is laterally compact with respect to other embodiments of the gangway described and shown. In this exemplary embodiment, the gangway 300 contains a single travellator 40, 50, which, in the figures, is a stair travellator 40. The views shown in FIGS. 51 to 54 are from the side of the gangway 300 that faces a vessel. Surrounding the lower landing 12 is a lower roof enclosure 122 and surrounding the upper landing 22 is an upper roof enclosure 126. The stair travellator 40 extends from a horizontal portion at the end of the lower landing 12 along the first stair portion 42 to the a horizontal portion at the near end of the upper landing 22. The gangway 300 is depicted with a roof structure 120 (although one can be replaced with safety walls and handrails if desired). Covering the first stair portion 42 is a travellator roof enclosure 124, which is connected at a lower end to the lower roof enclosure 122 with a lower accordion 128 and is connected at an upper end to the upper roof enclosure 126 with an upper accordion 129 to form a cover that protects users from the lower entrance/exit 1221 all the way to the upper entrance/exit 1261. The upper entrance/exit 1261 is part of an upper extendable walkway 140 that is best shown in FIG. 55. The gangway 300 has a lower tower support 14 and an upper tower support 324. The upper tower support 324 has structures to raise and lower an upper section that includes the upper landing 22 and the upper roof enclosure 126, thereby causing the first stair portion 42 to pivot as explained herein. In this exemplary embodiment, the upper tower support 324 raises and lowers the upper landing 22 with expandable/contractible supports 3241 that are triplicated in FIG. 51 to show the orientation of the supports 3241 when in the fully horizontal position 3241x, in an intermediate raised position 3241y, and in the raised position 3241z. In each of these positions, the lower tower support 14 has a constant size (e.g., 8.51 m longitudinal length) and the upper structure including the upper landing 22 and the upper roof enclosure 126 has a constant size (e.g., 10.02 m longitudinal length). The first stair portion 42 has a constant longitudinal length but, as the first stair portion 42 pivots, the total length of the gangway 300 can change. Other portions of the gangway 300 change shape and size as the upper tower support 24 raises and lowers the upper landing 22.

Figure 52:
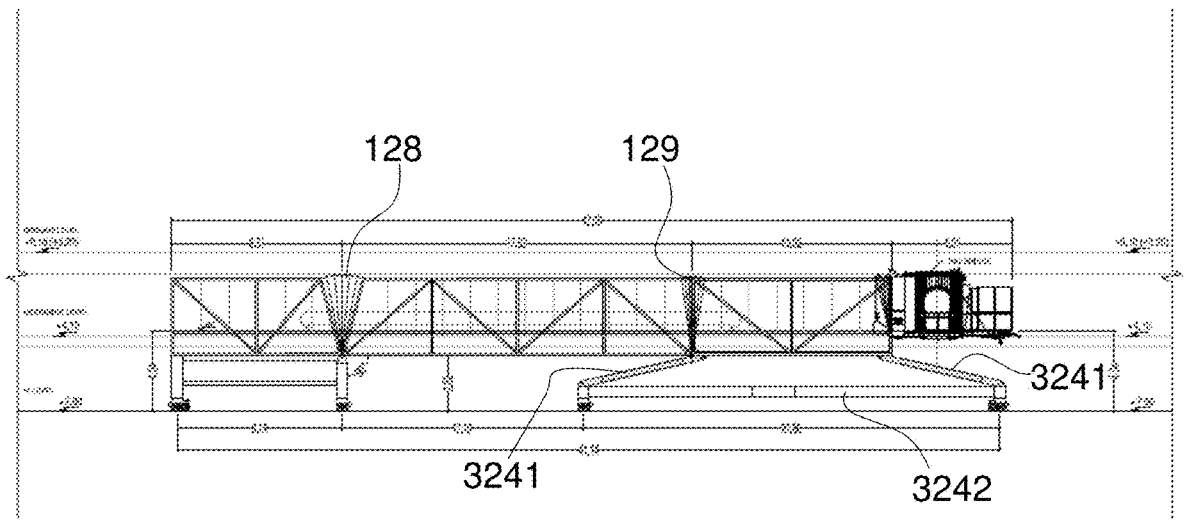
FIG. 52 is a side elevational view of the gangway of FIG. 51 in a fully horizontal position.
Figure 53:
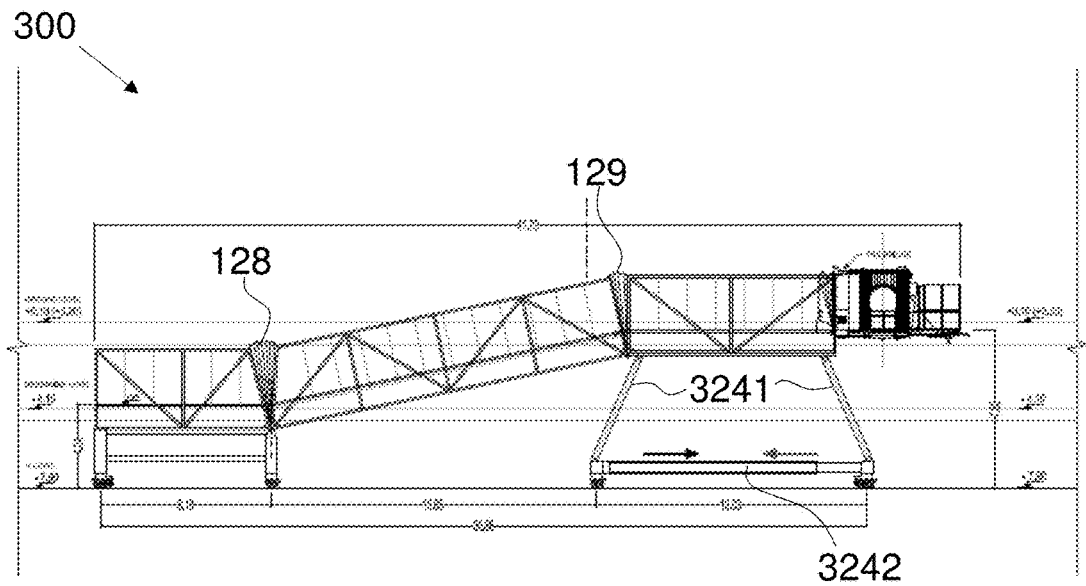
FIG. 53 is a side elevational view of the gangway of FIG. 51 in an intermediate raised position.
Figure 54:
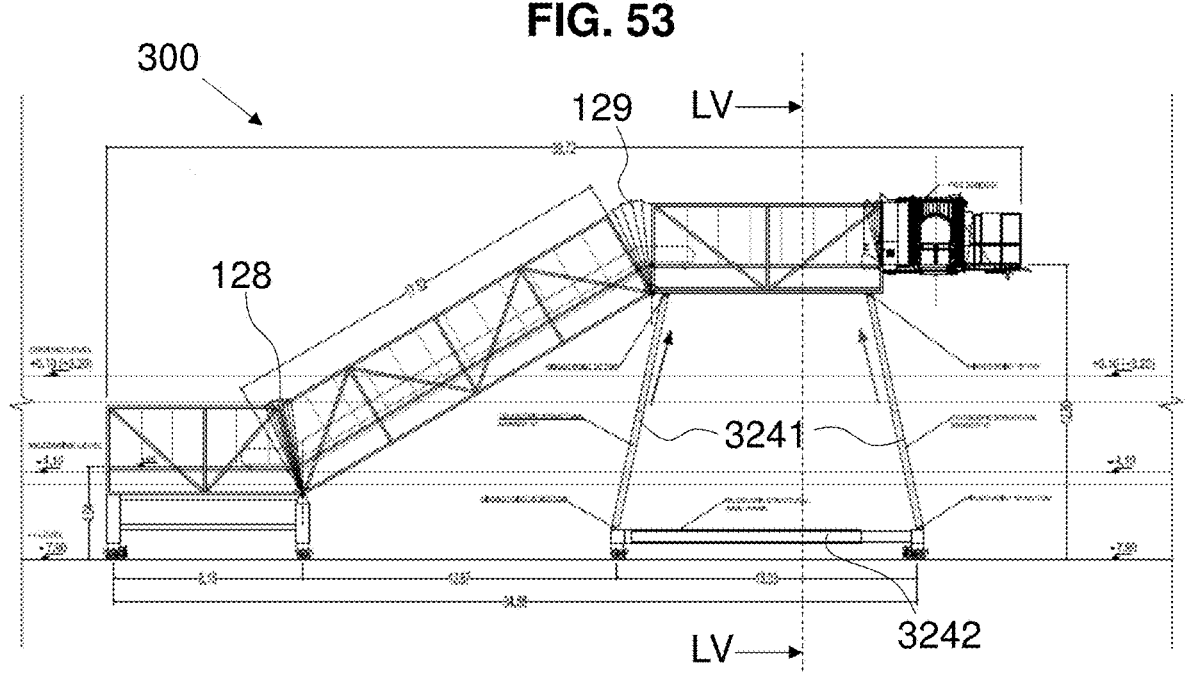
FIG. 54 is a side elevational view of the gangway of FIG. 51.

In a fully horizontal or lowered position shown in FIG. 52, the overall length of the gangway 300 is approximately 42 m long. The first stair portion 42 is approximately 17.52 m long. In this position, the upper movement assembly 26 has a wheel-to-wheel length of approximately 20.86 m. In the intermediate raised position shown in FIG. 52, the overall length of the gangway 300 is approximately 41.7 m long and the upper movement assembly 26 has a wheel-to-wheel length of approximately 13.03 m. As can be seen, therefore, the shortening of a movement assembly frame 3242 (see horizontal arrows in FIG. 53) without any change in length of the expandable/contractible supports 3241 causes the upper tower support 24 to raise the upper landing 22. The movement assembly frame 3242 in the exemplary embodiment is a telescoping frame that causes the wheel-to-wheel length to expand (e.g., FIG. 52) or contract (e.g., FIGS. 53 and 54). To arrive at the raised position shown in FIGS. 51 and 54, the expandable/contractible supports 3241 are expanded, as indicated by the upward arrows. This expansion causes the overall length of the gangway 300 to shorten only to approximately 39.72 m long with all other features remaining substantially the same. One exception to the constant state is the lower and upper accordions 128, 129. As the first stair portion 42 pivots, one of the accordions expands while the other contracts.

Figure 56:
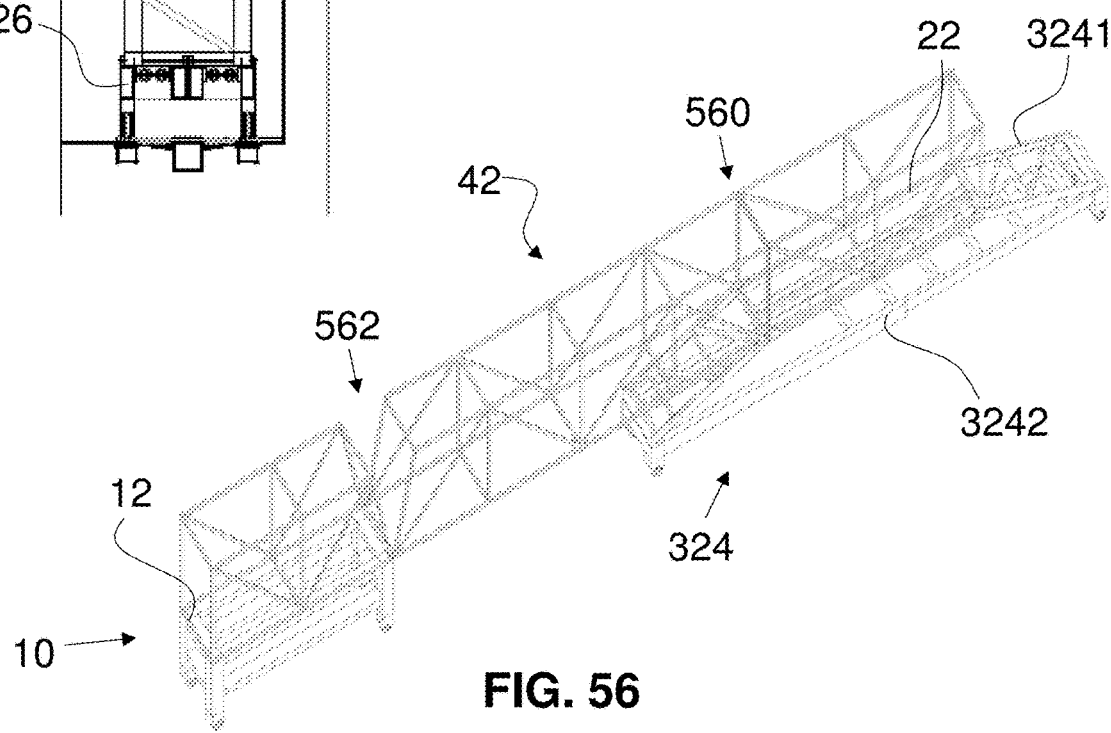
FIG. 56 is a perspective view of structural support frames of the gangway of FIG. 51 in the fully horizontal position.
Figure 57:
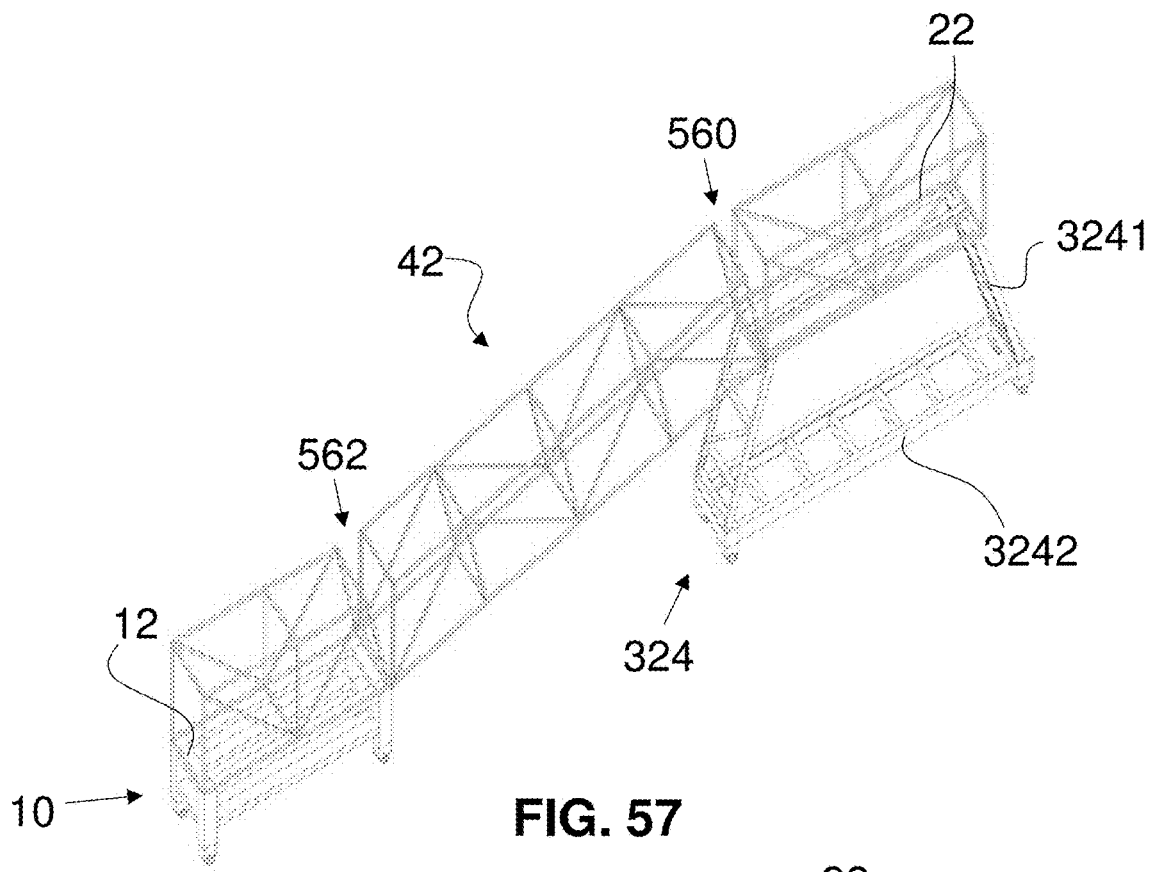
FIG. 57 is a perspective view of the structural support frames of the gangway of FIG. 51 in the intermediate raised position.
Figure 58:
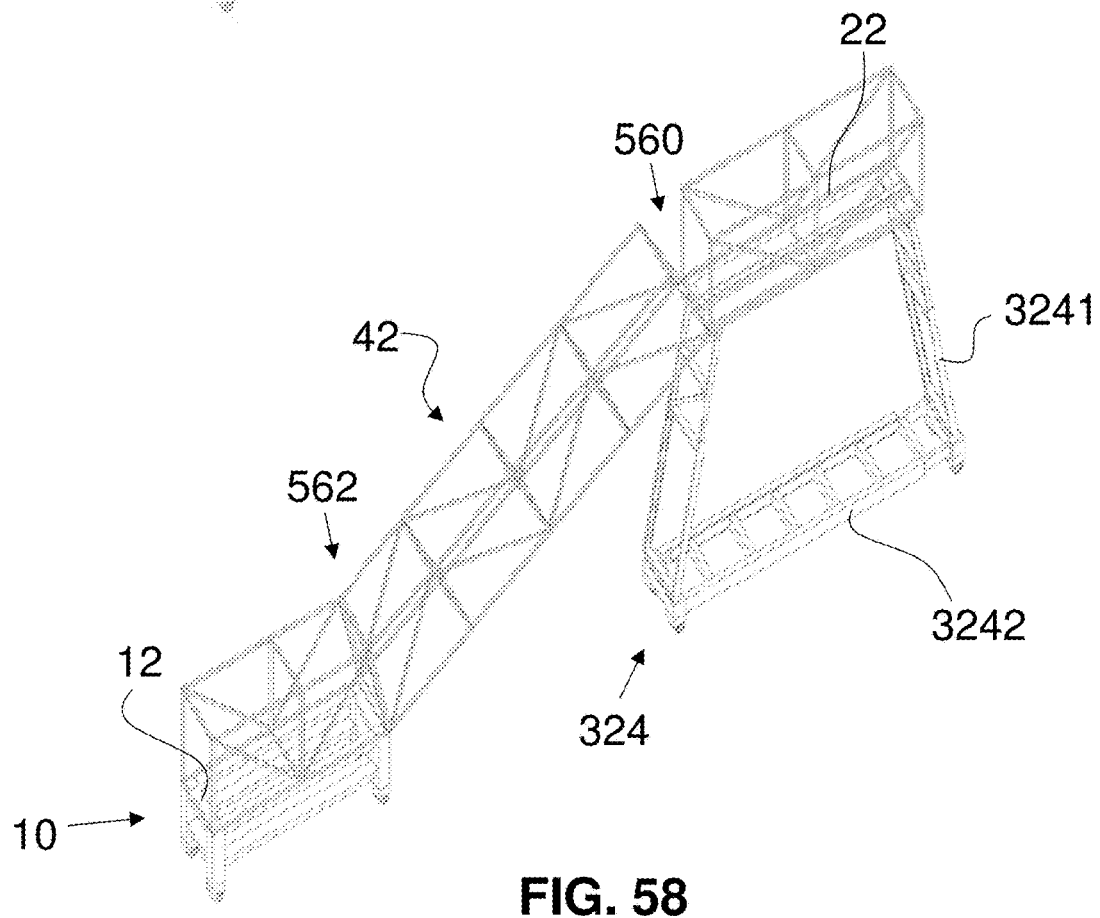
FIG. 58 is a perspective view of the structural support frames of the gangway of FIG. 51 in the raised position.

FIGS. 56 to 58 illustrate structural support frames of the gangway 300 with all other components removed. In this view, the pivoting structures of the first stair portion 42 and the moving structures of the upper tower support 24 can be seen. In particular, when the upper tower support 324 raises, the upper end of the first stair portion 42 moves away from the upper landing structure to create an upper gap 560 and the lower end of the first stair portion 42, which is away from the facing end of the lower landing structure, moves towards the lower landing structure to close a lower gap 562. The closing of this lower gap 562 and the opening of the upper gap 560 can be seen in FIGS. 56 to 58. Portions of the upper tower support 324 change simultaneously with the changing of these gaps 560, 562. A first change occurs with the expandable/contractible supports 3241. The second change occurs with the movement assembly frame 3242. As mentioned above, to move from the fully horizontal position in FIG. 56 to an intermediate position in FIG. 57, the movement assembly frame 3242 contracts. With the expandable/contractible supports 3241 pivotally connected to the movement assembly frame 3242 and to the upper landing structure, this contraction of the movement assembly frame 3242 without change in size of the expandable/contractible supports 3241 causes upward movement of the upper landing 22. This contraction causes a corresponding pivot of the first stair portion 42 to the orientation shown in FIG. 57. Then, the expandable/contractible supports 3241 expand with the movement assembly frame 3242 remaining in the contracted state. This expansion of the expandable/contractible supports 3241 causes further upward movement of the upper landing 22 to the orientation shown in FIG. 58, which movement causes a corresponding further pivot of the first stair portion 42 as shown.

Figure 59:
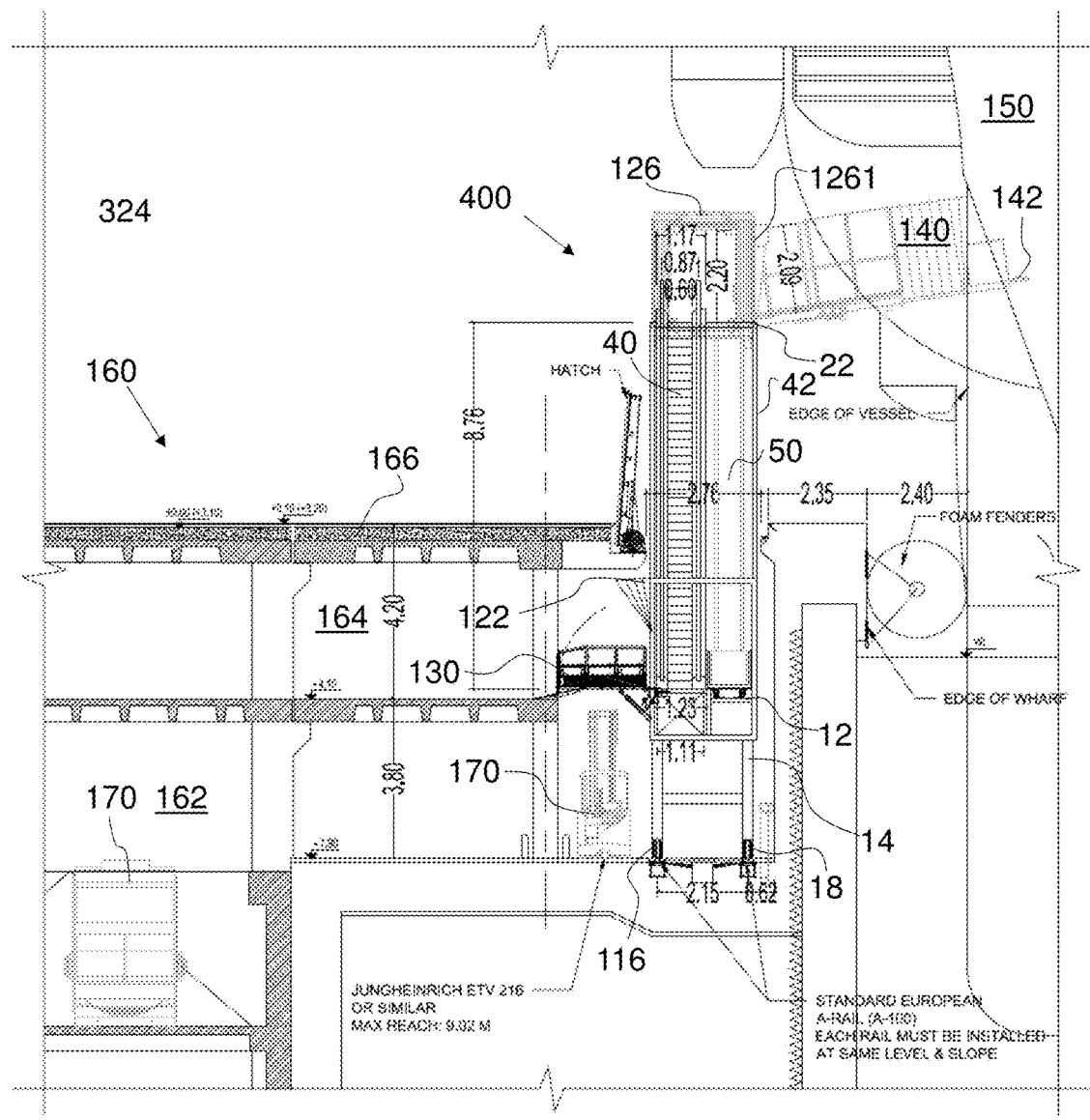
FIG. 59 is a fragmentary, partially cross-sectional, side elevational view of an exemplary embodiment of a portable, height-adjustable gangway having one stair travellator and one gondola travellator in a raised position between a terminal and a vessel.

FIG. 59 illustrates another exemplary embodiment of a portable, height-adjustable gangway 400. The gangway 400 has many similar features to the gangways 1, 100, 200, 210, 300 and, therefore, details are not repeated herein for reason of brevity. The gangway 400 is laterally compact with respect to some embodiments of the gangway described and shown and is similar in configuration to the gangway 300, but, in this exemplary embodiment, the gangway 400 contains one stair travellator 40 and one gondola travellator 50. The gangway 400 is illustrated between a vessel terminal 160 and a vessel 150. The terminal 160 depicted has a garage 162 in which vehicles 170, such as buses and forklifts, can travel for conveying passengers and cargo between the terminal 160 and the vessel 150. Above the garage 162 is a passenger walkway 164, in which passengers can make their way onto the vessel 150 using the gangway 400. The terminal 160 has a roof 166 that covers the passenger walkway 164.

Passengers on the passenger walkway 164 walk across a lower extendable walkway 130 that is, in this exemplary embodiment, a drawbridge. Passing through the lower entrance/exit 1221, the passengers enter the lower roof enclosure 122 and walk along the lower landing 12 to the stair travellator 40. At the top of the stair travellator 40, the passengers walk along the upper landing 22 through the upper entrance/exit 1261 and over an upper extendable walkway 140, across a ship brow, and into the vessel 150.

In the exemplary embodiment of FIG. 59, the height of the passenger walkway 164 to the top of the roof 166 is approximately 4.2 m. A height of the first stair portion 42 is approximately 8.76 m and the first stair portion 42 containing the travellators 40, 50 is 2.76 m. A height of the upper roof enclosure is approximately 2.2 m and a height of the upper extendable walkway 140 is 2.09 m. The upper extendable walkway 140 has a length of approximately 4.75 m but can be extended and contracted. A width of the gangway 400 between the wheels 18 of the lower movement assembly 116 is approximately 2.15 m.

The following characteristics and safety and control features apply to all of the exemplary embodiments of the gangway.

The gangway and its components do not depend on the terminal or a vessel for support. Command functions have a feedback signal associated with them. All discrete functions have a monitored point. In cases of systems that conflict, such as roll up doors and extending ramps, interlocks are employed to prevent damage. In an example of a motor system conflict, if a motor is told to drive up, a device is employed to verify if the motor is driving up, such as a read switch on the controlled device, or a current sensor on the motor leads, or other measures. In an exemplary embodiment, the contactor does not need to be monitored, as this does not ensure that the motor is moving. If a pump is enabled, a pressure sensor is used to verify system pressure. Circuit breakers and contactors are monitored for their discrete status. If a breaker trips or is turned off, an alert condition generates a message. If a contactor pulls in or contacts become welded and the contactor cannot drop out, a message is generated. If a roll up door is closed and a ramp is requested to extend, an interlock prevents the ramp from moving. If a ramp is extended and the roll up door is requested to come down, an interlock prevents the door from dropping.

Various exemplary embodiments of warning devices are employed at the gangway. In one example, a warning bell and a colored rotating beacon is located in a visible location for various movements or conditions of the gangway. For gangway movement, the warning bell and orange rotating beacon lights are operate when the gangway is being moved along the dock, for example, and/or when the telescoping passenger walkway tunnels are being deployed to the ship and/or to the terminal. The beacon and warning bell both operate when the gangway is in motion. The bell is approximately 98 decibels at approximately 10 feet (3 m) as a minimum. Beacons are located at any visible spot on the gangway.

Various exemplary embodiments of gangway operation warnings are provided to a gangway operator. In one example, red colored rotation beacon lights and simultaneous audible alarms are provided on a control console and at ground level near the wheels. These separately indicate one or more of the following:

lift malfunction;
vertical limit has been reached (limit switch and at mechanical stop);
horizontal limits of gangway have been reached;
maximum steering limits have been reached; and/or
disengagement of the gangway from the ship.

For gangway slope limits warning, a yellow colored flashing or rotating beacons is provided with simultaneous audible alarm(s) to signal critical out-of-range conditions (1:10) when they occur or as the gangway positioning movement exceeds an increment/time range associated with auto adjustment. Signals are placed at the entrance to the gangway at the ship, at the terminal, at each landing tunnel, and are also visible at ground level from dock side. Warning signs stating "DO NOT ENTER WHEN ALARM SOUNDS" also are provided. Sensor control switches trigger the warning alarm when a shipside brow has traveled beyond the slope of, for example, approximately 1:10 at a maximum. A manual override can be provided for the audible alarm.

For a clearance warning, a red colored rotating beacon is provided with simultaneous audible alarm to warn dock traffic of low clearance hazard on the gangway. In an exemplary embodiment, the system includes reflective, highly visible warning signs and high visibility strobe lights with clear lenses that are highly visible during daylight hours. Strobes are provided on each side of the gangway, for example. The lights automatically operate when any part of the system is at a level where the clearance to the dock apron is less than approximately 16 feet (4.87 m). In an exemplary embodiment, manual overrides for all audible and visual alarms are provided.

For operation warnings and gangway slope limits warning, the audible alarm can be eliminated when non-alarm/non-alert conditions are present. A light tower is provided with a Green/White/Amber(Yellow)/Red light (audible) for the following conditions:

GREEN: gangway is automatic and no alerts/alarms;

WHITE: gangway is in automatic adjustment mode to occur approximately five seconds before and for duration of adjustment (auto adjustments include leveling, in/out, etc.)—green can stay on at the same time or not;

AMBER (Yellow): slope has exceeded +/− maximum (e.g., 30) degrees or gangway has an issue not impeding with functionality, or a function is overridden and alarms/alerts still active but silent; and/or RED: (Audible): Achieve alarm.

For the protection from failure of a main lift system, the gangway has safety devices to preclude the gangway from dropping from its current position, which might occur when a main lift system fails. For example, hydraulic lifts are provided with safety check valves and velocity fuses to prevent the gangway from falling in the event of a failure in the hydraulic system. Electrical-mechanical lifting devices are equipped with electro-magnetic brakes that are permanently activated when the motors are not in use, and with a fault detector to sense differential motion. The detector disconnects vertical drive motors if a fault is detected. Control panel alarms are provided to warn of a failed condition. In an exemplary embodiment, gangway control panels (e.g,. computer controlled panels) are located at both the uppermost and lowermost locations (e.g., upper and lower extendable walkways, respectively). In the event of hydraulic system use for lift control, the system pressure and system flow transducers are employed and information is incorporated into logic of the system to determine leaks or ruptures. For example, nominal pressure and flow tables determine excessive flow or lower than expected pressure. Static system pressures are monitored for small leaks such as when the gangway is stationary and pressure drops off below a deadband and an alert is generated that a potential leak exist. In the event of electrical/mechanical failure for lift control, motor amps and encoders are employed to determine over/under torque conditions as well as slippage. Also, in the PLC, a comparative table is implemented to compare either embedded values (hard coded into the program) established during testing or adjustable values (set points that can be adjusted by user with sufficient privileges) that the PLC would use to interpret potential issues.

For the primary control and panels, primary controls are provided for the operation and the control of the gangway and are located on the control console/panel located, for example, near the shipside brow. Controls are grouped and color-coded to relate to function. Selecting opposite motions simultaneously is prevented by damage control circuits and/or other components. Primary control cabinet/displays have pushbuttons and pilot lights and text type digital display for status, alarms, and other supplemental information. In an exemplary embodiment, all text is in a commonly use language (e.g., English). Controls are organized into functional groups. Controls ensure that gangway motion are of the momentary contact (deadman) type. In an exemplary embodiment, all of the motion controls are related to the function of the unit being controlled, e.g., with raise and lower functions, the "raise" pushbutton will be located above the "lower" pushbutton. The control panels provide, at minimum, for the operational control of the following functions:

three position master key switch: select "OFF", "OPERATE", or "AUTO" (automatic leveling)—allow the key to be removed in the "OFF" and "AUTO" positions only;

a "Start" button (mushroom head) activates the lift and mobility control;

mobility control with speed control—crawl (approximately 1 ft./min.), slow (approximately 5 ft./min.), medium (approximately 10 ft./min) and fast (approximately 20 ft./min.) or as designed for a specific location;

two pushbuttons for each adjustable component: one marked "Raise" and the other "Lower" for controlling the vertical travel of the gangway and one marked "Extend" and the other marked "Retract" for the horizontal travel of each telescoping tunnel connecting to the ship vehicle or building;

brow positioning: elevating and lowering, extension and retraction, and side to side with values displayed in feet/inches and degrees;

manual mode/auto mode;

emergency stop of all movements of the gangway (manual override)—emergency stop button is located at both upper and lower control panels and is positioned and configured so that it cannot be accidently activated by collisions with hand held luggage or by children;

lighting controls: light switch for dock apron lights and movement lights are located at both upper and lower control panels;

identification: all switches and push buttons for control of any gangway function are permanently engraved for easy identification and all switches are integrally lighted to indicate the operational mode for those functions that can be performed by the gangway operator;

panel indicators and warning lights: the control console/panel includes the following indicators as a minimum for warning messages and general indicators (indicators and warning messages may be displayed on a digital screen with an audible tone):

operation mode (auto, off);

lamp test button;

lift malfunction;

vertical and horizontal limits have been reached (limit switch and at mechanical stop);

tunnel height indicator—show the relative height of the shipside telescoping tunnel to the wharf apron displayed in feet/inches;

disengagement of the gangway from the ship;

maximum steering limits have been reached; and/or warning indicators.

all limit switches are connected to the on-board computer for recording of operational movements and activities—the recorded files are downloadable for off-site use—the limit switches stop movement of operations when a limits has been met;

CCTV monitoring screen to monitor cameras and position of all ground level elements;

digital data screen and control screen;

all control functions are via touch-screen to monitor, diagnose and control the function of the gangway; and/or MI graphics are approved or selected by the user of the gangway.

It is noted that various individual features of the inventive processes and systems may be described only in one exemplary embodiment herein. The particular choice for description herein with regard to a single exemplary embodiment is not to be taken as a limitation that the particular feature is only applicable to the embodiment in which it is described. All features described herein are equally applicable to, additive, or interchangeable with any or all of the other exemplary embodiments described herein and in any combination or grouping or arrangement. In particular, use of a single reference numeral herein to illustrate, define, or describe a particular feature does not mean that the feature cannot be associated or equated to another feature in another drawing figure or description. Further, where two or more reference numerals are used in the figures or in the drawings, this should not be construed as being limited to only those embodiments or features, they are equally applicable to similar features or not a reference numeral is used or another reference numeral is omitted.

The foregoing description and accompanying drawings illustrate the principles, exemplary embodiments, and modes of operation of the systems, apparatuses, and methods. However, the systems, apparatuses, and methods should not be construed as being limited to the particular embodiments discussed above. Additional variations of the embodiments discussed above will be appreciated by those skilled in the art and the above-described embodiments should be regarded as illustrative rather than restrictive. Accordingly, it should be appreciated that variations to those embodiments can be made by those skilled in the art without departing from the scope of the systems, apparatuses, and methods as defined by the following claims.

What is claimed is:

1. A portable, height-adjustable gangway system, comprising:
    a lower tower structure comprising:
        a lower landing;
        a lower movement assembly comprising a first set of wheels permitting the lower tower structure to travel over ground; and
        a lower extending tower support connecting the lower movement assembly and the lower landing and comprising lower expandable struts configured to move the lower landing towards and away from the lower movement assembly;
    an upper tower structure comprising:
        an upper landing:
        an upper movement assembly comprising a second set of wheels permitting the upper tower structure to travel over ground; and
        an upper extending tower support connecting the upper movement assembly and the upper landing and comprising upper expandable struts configured to move the upper landing towards and away from the upper movement assembly;
    a cross-support connecting the lower tower structure to the upper tower structure; and
    a travellator comprising:
        a lower pivotal connection pivotally connected to the lower tower structure and an upper pivotal connection pivotally connected to the upper tower structure such that the travellator tilts responsive to at least one of:
            the lower expandable struts of the lower tower support extending at least one, of towards and away from the lower movement assembly; and
            the upper expandable struts of the upper tower support extending at least one of towards and away from the upper movement assembly,
        each of the lower and upper pivotal connections comprising a respective telescoping section configured to independently expand and/or contract in length dependent upon an angle of tilt of the travellator.

2. The gangway system according to claim 1, wherein the travellator comprises a continuous set of stairs.

3. The gangway system according to claim 1, wherein the travellator is a plurality of travellators disposed parallel to one another, each of the travellators:
    comprising one of a continuous set of stairs and a gondola;
    having an independent, reversible path of travel; and
    being configured to move independently at a controllable travel speed.

4. The gangway system according to claim 1, which further comprises sensors configured to control movement of at least one of the lower and upper movement assemblies to marine related vessel movements and, thereby, automatically level at least one of the lower and upper tower structures to marine vessel movement.

5. The gangway system according to claim 1, wherein the upper landing comprises adjustable upper surfaces configured to mechanically telescope to change at least one of capacity, volume, and length.

6. The gangway system according to claim 1, wherein the travellator comprises a gondola.

7. The gangway system according to claim 6, herein the gondola is shaped to accommodate wheelchair-disabled individuals.

8. The gangway system according to claim 1, wherein:
    the travellator comprises at least one first portion and a second portion; and
    the lower and upper expandable struts and the lower and upper pivotal connections are configured to pivot the travellator between:
        a frilly horizontal position in which the at least one first portion and the second portion of the travellator are horizontal;
        at least one intermediate raised position in which:
            the at least one first portion of the travellator is horizontal; and
            the second portion of the travellator is at a given angle to ground; and
        a raised position in which:
            the at least one first portion of the travellator is horizontal; and
            the second portion of the travellator is at an angle to ground greater than the given angle.

9. The gangway system according to claim 8, wherein the given angle is greater than zero degrees and less than approximately thirty degrees.

10. The gangway system according to claim 1, wherein:
    the travellator comprises a lower first portion, an upper first portion, and a second portion; and
    the lower and upper expandable struts and the lower and upper pivotal connections are configured to pivot the travellator between:
        a fully horizontal position in which the lower and upper first portions and the second portion of the travellator are horizontal;
        at least one intermediate raised position in which:
            the lower and upper first portions of the travellator are horizontal; and
            the second portion of the travellator is at a given angle to ground; and a raised position in which:
the lower and upper first portions of the travellator are horizontal; and
the second portion of the travellator is at an angle to ground greater than the given angle.

11. The gangway system according to claim 10, wherein the given angle is greater than zero degrees and less than approximately thirty degrees.

12. The gangway system according to claim 1, wherein the travellator comprises:
a translatable step;
a travellator supporting structure having an upper end and a lower end;
an inner track connected to the supporting structure:
an outer track connected to the supporting structure to define, together with the inner track, a step path at which the step moves along the supporting structure at least between the upper and lower ends; and
a step movement assembly configured to translate the step along the supporting structure at least between the upper and lower ends.

13. The gangway system according to claim 12, wherein:
the step is a passenger gondola; and
the step movement assembly is configured:
to translate the gondola to the upper end to receive and disembark passengers at the upper landing; and
to translate the gondola to the lower end to receive and disembark passengers at the lower landing.

14. The gangway system according to claim 12, wherein:
the inner track is a continuous raceway inner track;
the outer track is a continuous raceway outer track surrounding the inner track; and
the step is a plurality of steps forming a continuous succession of steps translated within the raceway of the inner and outer tracks.

15. The gangway system according to claim 14, wherein the travellator comprises:
a lower horizontal first portion at the lower landing;
an upper horizontal first portion at the upper landing; and
a second portion pivotally connected to the lower horizontal first portion and pivotally connected to the upper horizontal first portion such that, responsive to movement of the upper landing by at least one of the lower and upper expandable struts towards and away from at least one of the lower and upper movement assembly, the second portion tilts between horizontal and a given maximum angle.

16. The gangway system according to claim 15, wherein the given maximum angle is approximately thirty degrees.

17. The gangway system according to claim 15, Wherein:
the telescoping section of the lower pivotal connection comprises a lower expandable/contractible telescoping section:
the telescoping section of the upper pivotal connection comprises an upper expandable/contractible telescoping section;
the inner track comprises:
a fixed lower angled portion;
a movable upper angled portion;
the upper expandable/contractible telescoping section;
the lower expandable/contractible telescoping section;
an inner track first lower pivot;
an inner track second lower pivot;
an upper tutu-around portion comprising:
a lower end pivotally connected to an upper end of the fixed lower angled portion by the inner track first lower pivot; and
an upper end slidably connected to the upper expandable/contractible telescoping section;
a lower turn-around portion comprising:
a lower end pivotally connected to a lower end of the fixed lower angled portion by the inner track second lower pivot; and
an upper end slidably connected to the lower expandable/contractible telescoping section;
an inner track first upper pivot pivotally connecting the movable upper angled portion to the upper expandable/contractible telescoping section; and
an inner track second upper pivot pivotally connecting the movable upper angled portion to the lower expandable/contractible telescoping section; and
the outer track comprises:
a lower angled portion;
an upper angled portion;
an outer track first upper pivot;
an outer track second upper pivot;
an outer track first lower pivot;
an outer track second lower pivot;
a lower turn-around portion comprising:
a lower end pivotally connected to a lower end of the lower angled portion by the outer track second lower pivot; and
an upper end pivotally connected to a lower end of the upper angled portion by the outer track second upper pivot; and
an upper turn-around portion having;
a lower end pivotally connected to an upper end of the lower angled portion by the outer track first lower pivot; and
an upper end pivotally connected to an upper end of the upper angled portion.

18. The gangway system according to claim 17, wherein, responsive to movement of the upper landing, the lower and upper expandable/contractible telescoping sections slide along the lower and upper turn-around portions, respectively, to translate the movable upper angled portion towards and away from the upper angled portion of the outer track.

19. The gangway system according to claim 12, wherein:
the step has wheels; and
the inner track and the outer track are C-channels in which the wheels of the step travel.

20. A portable, height-adjustable gangway system, comprising:
a lower tower structure comprising:
a lower landing;
a lower movement assembly comprising a first set of wheels permitting the lower tower structure to travel over ground; and
a lower extending tower support connecting the lower movement assembly and the lower landing and comprising expandable struts configured to move the lower landing towards and away from the lower movement assembly:
an upper tower structure comprising:
an upper landing;
an upper movement assembly comprising a second set of wheels permitting the upper tower structure to travel over ground; and
an, upper extending tower support connecting the upper movement, assembly and the upper landing and comprising upper expandable struts configured to move the upper landing towards and away from the upper movement assembly; and a cross-support connecting the lower tower structure to the upper tower structure; and
a travellator comprising:
a lower pivotal connection pivotally connected to the lower tower structure and an upper pivotal connection pivotally connected to the upper tower structure such that the travellator tilts responsive to at least one of:
the lower expandable struts of the lower tower support extending at least one of towards and away from the lower movement assembly; and
the upper expandable struts of the upper tower support extending at least one of towards and away from the upper movement assembly,
each of the lower and upper pivotal connections comprising a respective telescoping section configured to independently expand and/or contract in length dependent upon an angle of tilt of the travellator
a lower horizontal first portion at the lower landing;
an upper horizontal first portion at the upper landing;
a second portion pivotally connected to the lower horizontal first portion and pivotally connected to the upper horizontal first portion such that, responsive to movement of at least one of the lower and upper landing, the second portion tilts between horizontal and a given maximum angle;
a translatable step;
an inner track connected to the lower horizontal first portion, to the upper horizontal first portion, and to the second portion; and
an outer track connected to the lower horizontal first portion, to the upper horizontal first portion, and to the second portion to define, together with the inner track, a step path at which the step moves along at least the second portion.

21. The gangway system according to claim 20, wherein the step comprises at least one of a continuous set of stairs and a gondola.

22. The gangway system according to claim 20, wherein the given maximum angle is approximately thirty degrees.

23. The gangway system according to claim 20, wherein:
the telescoping section of the lower pivotal connection comprises a lower expandableicontractible telescoping section:
the telescoping section of the upper pivotal connection comprises an upper expandabletcontractible telescoping section;
the inner track comprises:
a fixed lower angled portion:
a movable upper angled portion;
the upper expandable/contractible telescoping section;
the lower expandable/contractible telescoping section;
an inner track first lower pivot;
an inner track second lower pivot; and
an upper turn-around portion comprising:
a lower end pivotally connected to an upper end of the fixed lower angled portion by the inner track first lower pivot; and
an upper end slidably connected to the upper expandable/contractible telescoping section:
a lower turn-around portion comprising:
a lower end pivotally connected to a lower end of the fixed lower angled portion by the inner track second lower pivot; and
an upper end slidably connected to the lower expandable/contractible telescoping section;
an inner track first upper pivot pivotally connecting the movable upper angled portion to the upper expandable/contractible telescoping section; and
an inner track second upper pivot pivotally connecting the movable upper angled portion to the lower expandable/contractible telescoping section; and
the outer track comprises:
a lower angled portion;
an upper angled portion;
an outer track first upper pivot;
an outer track second upper pivot;
an outer track first lower pivot;
an outer track second lower pivot;
a lower turn-around portion comprising:
a lower end pivotally connected to a lower end of the lower angled portion by the outer track second lower pivot; and
an upper end pivotally connected to a lower end of the upper angled portion by the outer track second upper pivot; and
an upper turn-around portion having:
a lower end pivotally connected to an upper end of the lower angled portion by the outer track first lower pivot; and
an upper end pivotally connected to an upper end of the upper angled portion.

24. The gangway system according to claim 23, wherein, responsive to movement of the upper landing, the lower and upper expandable/contractible telescoping sections slide along, the lower and upper turn-around portions, respectively, to translate the movable upper angled portion towards and away from the upper angled portion of the outer track.

25. A portable, height-adjustable gangway, comprising:
a lower tower structure comprising:
a lower landing; and
a lower movement assembly comprising a first set of wheels permitting the lower tower structure to travel over ground;
an upper tower structure comprising:
an upper landing;
an upper movement assembly comprising a second set of wheels permitting the upper tower structure to travel over ground; and
an extending tower support connecting the upper movement assembly and the upper landing and comprising expandable struts configured to move, the upper landing towards and away from the upper movement assembly; and
a gondola:
pivotally connected to the lower tower structure and pivotally connected to the upper tower structure such that, responsive to the expandable struts of the tower support extending at least one of towards and away from the upper movement assembly, the travellator tilts.

* * * * *